US011624447B2

(12) United States Patent
Potter et al.

(10) Patent No.: US 11,624,447 B2
(45) Date of Patent: Apr. 11, 2023

(54) ROTARY VALVE ASSEMBLY

(71) Applicant: Boston Dynamics, Inc., Waltham, MA (US)

(72) Inventors: Steven D. Potter, Bedford, MA (US); Christopher Everett Thorne, Sommerville, MA (US); John Aaron Saunders, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 472 days.

(21) Appl. No.: 16/410,579

(22) Filed: May 13, 2019

(65) Prior Publication Data
US 2020/0362972 A1 Nov. 19, 2020

(51) Int. Cl.
*F16K 11/076* (2006.01)
*G05D 1/02* (2020.01)
*F15B 13/00* (2006.01)
*F15B 13/04* (2006.01)

(52) U.S. Cl.
CPC ............ *F16K 11/076* (2013.01); *G05D 1/021* (2013.01); *F15B 13/0406* (2013.01); *F15B 2013/008* (2013.01)

(58) Field of Classification Search
CPC . F16K 11/076; G05D 1/021; F15B 2013/008; F15B 13/0406
See application file for complete search history.

(56) References Cited

U.S. PATENT DOCUMENTS

| 2,675,679 | A |   | 4/1954  | Parker  |               |
|-----------|---|---|---------|---------|---------------|
| 4,199,007 | A | * | 4/1980  | Holmes  | F16K 11/06    |
|           |   |   |         |         | 137/624.13    |
| 4,311,171 | A | * | 1/1982  | Roberts | B62D 5/083    |
|           |   |   |         |         | 137/625.23    |
| 4,800,924 | A | * | 1/1989  | Johnson | F16K 11/0853  |
|           |   |   |         |         | 137/625.23    |
| 4,838,145 | A | * | 6/1989  | Slocum  | F15B 13/07    |
|           |   |   |         |         | 137/625.23    |
| 5,269,215 | A | * | 12/1993 | Phillips| B62D 5/083    |
|           |   |   |         |         | 137/625.23    |

(Continued)

FOREIGN PATENT DOCUMENTS

DE    102006024802 A1   12/2007
GB        1291297 A     10/1972

(Continued)

OTHER PUBLICATIONS

International Search Report, PCT/US2020/031979, 13 pages, dated Aug. 24, 2020.

*Primary Examiner* — Matthew W Jellett
*Assistant Examiner* — Christopher D Ballman
(74) *Attorney, Agent, or Firm* — Knobbe Martens Olson & Bear LLP

(57) ABSTRACT

The present disclosure provides: at least one component of a rotary valve subassembly; a rotary valve assembly including the rotary valve subassembly; a hydraulic circuit including the rotary valve assembly; an assembly including a robot that incorporates the hydraulic circuit; and a method of operating the rotary valve assembly. The at least one component of the rotary valve subassembly includes a spool. The at least one component of the rotary valve subassembly includes a sleeve.

12 Claims, 53 Drawing Sheets

(56) References Cited

U.S. PATENT DOCUMENTS

| | | | | |
|---|---|---|---|---|
| 5,467,800 A | * | 11/1995 | Sallas | F15B 13/0406 |
| | | | | 137/625.65 |
| 5,975,137 A | * | 11/1999 | Strong | B62D 5/0837 |
| | | | | 137/625.23 |
| 6,076,552 A | * | 6/2000 | Takahashi | F15B 13/0402 |
| | | | | 137/625.69 |
| 6,397,890 B1 | | 6/2002 | Mickelson et al. | |
| 6,594,992 B1 | * | 7/2003 | Naito | F15B 11/17 |
| | | | | 137/625.17 |
| 6,876,100 B2 | * | 4/2005 | Yumita | F03B 13/00 |
| | | | | 290/43 |
| 7,322,375 B2 | * | 1/2008 | Goldfarb | F16K 11/085 |
| | | | | 137/625.22 |
| 8,734,123 B2 | * | 5/2014 | Alfayad | F04B 1/047 |
| | | | | 417/221 |
| 8,840,118 B1 | * | 9/2014 | Giovanardi | B60G 17/016 |
| | | | | 280/5.5 |
| 9,127,694 B2 | * | 9/2015 | Greeb | F15B 13/0406 |
| 9,435,446 B1 | | 9/2016 | Saunders et al. | |
| 9,665,099 B1 | | 5/2017 | Saunders et al. | |
| 9,731,416 B1 | | 8/2017 | Saunders et al. | |
| 9,927,037 B2 | | 3/2018 | Saunders et al. | |
| 10,087,962 B2 | * | 10/2018 | Lesage | F15B 11/024 |
| 10,215,306 B2 | * | 2/2019 | Braeuer | F16K 47/08 |
| 10,279,482 B1 | | 5/2019 | Khripin et al. | |

FOREIGN PATENT DOCUMENTS

| | | | |
|---|---|---|---|
| GB | 1396061 A | 5/1975 | |
| GB | 2104249 A | 3/1983 | |

* cited by examiner

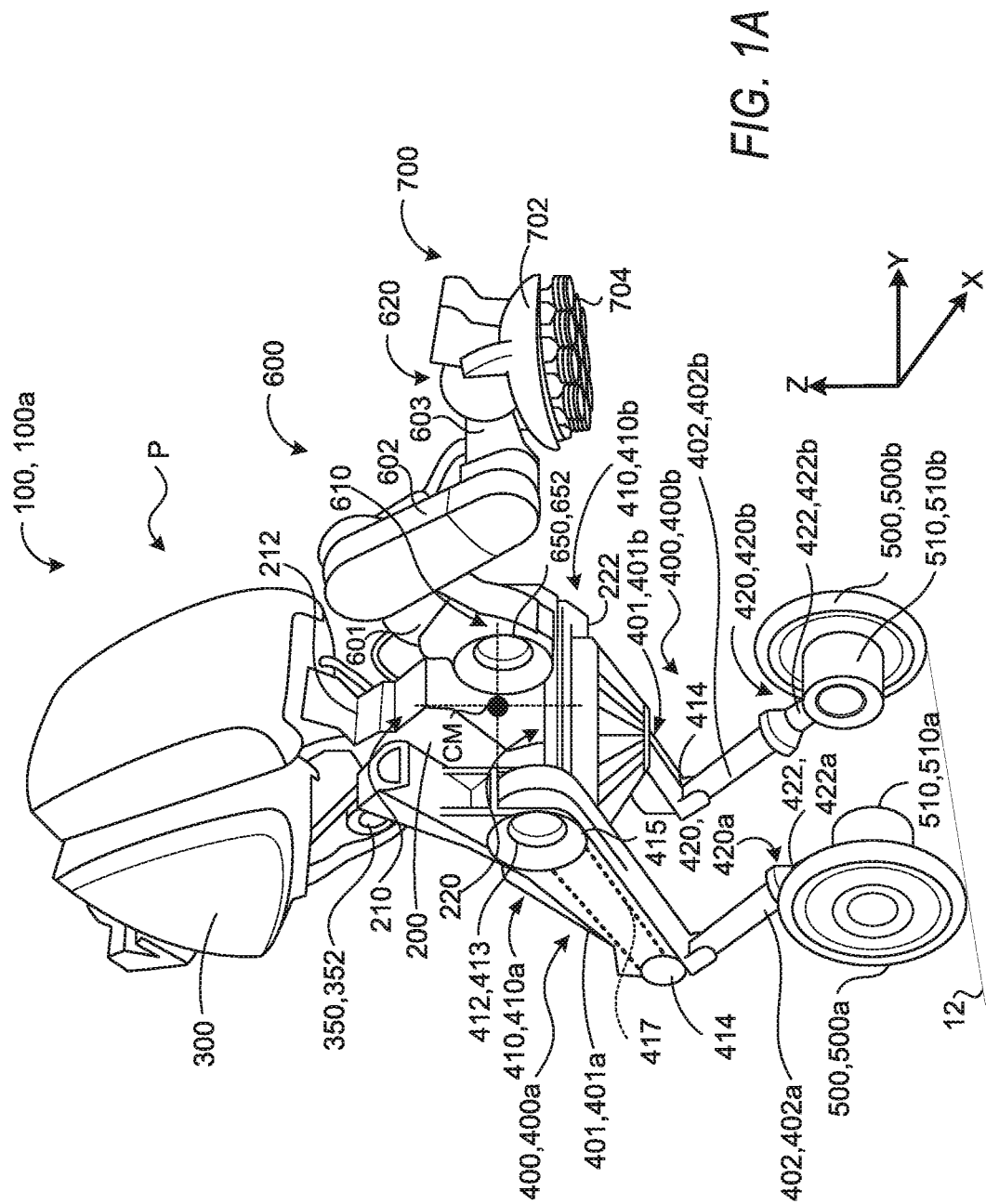

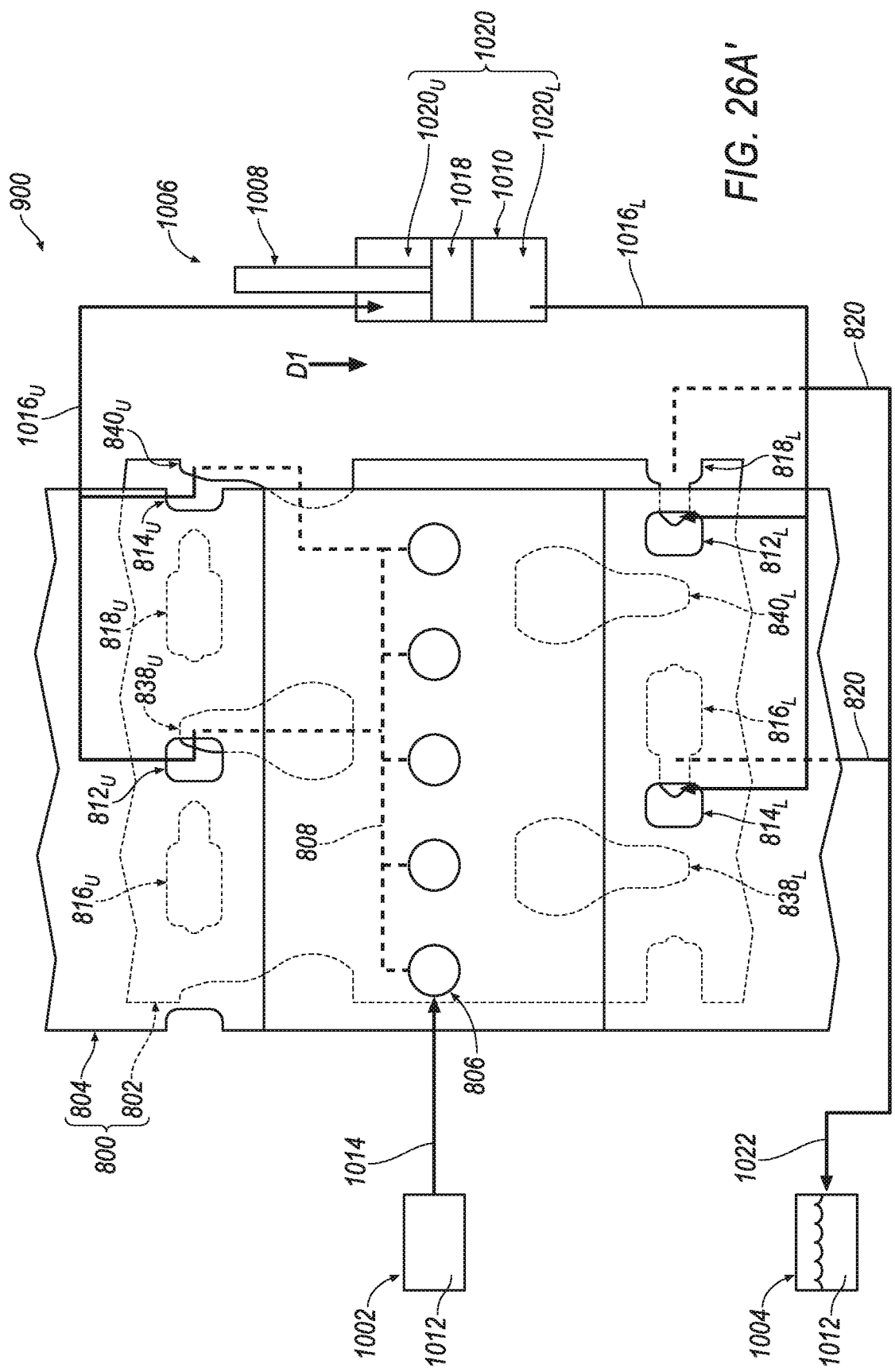

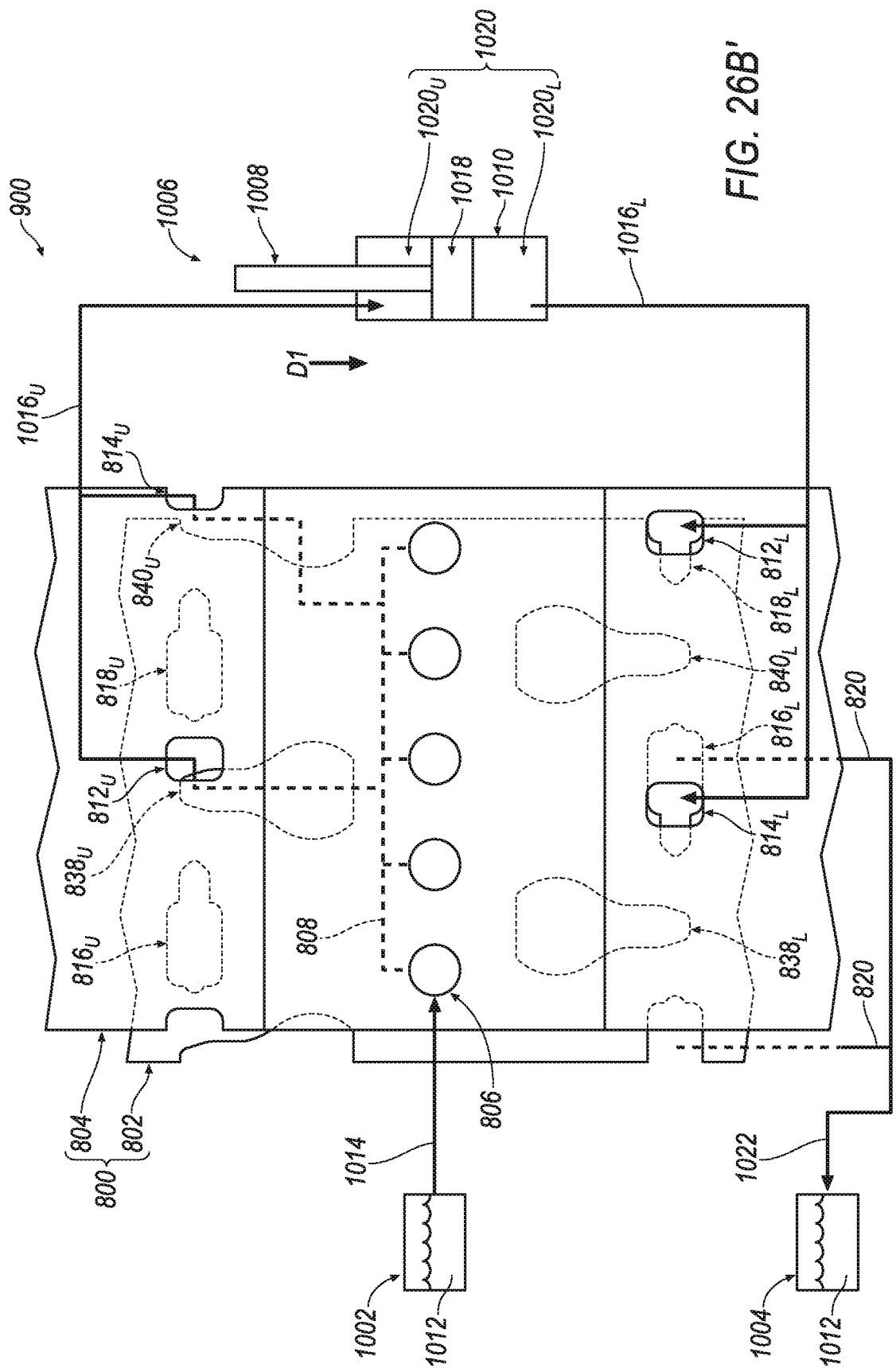

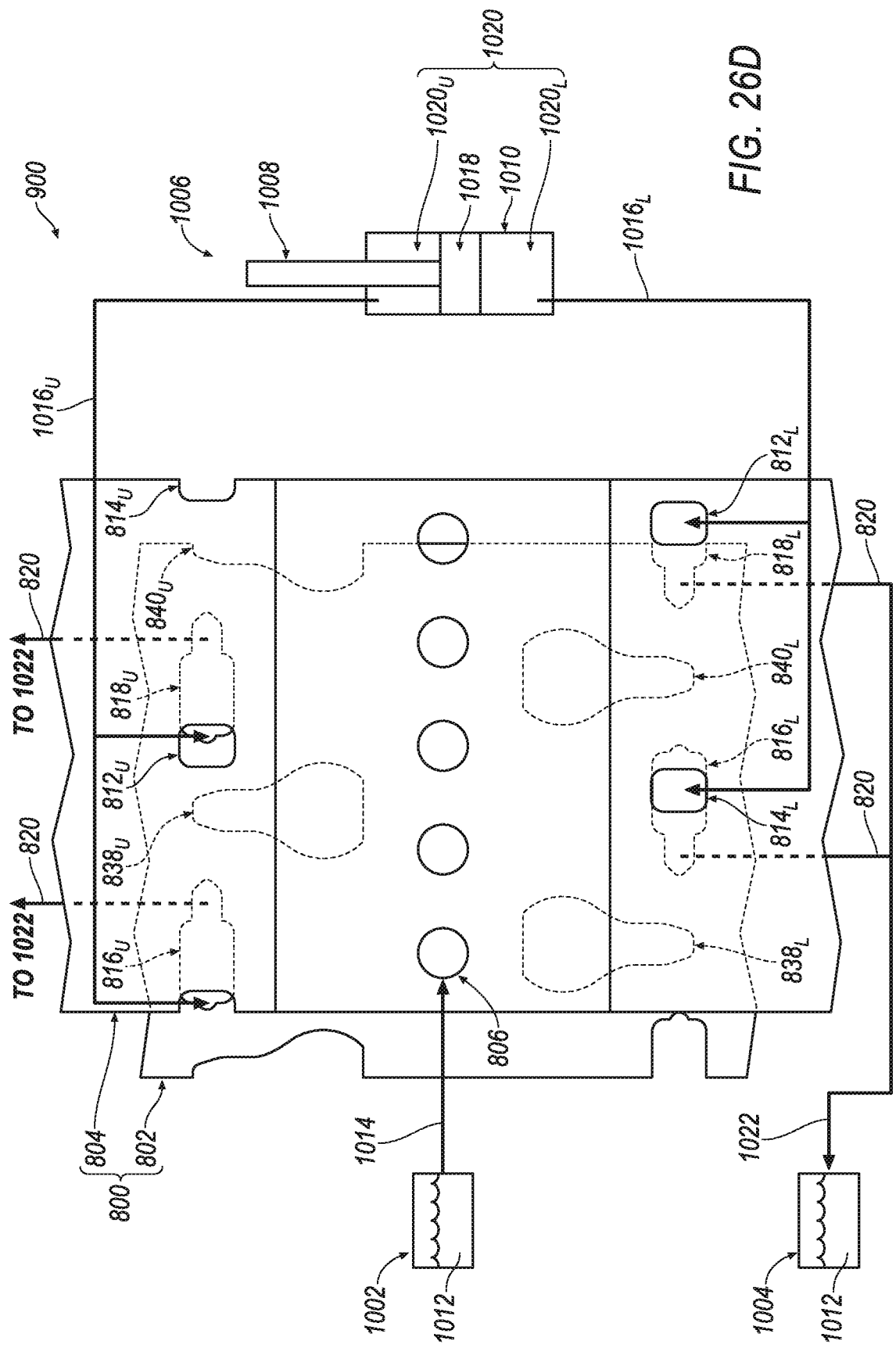

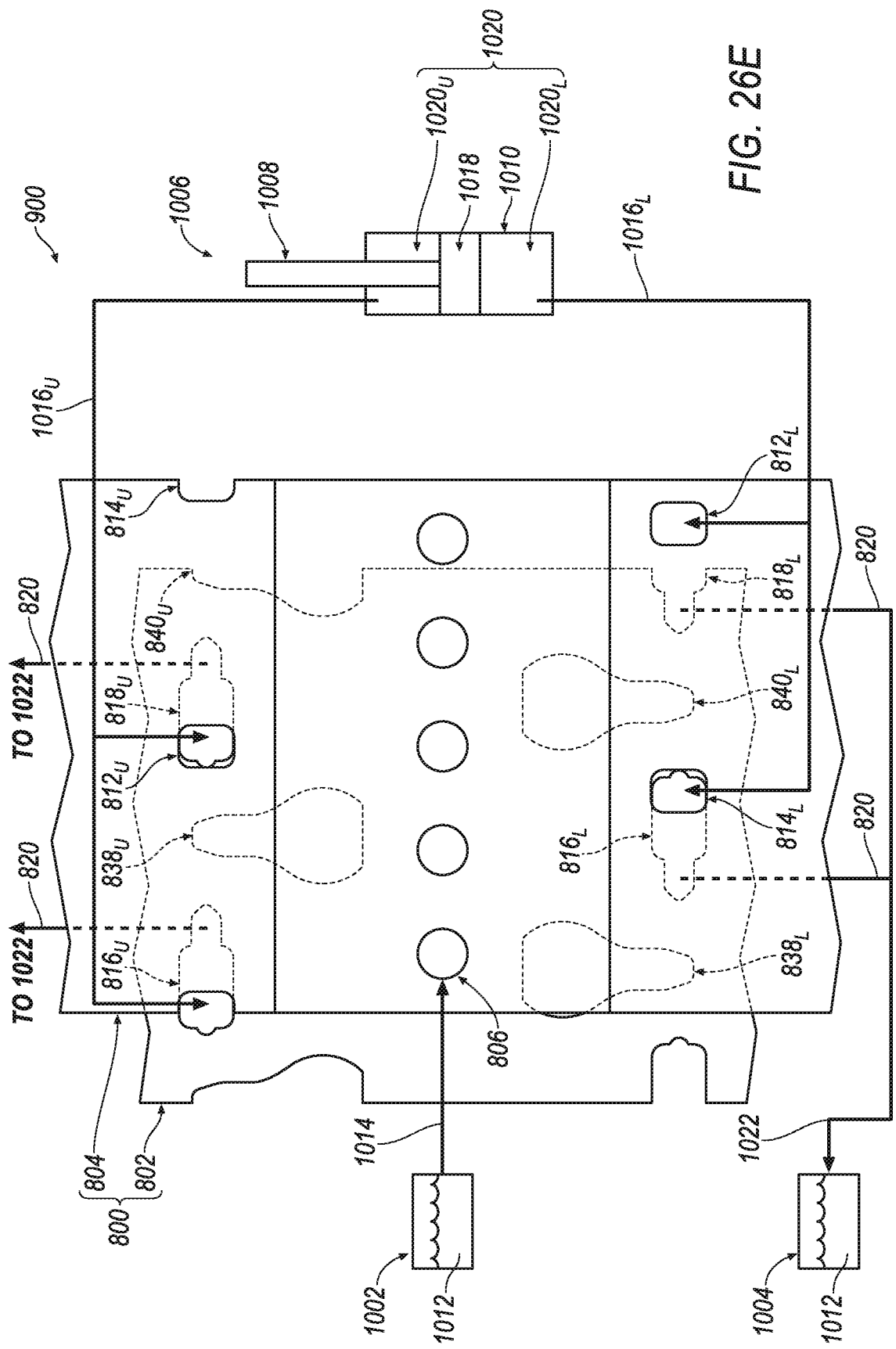

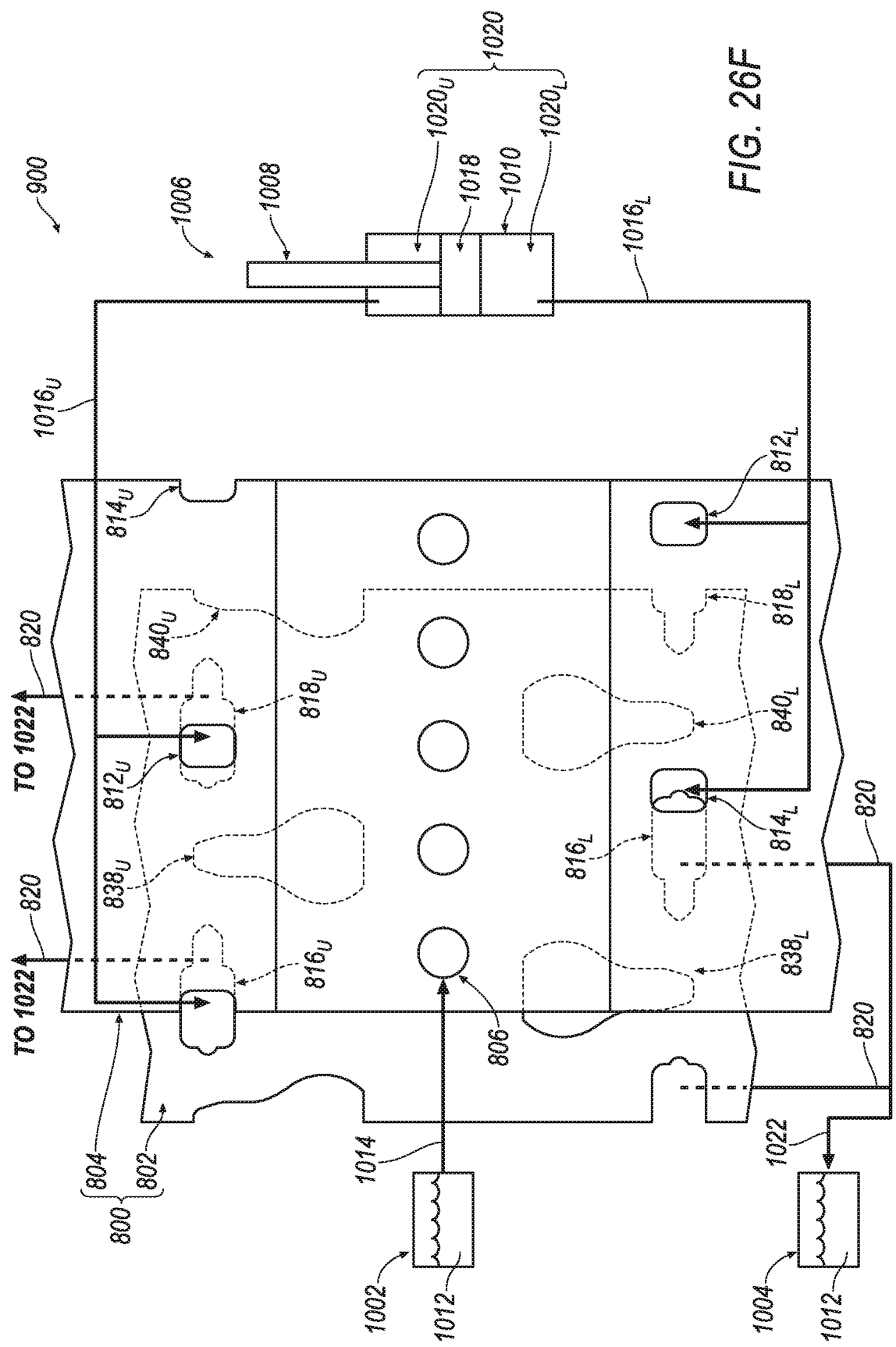

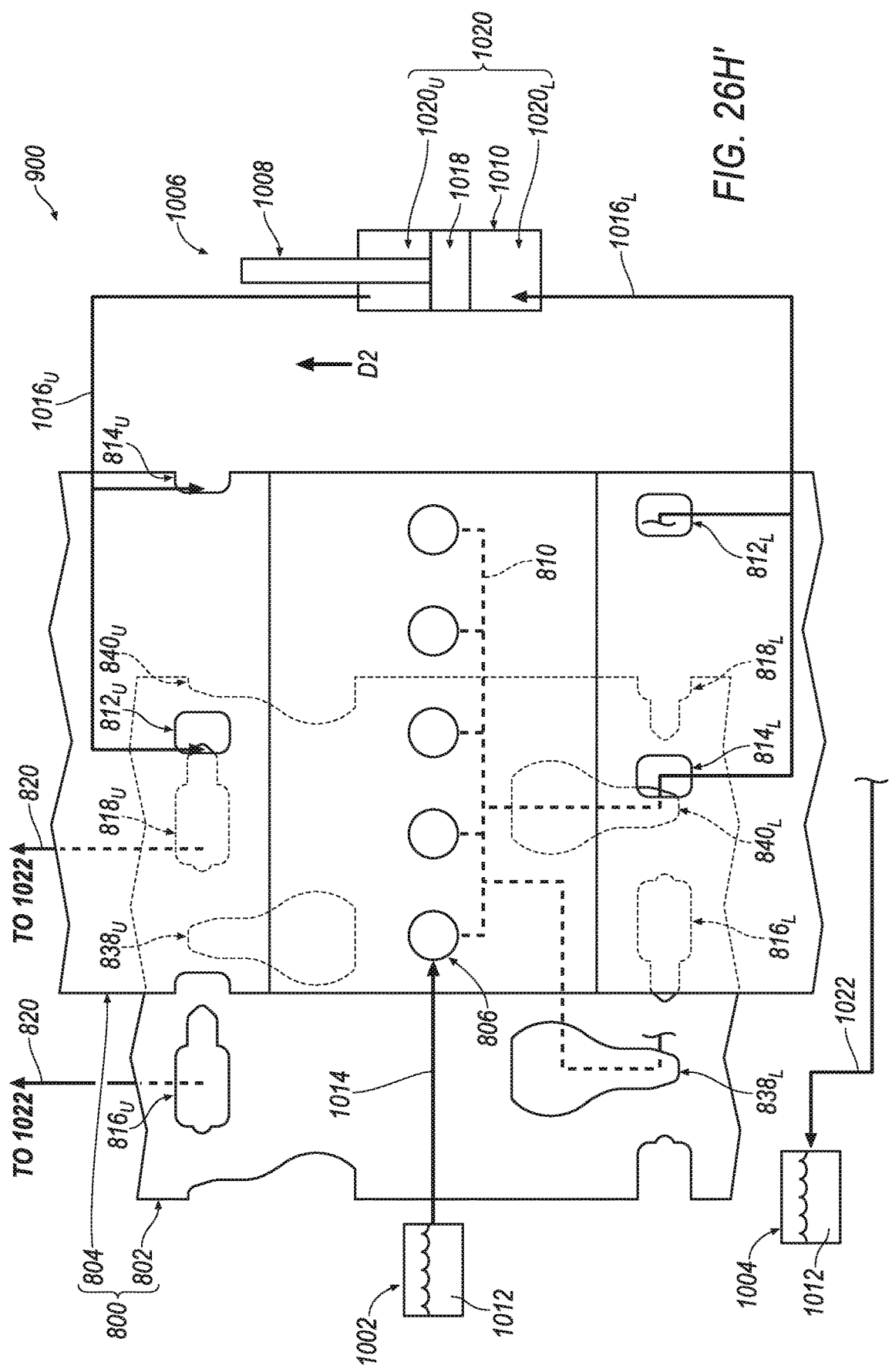

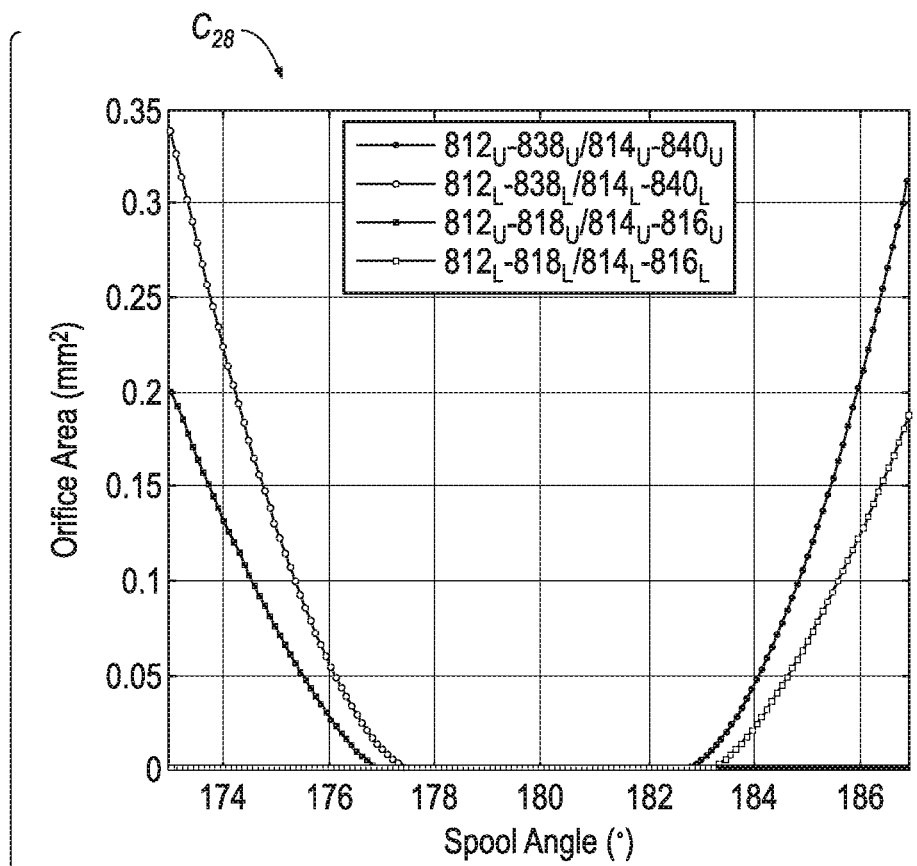
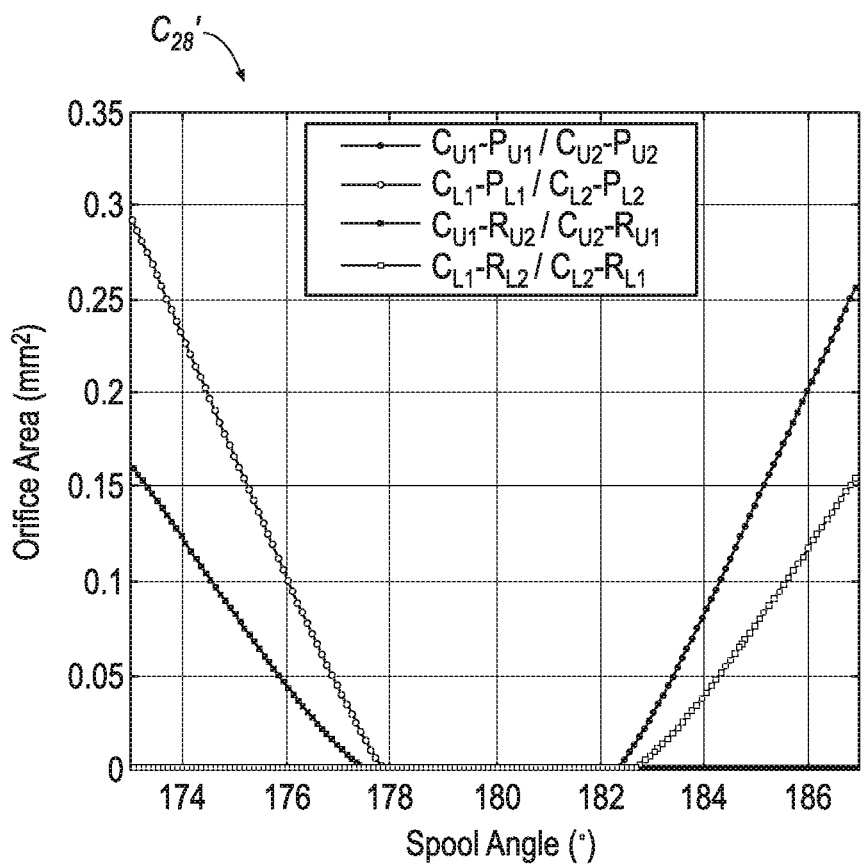
FIG. 28

ROTARY VALVE ASSEMBLY

TECHNICAL FIELD

This disclosure relates to valves and to valves incorporated into a hydraulic circuit of a mobile robot.

BACKGROUND

Hydraulic circuits may include a plurality of fluid-flow channels or fluid-flow branches. In some instances, one or more of the fluid-flow branches include a valve. Some valves may be arranged in one of two configurations including an open configuration and a closed configuration. The open configuration of the valve permits fluid to flow through the fluid-flow branch of the hydraulic circuit. The closed configuration of the valve prohibits fluid to flow through the fluid-flow branch of the hydraulic circuit. Many of these valves are designed to meter or throttle a flow of hydraulic fluid through the valve by having multiple positions in the open configuration to provide different degrees of metering/throttling of the flow of hydraulic fluid.

SUMMARY

One aspect of the disclosure provides a component of a rotary valve subassembly that includes a spool having a tube-shaped body including an outer side surface and an inner side surface disposed on an opposite side of the tube-shaped body than the outer side surface. The inner side surface defines an axial chamber that axially extends through the tube-shaped body. The tube-shaped body includes: a plurality of return pressure ports that radially extend through a thickness of the tube-shaped body, each return pressure port in fluid communication with the axial chamber; and a plurality of scalloped recesses formed on the outer-side surface of the tube-shaped body, each scalloped recess extending radially into but not through the thickness of the tube-shaped body.

Implementations of the disclosure may include one or more of the following optional features. In some implementations, the plurality of scalloped recesses include: a first upper scalloped recess; a second upper scalloped recess circumferentially spaced from the first upper scalloped recess; a vertically flipped first lower scalloped recess; and a vertically flipped second lower scalloped recess circumferentially spaced from the first lower scalloped recess. In these implementations, an orientation of each of the first and second lower scalloped recesses is vertically flipped in comparison to an orientation of each of the first and second upper scalloped recesses, and the first and second lower scalloped recesses are axially spaced from the first and second upper scalloped recesses.

In some examples, the plurality of return pressure ports include: a first upper return pressure port; a second upper return pressure port circumferentially arranged around an upper portion/row of the tube-shaped body with the first upper return pressure port; a first lower return pressure port; and a second lower return pressure port circumferentially arranged around an upper portion/row of the tube-shaped body with the first lower return pressure port. In these examples, an orientation of each of the first and second lower return pressure ports is horizontally flipped in comparison to an orientation of each of the first and second upper return pressure ports, and the first and second lower return pressure ports are axially spaced from the first and second upper return pressure ports. The first upper return pressure port may be circumferentially aligned with one of the first or second lower scalloped recesses and the second upper return pressure port may be circumferentially aligned with the other one of the first or second lower scalloped recesses, while the first lower return pressure port may be circumferentially aligned with one of the first or second upper scalloped recesses and the second lower return pressure port may be circumferentially aligned with the other one of the first or second upper scalloped recesses.

In some implementations, each scalloped recess of the plurality of scalloped recesses includes a head portion, a body portion, and a neck portion connecting the head portion to the body portion. Each scalloped recess may include a pear-shaped cross-section. Further, each scalloped recess extending radially into but not through the thickness of the tube-shaped body may be recessed from the outer side surface at a depth defining one or more of a constant depth portion or a non-constant depth portion along a length of the scalloped recess. For instance, the constant depth portion may extend along a length of the neck portion and/or the non-constant depth portion may extend along a length of at least one of the head portion or the body portion.

In some examples, each return pressure port of the plurality of return pressure ports includes a first portion, a second portion, and an intermediate portion connecting the first portion to the second portion. In some configurations, each return pressure port of the plurality of return pressure ports defines a length extending in a direction substantially perpendicular to a longitudinal axis of the spool, and a width extending along a portion of a circumference of the tube-shaped body in a direction substantially perpendicular to the longitudinal axis of the spool, wherein the first portion defines a first length portion of the length, wherein the second portion defines a second length portion of the length that is greater than the first length portion, wherein the intermediate portion defines a third length portion of the length that is greater than the second length portion, wherein the first portion defines a first width portion of the width, wherein the second portion defines a second width portion of the width that is greater than the first width portion, wherein the intermediate portion defines a third width portion of the width that is greater than the second width portion Another aspect of the disclosure provides a component of a rotary valve subassembly including a sleeve having a tube-shaped body including an outer side surface and an inner side surface disposed on an opposite side of the tube-shaped body than the outer side surface. The inner side surface defines an axial chamber that axially extends through the tube-shaped body. The tube-shaped body includes: a plurality of inlet ports that extend radially through a thickness of the tube-shaped body, each inlet port in fluid communication with the axial chamber and defining an upstream opening at the outer side surface and a downstream opening at the inner side surface; and a plurality of control ports that extend radially through the thickness of the tube-shaped body, each control port in fluid communication with the axial chamber and defining a first opening at the outer side surface and a second opening at the inner side surface.

This aspect may include one or more of the following optional features. In some examples, the downstream opening of each pressure port of the plurality of pressure ports is formed through a portion of the inner side surface of the tube-shaped body of the sleeve. In these examples, the portion of the inner side surface defines an inner circumferential recess that is in fluid communication with the axial chamber.

Another aspect of the disclosure provides a rotary valve assembly that includes a spool and a sleeve. The spool has a tube-shaped body including an outer side surface and an inner side surface disposed on an opposite side of the tube-shaped body than the outer side surface. The inner side surface defines an axial chamber that axially extends through the tube-shaped body. The tube-shaped body includes: a plurality of return pressure ports that radially extend through a thickness of the tube-shaped body, each return pressure port in fluid communication with the axial chamber; and a plurality of scalloped recesses formed on the outer-side surface of the tube-shaped body, each scalloped recess extending radially into but not through the thickness of the tube-shaped body. The sleeve has a tube-shaped body including an outer side surface and an inner side surface disposed on an opposite side of the tube-shaped body than the outer side surface. The inner side surface defines an axial chamber that axially extends through the tube-shaped body. The tube-shaped body includes: a plurality of inlet ports that extend radially through a thickness of the tube-shaped body, each inlet port in fluid communication with the axial chamber; and a plurality of control ports that extend radially through the thickness of the tube-shaped body, each control port in fluid communication with the axial chamber.

This aspect may include one or more of the following optional features. In some implementations, a portion of the inner side surface of the tube-shaped body of the sleeve defines an inner circumferential recess, wherein at least a portion of at least one scalloped recess and at least a portion of the inner circumferential recess formed by the portion of the inner side surface defines at least one cavity. Here, the plurality of scalloped recesses may include at least one upper scalloped recess and at least one lower scalloped recess. The at least one upper scalloped recess and the inner circumferential recess defining an upper cavity of the at least one cavity; and the at least one lower scalloped recess and the inner circumferential recess defining a lower cavity of the at least one cavity.

In some examples, the plurality of return pressure ports include: a first upper return pressure port; a second upper return pressure port circumferentially arranged around an upper portion/row of the tube-shaped body with the first upper return pressure port; a first lower return pressure port; and a second lower return pressure port circumferentially arranged around an upper portion/row of the tube-shaped body with the first lower return pressure port, wherein an orientation of each of the first and second lower return pressure ports is horizontally flipped in comparison to an orientation of each of the first and second upper return pressure ports, and wherein the first and second lower return pressure ports are axially spaced from the first and second upper return pressure ports. In these examples, the plurality of scalloped recesses include: a first upper scalloped recess; a second upper scalloped recess circumferentially spaced from the first upper scalloped recess; a first lower scalloped recess; and a second lower scalloped recess circumferentially spaced from the first lower scalloped recess, wherein an orientation of each of the first and second lower scalloped recesses is vertically flipped in comparison to an orientation of each of the first and second upper scalloped recesses, and wherein the first and second lower scalloped recesses are axially spaced from the first and second upper scalloped recesses. Optionally, the first upper scalloped recess and the second upper scalloped recess may cooperate with the inner circumferential recess to define an upper cavity of the at least one cavity, and the first lower scalloped recess and the second lower scalloped recess may cooperate with the inner circumferential recess to define a lower cavity of the at least one cavity.

In yet another aspect of the present disclosure, a rotary valve assembly includes a sleeve having a tube-shaped body including an outer side surface and an inner side surface that defines an axial chamber, a spool disposed within the axial chamber of the sleeve, and a spool-rotating portion disposed within the axial chamber of the sleeve and coupled for common rotation with the spool about a longitudinal axis defined by the sleeve. The sleeve includes a plurality of inlet ports and a plurality of control ports that radially extend through a thickness of the tube-shaped body. The thickness extends radially between the outer side surface and the inner side surface of the tube-shaped body. The spool is coaxial to the sleeve and configured to rotate relative to the sleeve about the longitudinal axis defined by the sleeve. The spool has a tube-shaped body including an outer side surface and an inner side surface that defines an axial chamber. The tube-shaped body includes: a plurality of return pressure ports that radially extend through a thickness of the tube-shaped body, each return pressure port in fluid communication with the axial chamber; and a plurality of scalloped recesses formed on the outer-side surface of the tube-shaped body, each scalloped recess extending radially into but not through the thickness of the tube-shaped body.

This aspect may include one or more of the following optional features. In some examples, a portion of the inner side surface of the tube-shaped body of the sleeve defines an inner circumferential recess, wherein the tube-shaped body of the sleeve includes a stem portion and a cap portion, wherein the stem portion defines a first axial chamber portion of the axial chamber that is sized for rotatably-containing a first portion of a length of the spool, wherein the cap portion defines a second axial chamber portion of the axial chamber that is sized for containing the spool-rotating portion and a second portion of the length of the spool that is coupled to the spool-rotating portion, wherein at least a portion of at least one scalloped recess of the plurality of scalloped recesses of the spool and at least a portion of the inner circumferential recess formed by the portion of the inner side surface of the tube-shaped body of the sleeve defines at least one cavity. Here, the plurality of scalloped recesses may include at least one upper scalloped recess and at least one lower scalloped recess. The at least one upper scalloped recess and the inner circumferential recess defining an upper cavity of the at least one cavity; and the at least one lower scalloped recess and the inner circumferential recess defining a lower cavity of the at least one cavity.

In some examples, the plurality of return pressure ports include: a first upper return pressure port; a second upper return pressure port circumferentially arranged around an upper portion/row of the tube-shaped body with the first upper return pressure port; a first lower return pressure port; and a second lower return pressure port circumferentially arranged around an upper portion/row of the tube-shaped body with the first lower return pressure port, wherein an orientation of each of the first and second lower return pressure ports is horizontally flipped in comparison to an orientation of each of the first and second upper return pressure ports, and wherein the first and second lower return pressure ports are axially spaced from the first and second upper return pressure ports. In these examples, the plurality of scalloped recesses include: a first upper scalloped recess; a second upper scalloped recess circumferentially spaced from the first upper scalloped recess; a first lower scalloped recess; and a second lower scalloped recess circumferentially spaced from the first lower scalloped recess, wherein an orientation of each of the first and second lower scalloped recesses is vertically flipped in comparison to an orientation of each of the first and second upper scalloped recesses, and wherein the first and second lower scalloped recesses are axially spaced from the first and second upper scalloped recesses. Optionally, the first upper scalloped recess and the second upper scalloped recess may cooperate with the inner circumferential recess to define an upper cavity of the at least one cavity, and the first lower scalloped recess and the second lower scalloped recess may cooperate with the inner circumferential recess to define a lower cavity of the at least one cavity.

Another aspect of the present disclosure provides a hydraulic circuit that includes a pressurized fluid source, a hydraulic actuator, and a rotary valve assembly configured to control a flow of hydraulic fluid from the pressurized fluid source to the hydraulic actuator. The rotary valve assembly includes a sleeve having a tube-shaped body including an outer side surface and an inner side surface that defines an axial chamber, a spool disposed within the axial chamber of the sleeve, and a spool-rotating portion disposed within the axial chamber of the sleeve and coupled for common rotation with the spool about a longitudinal axis defined by the sleeve. The sleeve includes a plurality of inlet ports and a plurality of control ports that radially extend through a thickness of the tube-shaped body. The thickness extends radially between the outer side surface and the inner side surface of the tube-shaped body. The spool is coaxial to the sleeve and configured to rotate relative to the sleeve about the longitudinal axis defined by the sleeve. The spool has a tube-shaped body including an outer side surface and an inner side surface that defines an axial chamber. The tube-shaped body includes: a plurality of return pressure ports that radially extend through a thickness of the tube-shaped body, each return pressure port in fluid communication with the axial chamber; and a plurality of scalloped recesses formed on the outer-side surface of the tube-shaped body, each scalloped recess extending radially into but not through the thickness of the tube-shaped body.

This aspect may include one or more of the following optional features. In some implementations, the hydraulic circuit further includes a low pressure fluid reservoir in selective-fluid communication with the hydraulic actor when at least one of the plurality of return pressure ports of the spool is radially aligned with at least one of the plurality of control ports of the sleeve.

In yet another aspect of the present disclosure, a method of operating a rotary valve assembly having a sleeve and a spool disposed within the sleeve includes rotating the spool relative to the sleeve to radially align at least one scalloped recess of a plurality of scalloped recesses formed into an outer side surface of the spool with an inner circumferential recess formed into an inner side surface of the sleeve. The at least one scalloped recess of the spool when radially aligned with the inner circumferential recess of the sleeve is configured to fluidly-connect: a pressurized fluid source with one of a first portion or a second portion of a hydraulic actuator; and a low pressure fluid reservoir with the other one of the first portion or the second portion of the hydraulic actuator.

This aspect may include one or more of the following optional features. In some implementations, when the at least one scalloped recess of the spool is radially aligned with the inner circumferential recess of the sleeve, the method also includes communicating pressurized fluid from the pressurized fluid source through one or more inlet ports formed through the sleeve and into a cavity defined by the at least one scalloped recess of the spool and the inner circumferential recess of the sleeve. Additionally, the method may include directing the pressurized fluid out of the cavity through at least one control port of the plurality of control ports of the sleeve and into the one of the first portion or the second portion of the hydraulic actuator. Here, the pressurized fluid, when received by the one of the first portion or the second portion of the hydraulic actuator, may cause the hydraulic actuator to impart movement of a limb of a robot. The limb may include a leg or an arm of the robot.

In some examples, when the at least one scalloped recess of the spool is radially aligned with the inner circumferential recess of the sleeve, the method further includes returning fluid from the other of the first portion or the second portion of the hydraulic actuator through one or more control ports formed through the sleeve and into an axial chamber of the spool via at least one return pressure port formed through the spool. In these examples, the method may further include directing the fluid out of the axial chamber of the spool through an axial exit port to the low pressure fluid reservoir via a fluid return line. Here, the fluid return line fluidly connects the axial exit port to the fluid reservoir.

The method may further include rotating the spool relative to the sleeve to move the least one scalloped recess of the spool out of radial alignment with the inner circumferential recess of the sleeve. Here, the at least one scalloped recess of the spool when out of radial alignment with the inner circumferential recess of the sleeve is configured to fluidly-disconnect the pressurized fluid source from the one of the first portion or the second portion of the hydraulic actuator.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is schematic view of an example robot.

FIG. 26A' is a plan view of valve of FIGS. 5-10 subsequent to the first example orientation of the spool rotated relative the sleeve of FIG. 26A and prior to a second example orientation of the spool rotated relative the sleeve of FIG. 26B.

FIG. 26B' is a plan view of valve of FIGS. 5-10 subsequent to the second example orientation of the spool rotated relative the sleeve of FIG. 26B and prior to a third example orientation of the spool rotated relative the sleeve of FIG. 26C.

FIG. 26D is a plan view of valve of FIGS. 5-10 represented by the surface area of the side surface of the spool of FIG. 15 that is overlapped with the plan view of the surface area of the side surface of the sleeve of FIG. 23 that corresponds to the fourth example orientation of the spool rotated relative the sleeve of FIGS. 24D and 25D.

FIG. 26E is a plan view of valve of FIGS. 5-10 represented by the surface area of the side surface of the spool of FIG. 15 that is overlapped with the plan view of the surface area of the side surface of the sleeve of FIG. 23 that corresponds to the fifth example orientation of the spool rotated relative the sleeve of FIGS. 24E and 25E.

FIG. 26F is a plan view of valve of FIGS. 5-10 represented by the surface area of the side surface of the spool of FIG. 15 that is overlapped with the plan view of the surface area of the side surface of the sleeve of FIG. 23 that corresponds to the sixth example orientation of the spool rotated relative the sleeve of FIGS. 24F and 25F.

FIG. 26G' is a plan view of valve of FIGS. 5-10 subsequent to the seventh example orientation of the spool rotated relative the sleeve of FIG. 26G and prior to an eighth example orientation of the spool rotated relative the sleeve of FIG. 26H.

FIG. 26H' is a plan view of valve of FIGS. 5-10 subsequent to the eighth example orientation of the spool rotated relative the sleeve of FIG. 26H and prior to a ninth example orientation of the spool rotated relative the sleeve of FIG. 26I.

FIG. 28 includes enlarged portions of the graphs according to lines C28 and C28' of FIG. 27.

Like reference symbols in the various drawings indicate like elements.

DETAILED DESCRIPTION

Figure 1B:
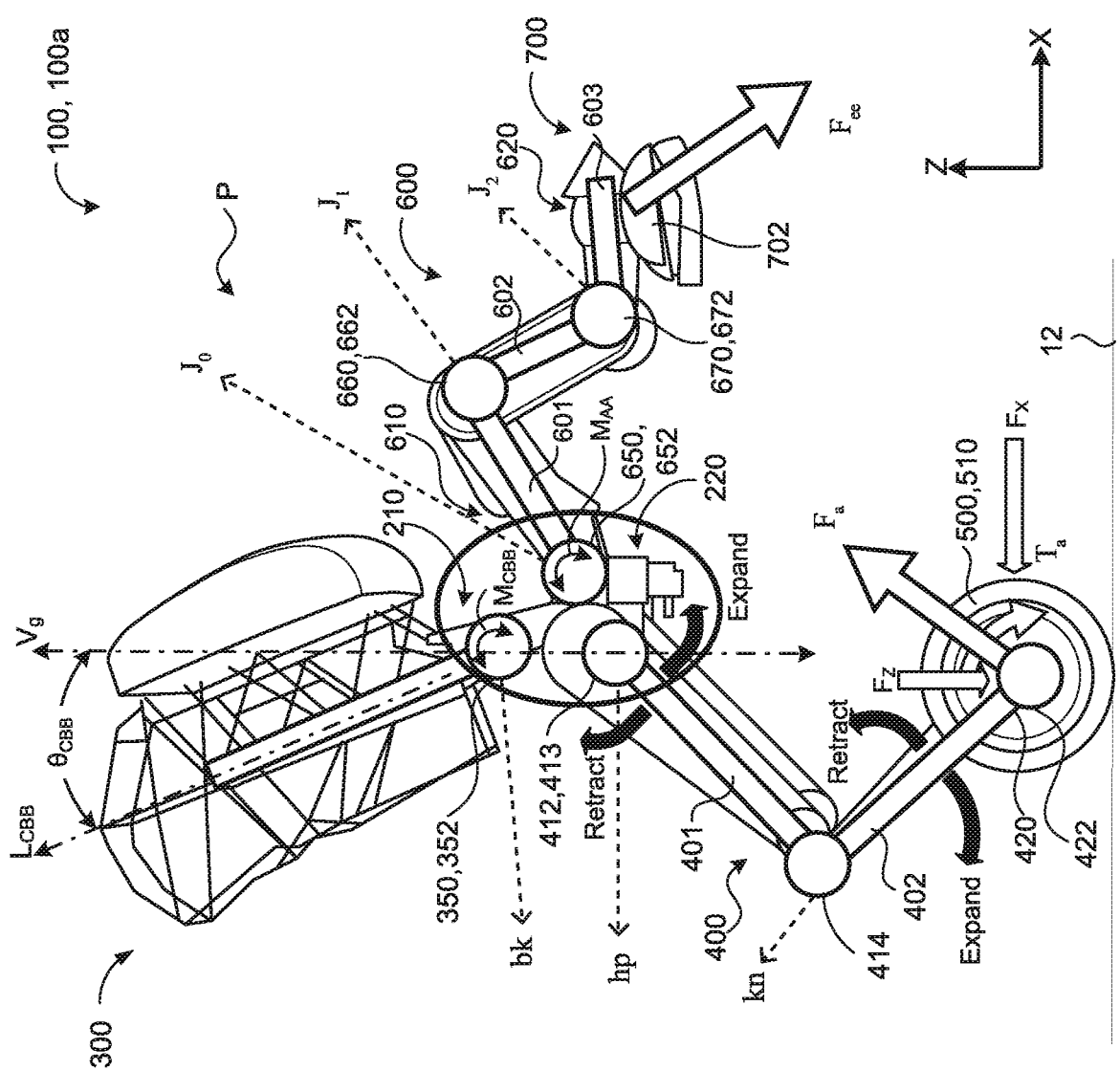
FIGS. 1B and 1C are schematic views of the robot of FIG. 1A showing a counter-balance body moving relative to an inverted pendulum body of the robot.

A valve is a component of a hydraulic circuit. The hydraulic circuit is connected to a hydraulic actuator. The hydraulic actuator controls movement of a mechanical component of a device or a mechanical system of a device.

In some instances, the device is a robotic device such as, for example, a robot (see, e.g., a mobile robot 100 at FIGS. 1A-3). The mobile robot 100 may be configured to perform routine tasks that are typically performed by a human such as, for example, palletizing or de-palletizing a pallet that supports a plurality of items such as boxes.

Because the mobile robot 100 is configured to perform tasks that are typically performed by a human, the mobile robot 100 may be alternatively referred to as a humanoid mobile robot. The humanoid mobile robot 100 includes a plurality of limbs such as, for example, one or more arms that is/are configured to engage and support or carry one or more items (e.g., one or more boxes). Furthermore, the plurality of limbs include one or more legs that is/are configured to move and bear the weight of the humanoid mobile robot 100 and the one or more items supported or carried by the one or more arms of the humanoid mobile robot 100.

The valve responds to movement commands from a controller in order to control fluid flow within the hydraulic circuit (see, e.g., FIG. 4) in order to drive movement of the hydraulic actuator. Movement of the hydraulic actuator results in corresponding movement of, for example, at least one limb of the plurality of limbs of the humanoid mobile robot 100.

Referring to FIGS. 1A-1E, in some implementations, a robot 100, 100a includes an inverted pendulum body (IPB) 200, a counter-balance body 300 disposed on the IPB 200, at least one leg 400 having a first end 410 coupled to the IPB 200 and a second end 420, and a drive wheel 500 rotatably coupled to the second end 420 of the at least one leg 400. The robot 100 has a vertical gravitational axis $V_g$ (FIGS. 1B and 1C) along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 has first and second end portions 210, 220 and may be interchangeably referred to as a torso 200 for the robot 100. For instance, the IPB 200 may define a length between a first end 212 associated with the first end portion 210 and a second end 222 associated with the second end portion 220. In some examples, a point of delineation separating the first and second end portions 210, 220 is at a midpoint between the first end 212 and the second end 222, so that the first end portion 210 encompasses 50-percent of the length of the IPB 200 and the second end portion 220 encompasses the remaining 50-percent of the length of the IPB 200. In other examples, the point of delineation separating the first and second end portions 210, 220 of the IPB 200 is closer to one of the first end 212 or the second end 222 so that one of the first end portion 210 or the second end portion 220 extends along a larger portion of the length of the IPB 200 than the other one of the first end portion 210 or the second end portion 220. For instance, the first end portion 210 extending from the first end 212 may encompass 90-, 80-, 70-, 60-, 40-, 30-, 20-, 10-percent of the length of the IPB 200 while the second end portion 220 extending from the second end 222 may encompass the remaining 10-, 20-, 30-, 60-, 70-, 80-, 90-percent of the length of the IPB 200.

In some implementations, the counter-balance body 300 is disposed on the first end portion 210 of the IPB 200 and configured to move relative to the IPB 200. The counter-balance body 300 may be interchangeably referred to as a tail 300. A back joint bk, 350 may rotatably couple the counter-balance body 300 to the first end portion 210 of the IPB 200 to allow the counter-balance body 300 to rotate relative to the IPB 200. In the example shown, the back joint bk, 350 supports the counter-balance body 300 to allow the counter-balance body 300 to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100.

Referring to FIG. 1B, the counter-balance body 300 has a longitudinal axis LCBB extending from the back joint bk, 350 and is configured to pivot at the back joint bk, 350 to move/pitch around the lateral axis (y-axis) relative to the IPB 200 (in both the clockwise and counter-clockwise directions relative to the view shown in FIG. 1B). Accordingly, the back joint bk, 350 may be referred to as a pitch joint. The pose P of the robot 100 may be defined at least in part by a rotational angle $\theta_{CBB}$ of the counter-balance body 300 relative to the vertical gravitational axis $V_g$. Moreover, the counter-balance body 300 may generate/impart a moment $M_{CBB}$ (rotational force) at the back joint bk, 350 based on the rotational angle $\theta_{CBB}$ of the counter-balance body 300 relative to the vertical gravitational axis $V_g$. Thus, movement by the counter-balance body 300 relative to the IPB 200 alters the pose P of the robot 100 by moving the CM of the robot 100 relative to the vertical gravitational axis $V_g$. A rotational actuator 352 (e.g., a tail actuator) may be positioned at or near the back joint bk, 350 for controlling movement by the counter-balance body 300 (e.g., tail) about the lateral axis (y-axis). The rotational actuator 352 may include an electric motor, electro-hydraulic servo, piezo-electric actuator, solenoid actuator, pneumatic actuator, or other actuator technology suitable for accurately effecting movement of the counter-balance body 300 relative to the IPB 200.

The rotational movement by the counter-balance body 300 relative to the IPB 200 alters the pose P of the robot 100 for balancing and maintaining the robot 100 in an upright position. For instance, similar to rotation by a flywheel in a conventional inverted pendulum flywheel, rotation by the counter-balance body 300 relative to the gravitational vertical axis $V_g$ generates/imparts the moment $M_{CBB}$ at the back joint bk, 350 to alter the pose P of the robot 100. By moving the counter-balance body 300 relative to the IPB 200 to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the counter-balance body 300 includes a corresponding mass that is offset from the moment $M_{CBB}$ imparted at the back joint bk, 350. In some configurations, a gyroscope disposed at the back joint bk, 350 could be used in lieu of the counter-balance body 300 to spin and impart the moment MCBB (rotational force) for balancing and maintaining the robot 100 in the upright position.

Figure 1C:
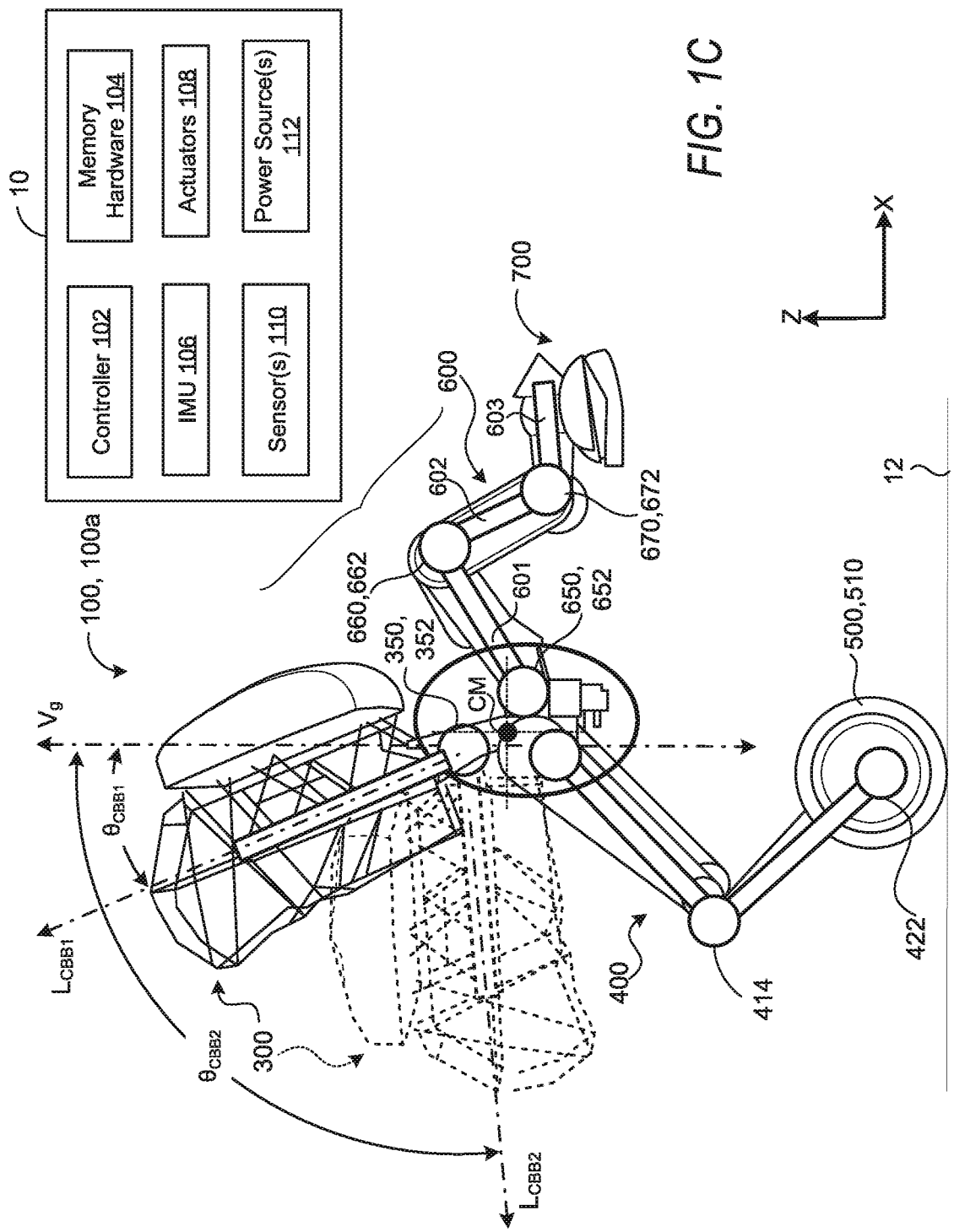

Referring to FIG. 1C, the counter-balance body 300 may rotate (e.g., pitch) about the back joint bk, 350 in both the clockwise and counter-clockwise directions (e.g., about the y-axis in the "pitch direction" relative to the view shown in FIG. 1C) to create an oscillating (e.g., wagging) movement. For example, the counter-balance body 300 may move/pitch about the lateral axis (y-axis) in a first direction (e.g., counter-clockwise direction) from a first position (solid lines) associated with longitudinal axis $L_{CBB1}$, having a first rotational angle $\theta_{CBB}$ relative to the vertical gravitation axis $V_g$, to a second position (dashed lines) associated with longitudinal axis $L_{CBB2}$, having a second rotational angle $\theta_{CBB2}$ relative to the vertical gravitation axis $V_g$. Movement by the counter-balance body 300 relative to IPB 200 from the first position to the second position causes the CM of the robot 100 to shift and lower toward the ground surface 12.

The counter-balance body 300 may also move/pitch about the lateral axis (y-axis) in an opposite second direction (e.g., clockwise direction) from the second position (dashed lines) back to the first position or another position either before or beyond the first position. Movement by the counter-balance body 300 relative to the IPB 200 in the second direction away from the second position (dashed lines) causes the CM of the robot 100 to shift and raise away from the ground surface 12. Thus, increasing the rotational angle $\theta_{CBB}$ of the counter-balance body 300 relative to the vertical gravitational axis $V_g$ may cause the CM of the robot 100 to lower toward the ground surface 12, while decreasing the rotational angle $\theta_{CBB}$ of the counter-balance body 300 relative to the vertical gravitational axis $V_g$ may cause the CM of the robot 100 to raise away from the ground surface 12 and/or shift forward or backward relative to the point of contact between the drive wheels 500 and the ground surface 12. In some examples, the longitudinal axis $L_{CBB}$ of the counter-balance body 300 is coincident with the vertical gravitational axis $V_g$. The counter-balance body 300 may oscillate between movements in the first and second directions to create the wagging movement. The rotational velocity of the counter-balance body 300 when moving relative to the IPB 200 may be constant or changing (accelerating or decelerating) depending upon how quickly the pose P of the robot 100 needs to be altered for dynamically balancing the robot 100.

The first position (solid lines) associated with $L_{CBB1}$ and the second position (dashed lines) associated with $L_{CBB1}$ of the counter-balance body 300 of FIG. 1C are depicted as exemplary positions only, and are not intended to represent a complete range of motion of the counter-balance body 300 relative to the IPB 200. For instance, in other examples, the counter-balance body 300 may move/pitch around the lateral axis (y-axis) in the first direction (e.g., counter-clockwise direction) to positions having rotational angles $\theta_{CBB}$ greater than the second rotational angle $\theta_{CBB2}$ associated with the second position (dashed lines) and/or in the second direction (e.g., clockwise direction) to positions having rotational angles $\theta_{CBB}$ less than the first rotational angle $\theta_{CBB1}$ associated with the first position (solid lines). Moreover, the counter-balance body 300 may move/pitch around the lateral axis (y-axis) relative to the IPB 200 at any position between the first position (solid lines) and the second position (dashed lines) shown in FIG. 1C.

Referring back to FIGS. 1A and 1B, the at least one leg 400 includes a right leg 400a and a left leg 400b. The right leg 400a includes a corresponding first end 410, 410a rotatably coupled to the second end portion 220 of the IPB 200 and a corresponding second end 420, 420a rotatably coupled to a corresponding right drive wheel 500, 500a. A right hip joint 412 may rotatably couple the first end 410a of the right leg 400a to the second end portion 220 of the IPB 200 to allow at least a portion of the right leg 400a to move/pitch around the lateral axis (y-axis) relative to the IPB 200. A leg actuator 413 associated with the hip joint 412 may cause an upper portion 401, 401a of the right leg 400a to move/pitch around the lateral axis (y-axis) relative to the IPB 200. In some configurations, the right leg 400a includes the corresponding upper portion 401, 401a and a corresponding lower portion 402, 402a. The upper portion 401a may extend from the hip joint 412 at the first end 410a to a corresponding knee joint 414 and the lower portion 402a may extend from the knee joint 414 to the second end 420a.

The right leg 400a may include a corresponding right ankle joint 422, 422a configured to rotatably couple the right drive wheel 500a to the second end 420a of the right leg 400a. Here, the right ankle joint 422a may be associated with a wheel axle coupled for common rotation with the right drive wheel 500a and extending substantially parallel to the lateral axis (y-axis). The right drive wheel 500a may include a corresponding torque actuator (drive motor) 510, 510a configured to apply a corresponding axle torque $T_a$ (FIG. 1B) for rotating the right drive wheel 500a about the ankle joint 422a to move the right drive wheel 500a across the ground surface 12 along the fore-aft axis (x-axis). For instance, the axle torque $T_a$ may cause the right drive wheel 500a to rotate in a first direction for moving the robot 100 in a forward direction along the fore-aft axis (x-axis) and/or cause the right drive wheel 500a to rotate in an opposite second direction for moving the robot 100 in a rearward direction along the fore-aft axis (x-axis).

The left leg 400b similarly includes a corresponding first end 410, 410b rotatably coupled to the second portion 220 of the IPB 200 and a corresponding second end 420, 420b rotatably coupled to a corresponding left drive wheel 500, 500b. A corresponding hip joint 412 may rotatably couple the first end 410b of the left leg 400b to the second end portion 220 of the IPB 200 to allow at least a portion of the left leg 400b to move/pitch around the lateral axis (y-axis) relative to the IPB 200. A corresponding leg actuator 413 associated with the left hip joint 412 may cause a corresponding upper portion 401, 401b of the left leg 400b to move/pitch around the lateral axis (y-axis) relative to the IPB 200. As with the right leg 400a, the left leg 400b may include the corresponding upper portion 401, 401b and a corresponding lower portion 402, 402b. The upper portion 401b may extend from the hip joint 412 at the first end 410b to a corresponding knee joint 414 and the lower portion 402b may extend from the knee joint 414 to the second end 420b.

The left leg 400b may include a corresponding left ankle joint 422, 422b configured to rotatably couple the left drive wheel 500b to the second end 420b of the left leg 400b. Here, the left ankle joint 422b may be associated with a wheel axle coupled for common rotation with the left drive wheel 500b and extending substantially parallel to the lateral axis (y-axis). As with the right drive wheel 500a, the left drive wheel 500b may include a corresponding torque actuator (e.g., drive motor) 510b configured to apply a corresponding axle torque $T_a$ for rotating the left drive wheel 500b about the ankle joint 422b to move the left drive wheel 500b across the ground surface 12 along the fore-aft axis (x-axis). For instance, the axle torque $T_a$ may cause the left drive wheel 500b to rotate in the first direction for moving the robot 100 in the forward direction along the fore-aft axis (x-axis) and/or cause the left drive wheel 500b to rotate in the opposite second direction for moving the robot 100 in the rearward direction along the fore-aft axis (x-axis).

The corresponding axle torques $T_a$ applied to each of the drive wheels 500a, 500b may vary to maneuver the robot 100 across the ground surface 12. For instance, an axle torque Tax applied to the right drive wheel 500a that is greater than an axle torque Tat applied to the left drive wheel 500b may cause the robot 100 to turn to the left, while applying a greater axle torque $T_a$ to the left drive wheel 500b than to the right drive wheel 500a may cause the robot 100 to turn to the right. Similarly, applying substantially the same magnitude of axle torque $T_a$ to each of the drive wheels 500a, 500b may cause the robot 100 to move substantially straight across the ground surface 12 in either the forward or reverse directions. The magnitude of axle torque $T_a$ applied to each of the drive wheels 500a, 500b also controls velocity of the robot 100 along the fore-aft axis (x-axis). Optionally, the drive wheels 500a, 500b may rotate in opposite directions to allow the robot 100 to change orientation by swiveling on the ground surface 12. Thus, each axle torque $T_a$ may be applied to the corresponding drive wheel 500 independent of the axle torque $T_a$ (if any) applied to the other drive wheel 500.

FIG. 1B shows the right ankle joint 422a (e.g., wheel axle) rotatably coupling the right drive wheel 500a to the second end 420a of the right leg 400a and exerting an axle force Fa. The left ankle joint 422b similarly exerts a corresponding axle force Fa (not shown). The axle forces Fa may assist in adjusting the pose P of the robot 100 and/or be controlled for balancing the robot 100. The axle force Fa is generated based on a magnitude of horizontal force $F_x$ exerted on the corresponding ankle joint 422 along the fore-aft axis (x-axis), a magnitude of vertical force $F_z$ exerted on the corresponding ankle joint 422 along a vertical axis (z-axis), and the magnitude of axle torque $T_a$ applied by the corresponding torque actuator 510 to the correspond corresponding wheel 500.

In some implementations, each leg 400 has a variable length extending between the first and second ends 410, 420 of the corresponding leg 400. For instance, the lower portion 402 of each leg 400 may rotate relative to the corresponding upper portion 401 about the knee joint 414 to enable the leg 400 to retract and expand. Referring to FIG. 1B, rotation by the lower portion 402 about the knee joint 414 relative to the upper portion 401 in the counter-clockwise direction may cause the leg 400 to retract. At the same time, the upper portion 401 may rotate about the hip joint 412 relative to the IPB 200 in the clockwise direction to cause the leg 400 to retract. Similarly, rotation by the lower portion 402 about the knee joint 414 relative to the upper portion 401 in the clockwise direction and/or rotation by the upper portion 401 about the hip joint 412 relative to the IPB 200 in the counter-clockwise direction may cause the leg 400 to expand. As used herein, retracting the length of the leg 400 may cause a height of the corresponding leg 400 with respect to the ground surface 12 to reduce while expanding the length of the leg 400 may cause the height of the corresponding leg 400 with respect to the ground surface 12 to increase. In some examples, the height of the leg 400 is defined as a distance along the vertical axis (z-axis) between the ground surface 12 (or the corresponding ankle joint 422) supporting the robot 100 and the corresponding knee joint 414. In other examples, the height of the leg 400 is defined as a distance along the vertical axis (z-axis) between the ground surface 12 (or the corresponding ankle joint 422) and the corresponding hip joint 412 rotatably coupling the corresponding first end 410 of the leg 400 to the second end portion 220 of the IPB 200.

In some implementations, retracting the length of both legs 400 causes an overall height of the robot 100 to decrease while expanding the length of both legs 400 causes the overall height of the robot 100 to increase. For instance, the robot 100 may need to lower, for example by crouching, to clear obstacles such as, without limitation, doorways, overhangs, light fixtures, or ceilings. It may also be desirable to lower the robot 100 to shift the CM downward to increase stability in certain scenarios. On the other hand, an increase to the overall height of the robot 100 may be required to reach or place a target object on a shelf Altering the height of the robot 100 simultaneously alters the pose P, and may cause substantive shifts in the CM of the robot 100 that require actuation of the counter-balance body 300 to move relative to the IPB 200 to maintain balance of the robot 100. The heights of the legs 400 may be dynamically controlled to target heights to assist with turning maneuvers as the robot 100 traverses along the ground surface 12. For instance, dynamically adjusting the height of each leg 400 independently from one another may allow the robot 100 to lean and bank into turns, thereby enhancing maneuverability of the robot 100 while traversing across the ground surface 12.

Referring back to FIG. 1A, retracting and expanding the length of each leg 400 may be controlled via a corresponding actuator 415 proximate the hip joint 412, a pair of pulleys (not shown) disposed proximate the hip joint 412 and the knee joint 414, and a timing belt (not shown) synchronizing rotation of the pulleys. Each leg may include a linear actuator or a rotational actuator. Here, the actuator associated with each leg may rotate the corresponding upper portion 401 relative to the IPB 200 and drive the belt 417 in one direction to prismatically extend/expand the length of the leg 400 by causing the corresponding lower portion 402 to rotate about the knee joint 414 relative to the upper portion 401 in the clockwise direction (relative to the view of FIG. 1A). On the other hand, the actuator associated with each leg may rotate the corresponding upper portion 401 relative to the IPB 200 and drive the belt 417 in an opposite direction to prismatically retract the length of the leg 400 by causing the corresponding lower portion 402 to rotate about the knee joint 414 relative to the upper portion 401 in the counter-clockwise direction (relative to the view of FIG. 1A). The belt 417 may include a continuous loop extending along the upper portion 402 of each leg 400 or may include terminal ends each connected to a respective one of pulleys. The actuator 415 may include a ball-screw type actuator. In some examples, the actuator 415 and belt 417 employs a 2:1 belt coupling so that the lower portion 402 rotates about the knee joint 414 relative to the upper portion 401 at twice the angle of the rotation of the upper portion 401 about the hip joint 415, thereby causing the second end 420 of the leg 400 to move on a straight line equivalent to a linear rail. Optionally, instead of a two-link leg (e.g., upper and lower portions 401, 402), the at least one leg 400 may include a single link that prismatically extends/retracts linearly such that the second end 420 of the leg 400 prismatically moves away/toward the IPB 200 along a linear rail. Accordingly, the at least one leg 400 includes a prismatic leg having the first end 410 prismatically coupled to the second end portion 220 of the IPB 200 and configured to provide prismatic extension/retraction via actuation of the actuator 415 to rotate the belt 417 in corresponding first or second directions. In other configurations, the knee joint 414 may employ a corresponding rotational actuator for rotating the lower portion 402 relative to the upper portion 401 in lieu of the belt 417 driven by the belt drive actuator 415 disposed at or near the hip joint 412.

In some implementations, the robot 100 further includes one or more appendages, such as an articulated arm 600 disposed on the IPB 200 and configured to move relative to the IPB 200. The articulated arm 600 may have five-degrees of freedom. Moreover, the articulated arm 600 may be interchangeably referred to as a manipulator arm, a manipulator head, or simply an appendage. While FIGS. 1A-1E show the articulated arm 600 disposed on the second end portion 220 of the IPB 200, the articulated arm 600 may be disposed on the first end portion 210 of the IPB 200 in other configurations. The articulated arm 600 extends between a proximal first end 610 and a distal second end 620. Referring to FIG. 1B, the first end 610 connects to the IPB 200 at a first articulated arm joint $J_0$ 650. The first articulated arm joint $J_0$ 650 may be disposed between the left and right hip joints 412 to center the articulated arm 600 between the left and right sides of the IPB 200. In some examples, the first articulated arm joint $J_0$ 650 rotatably couples the proximal first end 610 of the articulated arm 600 to the IPB 200 to enable the manipulator arm 600 to rotate relative to the IPB 200. For instance, the articulated arm 600 may move/pitch about the lateral axis (y-axis) relative to the IPB 200. A rotational actuator 652 (e.g., manipulator head actuator) may be positioned at or near the first articulated arm joint $J_0$ 650 for rotating the articulated arm 600 (e.g., manipulator head) about the lateral axis (y-axis). The rotational actuator 652 may include an electric motor, electro-hydraulic servo, piezo-electric actuator, solenoid actuator, pneumatic actuator, or other actuator technology suitable for accurately effecting movement of the articulated arm 600.

In some scenarios, the articulated arm 600 rotates at the first articulated arm joint $J_0$ 650 about the lateral axis (y-axis) relative to the IPB 200 in the direction of gravity (e.g., in the clockwise direction relative to the view of FIG. 1B) to lower the CM of the robot 100. The robot 100 may lower the CM closer to the ground surface while executing turning maneuvers. The counter-balance body 300 may also simultaneously rotate about the lateral axis (y-axis) relative to the IPB 200 in the direction of gravity (e.g., in the counter-clockwise direction relative to the view of FIG. 1B) to assist in lowering the CM of the robot 100. Here, the articulated arm 600 and the counter-balance body 300 may cancel out any shifting in the CM of the robot 100 in the forward or rearward direction along the fore-aft axis (x-axis), while still effectuating the CM of the robot 100 shift downward closer to the ground surface 12.

An end effector 700 may be disposed on the distal second end 620 of the manipulator arm 600. The end effector 700 may include one or more actuators 702 (grippers) that may be configured to grip and manipulate a target object. Additionally or alternatively, the end effector 700 may employ a vacuum device and/or one or more suction cups 704 (FIG. 1A) configured to apply suction for gripping and holding a target object when the end effector 700 is positioned on the target object. FIG. 1B shows the end effector 700 exerting a corresponding end effector force Fee. The manipulator arm 600 and/or the end effector 700 may include perception sensors for identifying objects in relation to the robot 100.

The articulated arm 600 may include two or more portions. In the examples shown in FIGS. 1A-1C, the articulated arm 600 includes a first portion 601, a second portion 602, and a third portion 603. The first portion 601 may extend between the proximal first end 610 connected to the IPB 200 via the first articulated arm joint $J_0$ 650 and a second articulated arm joint $J_1$ 660. The second portion 602 may extend between the second articulated arm joint $J_1$ 660 and a third articulated arm joint $J_2$ 670. The third portion 603 may extend between the third articulated arm joint $J_2$ 670 and the distal second end 620 of the articulated arm 600 that connects to the end effector 700. As with the first articulated arm joint $J_0$ 650, the second and third articulated arm joints $J_1$ 660, $J_2$ 670 may each be associated with a corresponding actuator 662, 672 configured to move each portion 602, 603 relative to one another and relative to the IPB 200. For instance, the rotational actuator 652 associated with the first articulated arm joint $J_0$ 650 may cause the first portion 601 of the articulated arm 600 to move/pitch about the lateral axis (y-axis) relative to the IPB 200. As the second and third portions 602, 603 of the articulated arm 600 are connected to the first portion 601 via the second and third articulated arm joints $J_1$ 660, $J_2$ 670, the rotation by the first portion 601 about the lateral axis (y-axis) at the first articulated arm joint $J_0$ 650 may also cause the second and third portions 602, 603 to simultaneously move relative to the IPB 200.

Similarly, the rotational actuator 662 associated with the second articulated arm joint $J_1$ 660 may cause the second portion 602 of the articulated arm 600 to move/pitch about the lateral axis (y-axis) relative to both the IPB 200 and the first portion 601 of the articulated arm 600. Moreover, the rotational actuator 672 associated with the third articulated arm joint $J_2$ 670 may cause the third portion 603 of the articulated arm 600 to move/pitch about the lateral axis (y-axis) relative to the IPB 200 and the first and second portions 601, 602 of the articulated arm 600. The actuators 652, 662, 672 may be controlled independently of one another to move the corresponding portions 601, 602, 603 alone or in concert for positioning the end effector 700 on a target object and/or altering the pose P of the robot 100.

In some configurations, the counter-balance body 300 corresponds to a first counter-balance body 300 disposed on the first end portion 210 of the IPB 200 and the articulated arm 600 corresponds to a second counter-balance body 600 disposed on the second end portion 210 of the IPB 200. Similar to the first counter-balance body 300 discussed above, the articulated arm 600 may be configured to move relative to the IPB 200 for altering the pose P of the robot 100 by moving the CM of the robot 100 relative to the vertical gravitational axis $V_g$. For instance, the articulated arm 600 may generate/impart a moment $M_{AA}$ (rotational force) (FIG. 1B) at the first articulated arm joint $J_0$ based on a rotational angle of the articulated arm 600 relative to the vertical gravitational axis $V_g$. Thus, the articulated arm 600 may move relative to the IPB 200 to alter the pose P of the robot 100 by moving the CM of the robot 100 relative to the vertical gravitational axis $V_g$. In some configurations, a gyroscope could be disposed at the first articulated arm joint $J_0$ to impart the moment $M_{AA}$ (rotational force) for maintaining balance of the robot 100 in the upright position.

Figure 1D:
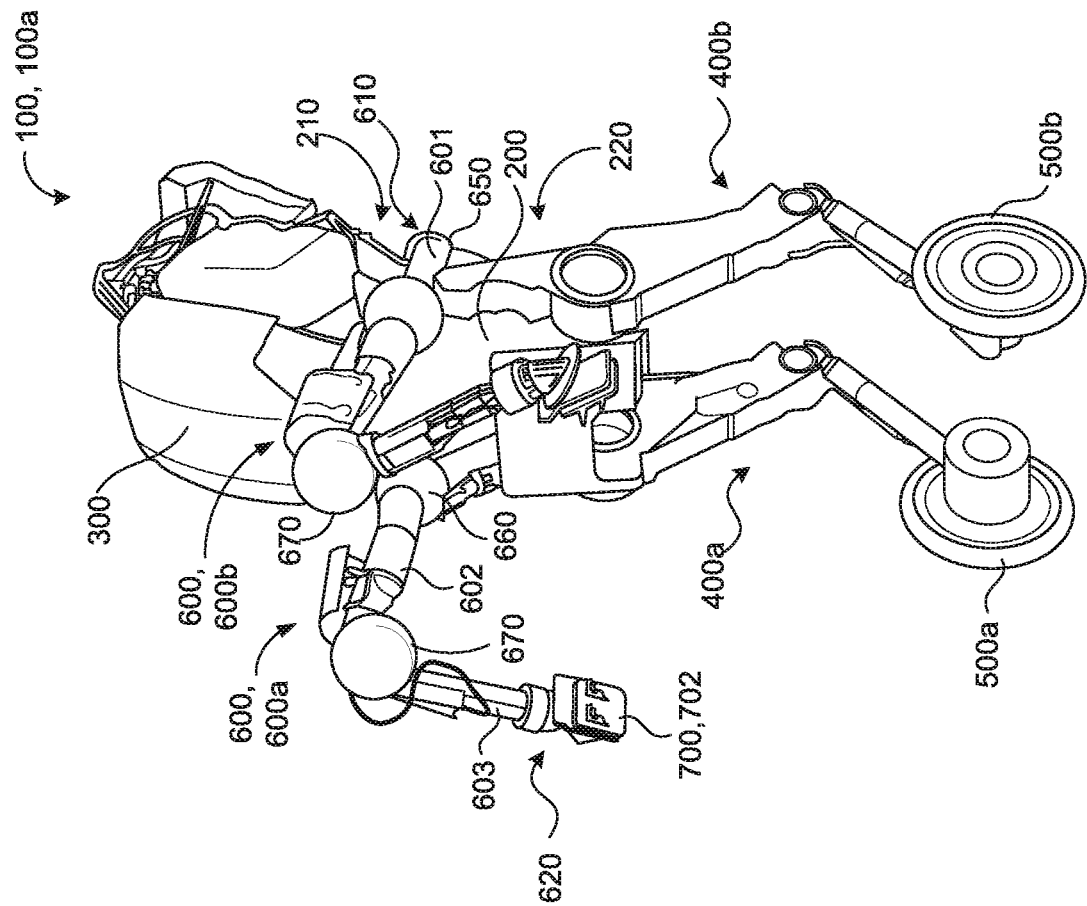
FIGS. 1D and 1E are schematic views showing an example robot having two appendages disposed on an inverted pendulum body.
Figure 1E:
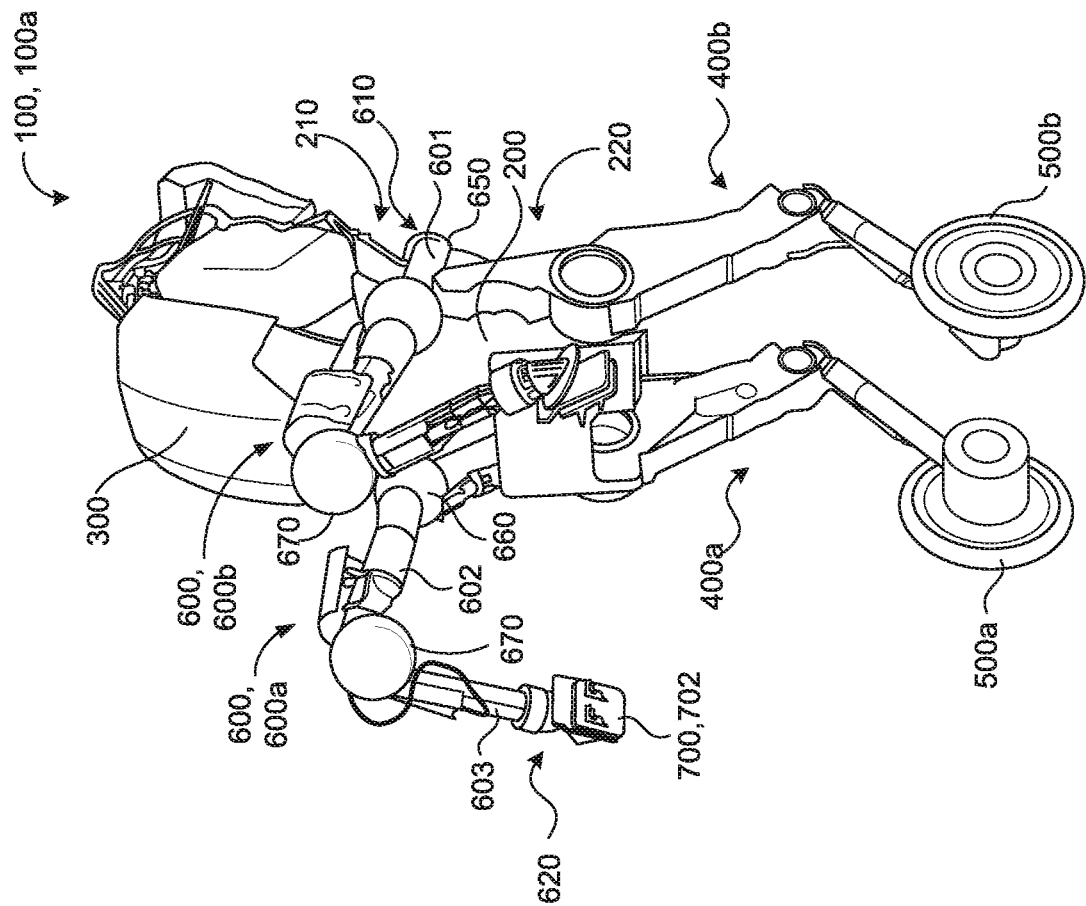

Referring to FIGS. 1D and 1E, in some implementations, the robot 100 includes left and right appendages (e.g., two articulated arms) 600a, 600b each disposed on the IPB 200 and configured to move relative to the IPB 200. The appendages 600a, 600b may be disposed on the first end portion 210 of the IPB 200 or the second end portion 220 of the IPB 200. As with the single articulated arm 600, each appendage 600a, 600b extends between a respective proximal first end 610 and a respective distal second end 620, and the first end 610 connects to the IPB 200 at a corresponding first articulated arm joint $J_0$ 650. Here, each first articulated arm joint $J_0$ 650 may be disposed on an opposite side of the IPB 200. Each appendage 600a, 600b may also include the one or more respective portions 601, 602, 603 connected by respective articulated arm joints $J_1$ 660, $J_2$ 670 as discussed above with reference to the single articulated arm 600 of FIGS. 1A-1C. Accordingly, each appendage 600a, 600b may be controlled to operate in substantially the same manner as the single articulated arm 600.

FIG. 1D shows the appendages 600a, 600b each having the corresponding first and second portions 601, 602 extending substantially parallel to one another and away from the IPB 200, while the corresponding third portion 603 extends substantially perpendicular to the first and second portions 601, 602 to point the corresponding distal second end 620 downward toward the ground surface 12. Here, the position of the appendages 600a, 600b may align the end effectors 700 and associated actuators 702 to grasp and carry an object. The appendages 600a, 600b could also point downward as shown in FIG. 1D for adjusting the moment of inertia about the vertical z-axis to assist with turning maneuvers. FIG. 1E shows the appendages 600a, 600b fully extended/deployed outward from the IPB 200 with each appendage 600a, 600b having the corresponding portions 601, 602, 603 substantially aligned with one another and extending substantially parallel to the ground surface 12. In some examples, the robot 100 may fully extend one or both of appendages 600a, 600b as shown in FIG. 1E for adjusting the moment of inertia about the vertical z-axis.

Referring back to FIG. 1C, the robot 100 includes a control system 10 configured to monitor and control operation of the robot 100. In some implementations, the robot 100 is configured to operate autonomously and/or semi-autonomously.

However, a user may also operate the robot by providing commands/directions to the robot 100. In the example shown, the control system 10 includes a controller 102 (e.g., data processing hardware), memory hardware 104, an inertial measurement unit 106, actuators 108, one or more sensors 110, and one or more power sources 112. The control system 10 is not limited to the components shown, and may include additional or less components without departing from the scope of the present disclosure. The components may communicate via wireless or wired connections and may be distributed across multiple locations of the robot 100. In some configurations, the control system 10 interfaces with a remote computing device and/or a user. For instance, the control system 10 may include various components for communicating with the robot 100, such as a joystick, buttons, wired communication ports, and/or wireless communication ports for receiving inputs from the remote computing device and/or user, and providing feedback to the remote computing device and/or user.

The controller 102 corresponds to data processing hardware that may include one or more general purpose processors, digital signal processors, and/or application specific integrated circuits (ASICs). In some implementations, the controller 102 is a purpose-built embedded device configured to perform specific operations with one or more subsystems of the robot 100. The memory hardware 104 is in communication with the controller 102 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to, inter alia, to store instructions (e.g., computer-readable program instructions), that when executed by the controller 102, cause the controller to perform numerous operations, such as, without limitation, altering the pose P of the robot 100 for maintaining balance, maneuvering the robot 100 across the ground surface 12, transporting objects, and/or executing a sit-to-stand routine. The controller 102 may directly or indirectly interact with the inertial measurement unit 106, the actuators 108, the sensor(s) 110, and the power source(s) 112 for monitoring and controlling operation of the robot 100.

The inertial measurement unit 106 is configured to measure an inertial measurement indicative of a movement of the robot 100 that results in a change to the pose P of the robot 100. The inertial measurement measured by the inertial measurement unit 106 may indicate a translation or shift of the CM of the robot 100 relative to the vertical gravitational axis $V_g$. The translation or shift of the CM may occur along one or more of the fore-aft axis (x-axis), the lateral axis (y-axis), or the vertical axis (z-axis). For instance, the inertial measurement unit 106 may detect and measure an acceleration, a tilt, a roll, a pitch, a rotation, or yaw of the robot 100, as the inertial measurement, using an initial pose P as an inertial reference frame. To detect and to measure, the inertial measurement unit 106 may include at least one of a tri-axial accelerometer, a tri-axial magnetometer, or a tri-axial gyroscope. The tri-axial accelerometer includes circuitry to sense the movement of the robot 100 between poses along a straight line or an axis, such as a position and an orientation of the inertial measurement unit 106. In some examples, the accelerometer may use a mass-spring system or a vibration system configured to determine an acceleration corresponding to a displacement of a mass in the mass-spring system or a stress related to a vibration in the vibration system. The inertial measurement unit 106 may also include a gyroscope, such as the tri-axial gyroscope, to measure a rate of rotation about a defined axis. The gyroscope is configured to sense rotation of the inertial measurement unit 106 such that a sensed rotation is a portion of the inertial measurement output to the controller 102. The controller 102 receives the inertial measurement of the inertial measurement unit 106 and determines shifts in the CM of the robot 100 relative to the vertical gravitational axis $V_g$. Thus, the gyroscope senses rotations of the robot 100 as the robot 100 moves with the gyroscope. The inertial measurement unit 106 may include more than one of the tri-axial accelerometer, the tri-axial magnetometer, or the tri-axial gyroscope to increase accuracy of the inertial measurement unit 106. In some examples, the inertial measurement unit 106 produces three dimensional measurements of a specific force and an angular rate. The inertial measurement unit 106 may also include a microprocessor.

The controller 102 is configured to process data relating to the inertial measurement unit 106, the actuators 108, and the sensor(s) 110 for operating the robot 100. The controller 102 receives an inertial measurement from the inertial measurement unit 106 (e.g., via a wired or wireless connection) disposed on the robot 100 and instructs actuation of at least one of the actuators 108 to alter a pose P of the robot 100 to move the CM of the robot 100 relative to the vertical gravitational axis $V_g$. In some examples, the controller 102 identifies changes in the inertial measurements between poses P and defines movements by at least one of the counter-balance body 300 or the articulated arm 600 for maintaining balance of the robot 100 by moving the CM relative to the vertical gravitational axis $V_g$.

The actuators 108 may include the tail actuator 352 connected to the tail 300 (e.g., counter-balance body), the leg actuators 413 each connected to the respective leg 400, the drive motors 510 each coupled to the respective drive wheel 500 of the corresponding leg 400, and the manipulator head actuator 652 connected to the manipulator head 600 (e.g., articulated arm). The tail actuator 352 is configured to move the tail 300 relative to the torso 200. For instance, the controller 102 may instruct actuation of the tail actuator 352 to move/pitch the tail 300 about the lateral axis (y-axis) relative to the torso 200. The manipulator head actuator 652 is configured to move the manipulator head 600 relative to the torso 200. For instance, the controller 102 may instruct actuation of the manipulator head actuator 652 to move/pitch the manipulator head 600 about the lateral axis (y-axis) relative to the torso 200. In some examples, the controller 102 actuates the manipulator head actuator 652 to operate the manipulator head 600 as a second counter-balance body for altering the pose P of the robot 100 by moving the CM of the robot 100 relative to the vertical gravitational axis $V_g$. The controller 102 may additionally or alternatively instruct actuation of at least one of the actuator 662 corresponding to the second articulated arm joint (e.g., second manipulator head joint) $J_1$ 660 or the actuator 662 corresponding to the third articulated arm joint (e.g., third manipulator head joint) $J_2$ 670 for moving at least one of the portions 601, 602, 603 of the manipulator head relative to one another and relative to the torso 200.

Each leg actuator 413 (disposed at or near the corresponding hip joint 412) is configured to rotate the upper portion 401 of the respective leg 400 relative to the torso 200. For instance, the controller 102 may instruct actuation of the leg actuator 413 or the actuator 415 associated with the right hip joint 412 to cause the upper portion 401 of the prismatic right leg 400a to move/pitch around the lateral axis (y-axis) relative to the tail 200. Similarly, the controller 102 may instruct actuation of the leg actuator 413 associated with the left hip joint 412 to cause the left leg 400b to move/pitch around the lateral axis (y-axis) relative to the tail 200. In some implementations, the actuators 108 further include the belt drive actuators 415 configured to drive the corresponding belts 417 when actuated by the controller 102. For instance, the controller 102 may instruct actuation of the belt drive actuator 415 in first/second directions to prismatically extend or retract a length of a respective prismatic leg 400 by causing a lower portion 402 of the prismatic leg 400 to rotate about the corresponding knee joint 414 relative to the corresponding upper portion 401. In some configurations, an actuator is disposed at the corresponding knee joint 414 in lieu of the belt drive actuator 415 for moving the lower portion 402 of the leg 400 relative to the upper portion 401.

Each drive motor 510 is configured to apply the corresponding axle torque (FIG. 1B) for rotating the respective drive wheel 500 about the corresponding ankle joint 422 to move the drive wheel 500 across the ground surface 12 along the fore-aft axis (x-axis). For instance, the axle torque $T_a$ may cause the drive wheel 500 to rotate in a first direction for moving the robot 100 in a forward direction along the fore-aft axis (x-axis) and/or cause the drive wheel 500 to rotate in an opposite second direction for moving the robot 100 in a rearward direction along the fore-aft axis (x-axis). The controller 102 may instruct actuation of each drive motor 510 via a corresponding axle torque command $T_{a\_cmd}$ that specifies a magnitude and direction of axle torque $T_a$ for the drive motor 510 to apply for rotating the respective drive wheel 500 in the forward or backward direction. Based on the inertial measurement received from the inertial measurement unit 106, the controller 102 may provide a corresponding axle torque command $T_{a\_cmd}$ to at least one of the drive motors 510 to instruct the drive motor 510 to apply the corresponding axle torque $T_a$ in order to control tilt to maintain or restore balance of the robot 100.

The sensor(s) 110 of the control system 10 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 110 may disposed on the robot 100 at various locations such as the torso 200, tail 300, the at least one leg 400, the drive wheel 500, the articulated arm 600, and/or the end effector 700. The sensors 110 are configured to provide corresponding sensor data to the controller 102 for monitoring and controlling operation of the robot 100 within an environment. In some examples, the controller 102 is configured to receive sensor data from sensors physically separated from the robot 100. For instance, the controller 102 may receive sensor data from a proximity sensor disposed on a target object the robot 100 is configured to locate and transport to a new location.

The sensor data from the sensors 110 may allow the controller 102 to evaluate conditions for maneuvering the robot 100, altering a pose P of the robot 100, and/or actuating various actuators 108 for moving/rotating mechanical components such as the counter-balance body 300, the at least one leg 400, the drive wheel 500 rotatably coupled to the at least one leg 400, the articulated arm 600, and the end effector 700. In some examples, the sensor data includes rotational positions of the back joint bk, 350, the hip joint(s) 412, and/or the articulated arm joints $J_0$ 650, $J_1$ 660, $J_2$ 670 used to indicate a state of at least one of the counter-balance body 300, the at least one leg 400, the articulated arm 600, or the end effector 700. In some examples, the robotic system 10 employs one or more force sensors to measure load on the actuators that move the counter-balance body 300, the at least one leg 400, the drive wheel 500 rotatably coupled to the at least one leg 400, the articulated arm 600, or the end effector 700. The sensors 110 may further include position sensors to sense states of extension, retraction, and/or rotation of the counter-balance body 300, the at least one leg 400, the drive wheel 500 rotatably coupled to the at least one leg 400, the articulated arm 600, or the end effector 700.

Other sensors 110 may capture sensor data corresponding to the terrain of the environment and/or nearby objects/obstacles to assist with environment recognition and navigation. For instance, some sensors 110 may include RADAR (e.g., for long-range object detection, distance determination, and/or speed determination) LIDAR (e.g., for short-range object detection, distance determination, and/or speed determination), VICON® (e.g., for motion capture), one or more imaging (e.g., stereoscopic cameras for 3D vision), perception sensors, a global positioning system (GPS) device, and/or other sensors for capturing information of the environment in which the robotic system 100 is operating.

In some implementations, the control system 10 includes one or more power sources 112 configured to power various components of the robot 100. The power sources 112 employed by the robot 100 may include, without limitation, a hydraulic system, an electrical system, energy storage device(s) (e.g. batteries), and/or pneumatic devices. For instance, one or more energy storage devices may provide power to various components (e.g., actuators 108) of the robot 100. The drive motors 510 may include electric motors that receive power from one or more energy storage devices. In some examples, the counter-balance body 300 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 100). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 100.

Figure 2:
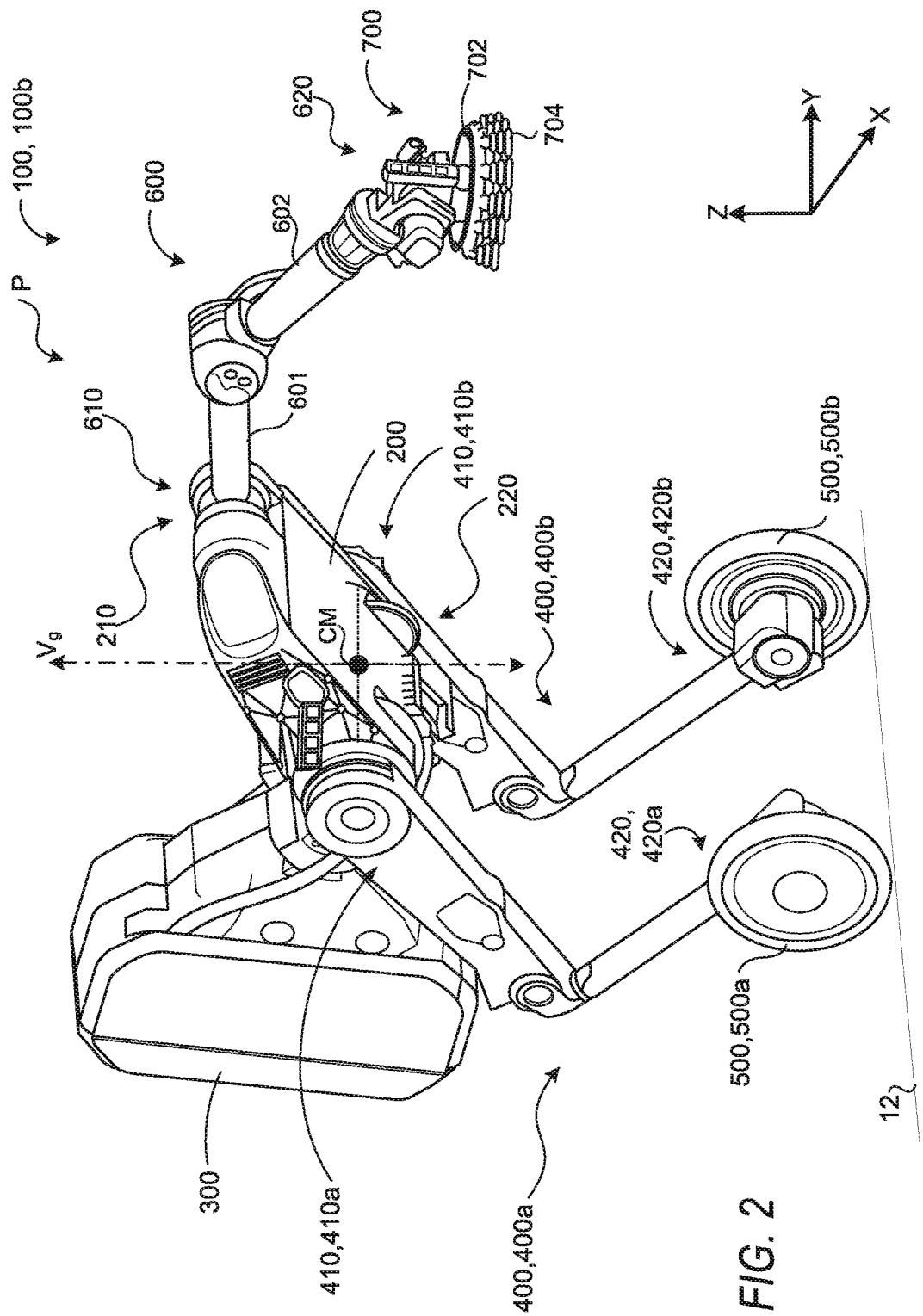
FIG. 2 is a schematic view of an example robot.

Referring to FIG. 2, in some implementations, a robot 100b includes an inverted pendulum body (IPB) 200, a counter-balance body 300 disposed on the IPB 200, at least one leg 400 having a first end 410 and a second end 420, and a drive wheel 500 rotatably coupled to the second end 420 of the at least one leg 400. In view of the substantial similarity in structure and function of the components associated with the robot 100a with respect to the robot 100b, like reference numerals are used herein after and in the drawings to identify like components.

As with the robot 100a of FIGS. 1A-1E, the robot 100b has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 includes the first end portion 210 and the second end portion 220. While the counter-balance body 300 of the robot 100a of FIGS. 1A-1E is disposed on the first end portion 210 of the IPB 200, the counter-balance body 300 of the robot 100b of FIG. 2 is disposed on the second end portion 220 of the IPB 200. In a similar fashion to the counter-balance body 300 of the robot 100a, the counter-balance body 300 of the robot 100b may pitch around a lateral axis (y-axis) that extends perpendicular to the gravitational vertical axis $V_g$ and a fore-aft axis (x-axis) of the robot 100 for altering a pose P of the robot 100b. For instance, the counter-balance body 300 may pitch relative to the gravitational vertical axis $V_g$ in a first direction for shifting the CM of the robot 100b towards the ground surface 12 and in an opposite second direction for shifting the CM of the robot 100b away from the ground surface 12. Accordingly, rotational movement by the counter-balance body 300 relative to the IPB 200 may be used for balancing and maintaining the robot 100b in an upright position.

The at least one leg 400 of the robot 100b may include the variable length right and left legs 400a, 400b each including a corresponding first end 410 rotatably/prismatically coupled to the second end portion 220 of the IPB 200 and a corresponding second end 420 rotatably coupled to a corresponding right drive wheel 500a, 500b. In a similar fashion to the robot 100a, the robot 100b may employ various actuators for altering the lengths of the legs 400a, 400b. For instance, a length/height of at least one of the legs 400a, 400b may be altered to lean the drive wheels 500a, 500b into a turning direction to assist with a turning maneuver.

With continued reference to FIG. 2, the robot 100b further includes an articulated arm 600 disposed on the IPB 200 and configured to move relative to the IPB 200. The articulated arm 600 may have five-degrees of freedom. By contrast to the robot 100a of FIGS. 1A-1E having the articulated arm 600 disposed on the second end portion 220 of the IPB 200, the robot 100b includes the articulated arm 600 disposed on the first end portion 210 of the IPB 200. The articulated arm 600 extends between a proximal first end 610 rotatably coupled to the IPB 200 and a distal second end 620. In the example shown, the articulated arm 600 includes two portion 601, 602 rotatable relative to one another and also the IPB 200; however, the articulated arm 600 may include more or less portions without departing from the scope of the present disclosure. An end effector 700 may be coupled to the distal second end 620 of the articulated arm 600 and may include one or more actuators 702 for gripping/grasping objects. The end effector 700 may optionally include one or more suction cups 704 configured to provide a vacuum seal between the end effector 700 and a target object to allow the articulated arm 600 to carry the target object.

The articulated arm 600 may pitch about the lateral axis (y-axis) relative to the IPB 200. For instance, the articulated arm may rotate about the lateral axis (y-axis) relative to the IPB 200 in the direction of gravity to lower the CM of the robot 100 while executing turning maneuvers. The counter-balance body 300 may also simultaneously rotate about the lateral axis (y-axis) relative to the IPB 200 in the direction of gravity to assist in lowering the CM of the robot 100b. Here, the articulated arm 600 and the counter-balance body 300 may cancel out any shifting in the CM of the robot 100b in the forward or rearward direction along the fore-aft axis (x-axis), while still effectuating the CM of the robot 100b shift downward closer to the ground surface 12.

Figure 3:
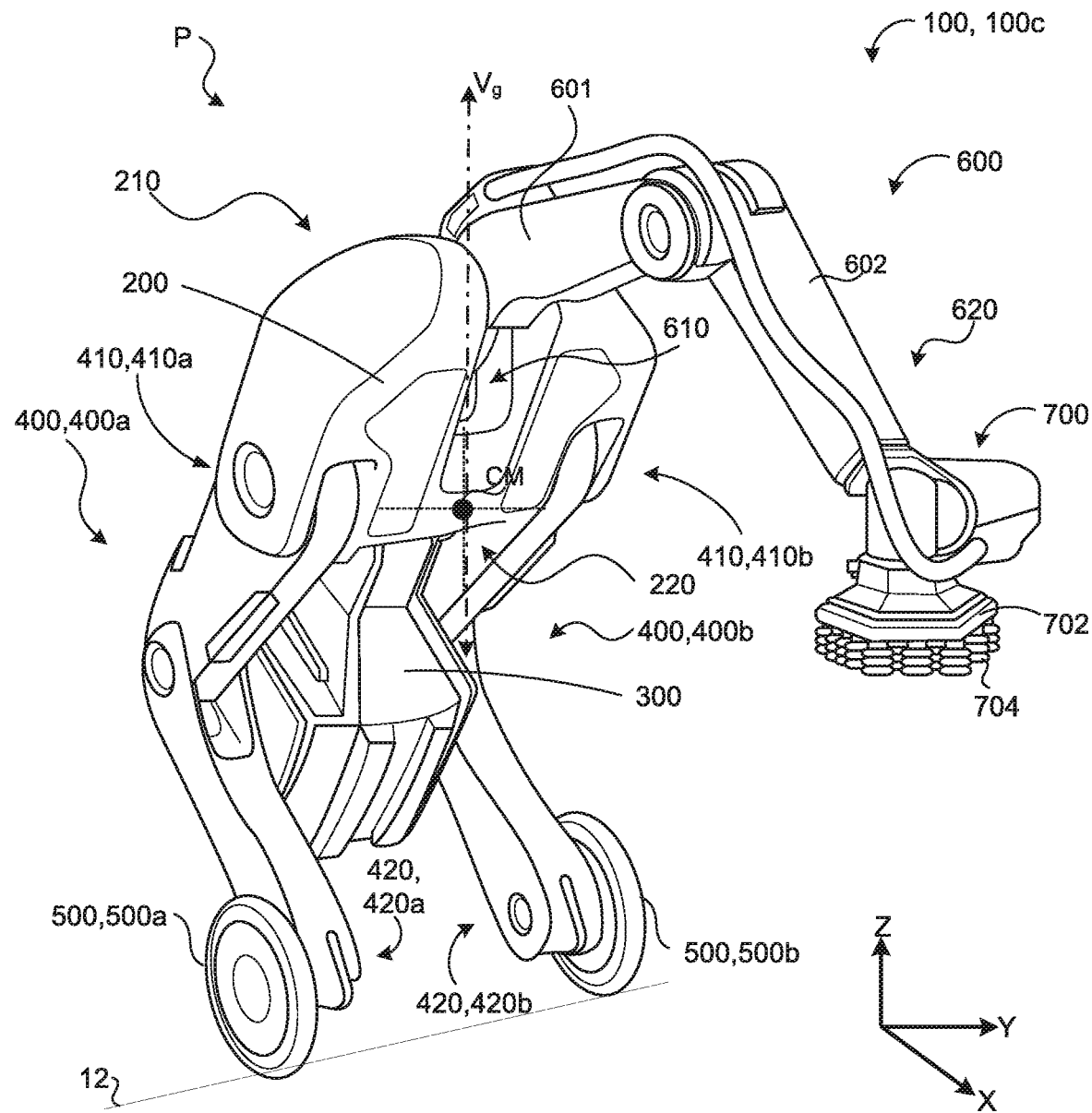
FIG. 3 is a schematic view of an example robot.

Referring to FIG. 3, in some implementations, a robot 100c includes an inverted pendulum body (IPB) 200, a counter-balance body 300 disposed on the IPB 200, at least one leg 400 having a first end 410 and a second end 420, and a drive wheel 500 rotatably coupled to the second end 420 of the at least one leg 400. In view of the substantial similarity in structure and function of the components associated with the robot 100a with respect to the robot 100b, like reference numerals are used herein after and in the drawings to identify like components.

As with the robot 100a of FIGS. 1A-1E, the robot 100c has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100c. The attitude of the robot 100 can be defined by an orientation or an angular position of an object in space.

The IPB 200 includes the first end portion 210 and the second end portion 220. While the counter-balance body 300 of the robot 100a of FIGS. 1A-1E is disposed on the first end portion 210 of the IPB 200, the counter-balance body 300 of the robot 100c of FIG. 3 is disposed on the second end portion 220 of the IPB 200. In a similar fashion to the counter-balance body 300 of the robot 100a, the counter-balance body 300 of the robot 100b may pitch around a lateral axis (y-axis) that extends perpendicular to the gravitational vertical axis $V_g$ and a fore-aft axis (x-axis) of the robot 100c for altering a pose P of the robot 100c. For instance, the counter-balance body 300 may pitch relative to the gravitational vertical axis $V_g$ in a first direction for shifting the CM of the robot 100b towards the ground surface 12 and in an opposite second direction for shifting the CM of the robot 100c away from the ground surface 12. Accordingly, rotational movement by the counter-balance body 300 relative to the IPB 200 may be used for balancing and maintaining the robot 100c in an upright position.

The at least one leg 400 of the robot 100c may include the variable length right and left legs 400a, 400b each including a corresponding first end 410 rotatably coupled to the second end portion 220 of the IPB 200 and a corresponding second end 420 rotatably coupled to a corresponding right drive wheel 500a, 500b. In a similar fashion to the robot 100a, the robot 100c may employ various actuators for altering the lengths of the legs 400a, 400b. For instance, a length/height of at least one of the legs 400a, 400b may be altered lean the drive wheels 500a, 500b into a turning direction to assist with a turning maneuver.

With continued reference to FIG. 3, the robot 100c further includes an articulated arm 600 disposed on the IPB 200 and configured to move relative to the IPB 200. The articulated arm 600 may have five-degrees of freedom. By contrast to the robot 100c of FIGS. 1A-1E having the articulated arm 600 disposed on the second end portion 220 of the IPB 200, the robot 100b includes the articulated arm 600 disposed on the first end portion 210 of the IPB 200. The articulated arm 600 extends between a proximal first end 610 rotatably coupled to the IPB 200 and a distal second end 620. In the example shown, the articulated arm 600 includes two portion 601, 602 rotatable relative to one another and also the IPB 200; however, the articulated arm 600 may include more or less portions without departing from the scope of the present disclosure. An end effector 700 may be coupled to the distal second end 620 of the articulated arm 600 and may include one or more actuators 702 for gripping/grasping objects. The end effector 700 may optionally include one or more suction cups 704 configured to provide a vacuum seal between the end effector 700 and a target object to allow the articulated arm 600 to carry the target object.

The articulated arm 600 may pitch about the lateral axis (y-axis) relative to the IPB 200. For instance, the articulated arm may rotate about the lateral axis (y-axis) relative to the IPB 200 in the direction of gravity to lower the CM of the robot 100c while executing turning maneuvers. The counter-balance body 300 may also simultaneously rotate about the lateral axis (y-axis) relative to the IPB 200 in the direction of gravity to assist in lowering the CM of the robot 100c. Here, the articulated arm 600 and the counter-balance body 300 may cancel out any shifting in the CM of the robot 100c in the forward or rearward direction along the fore-aft axis (x-axis), while still effectuating the CM of the robot 100b shift downward closer to the ground surface 12.

Figure 4:
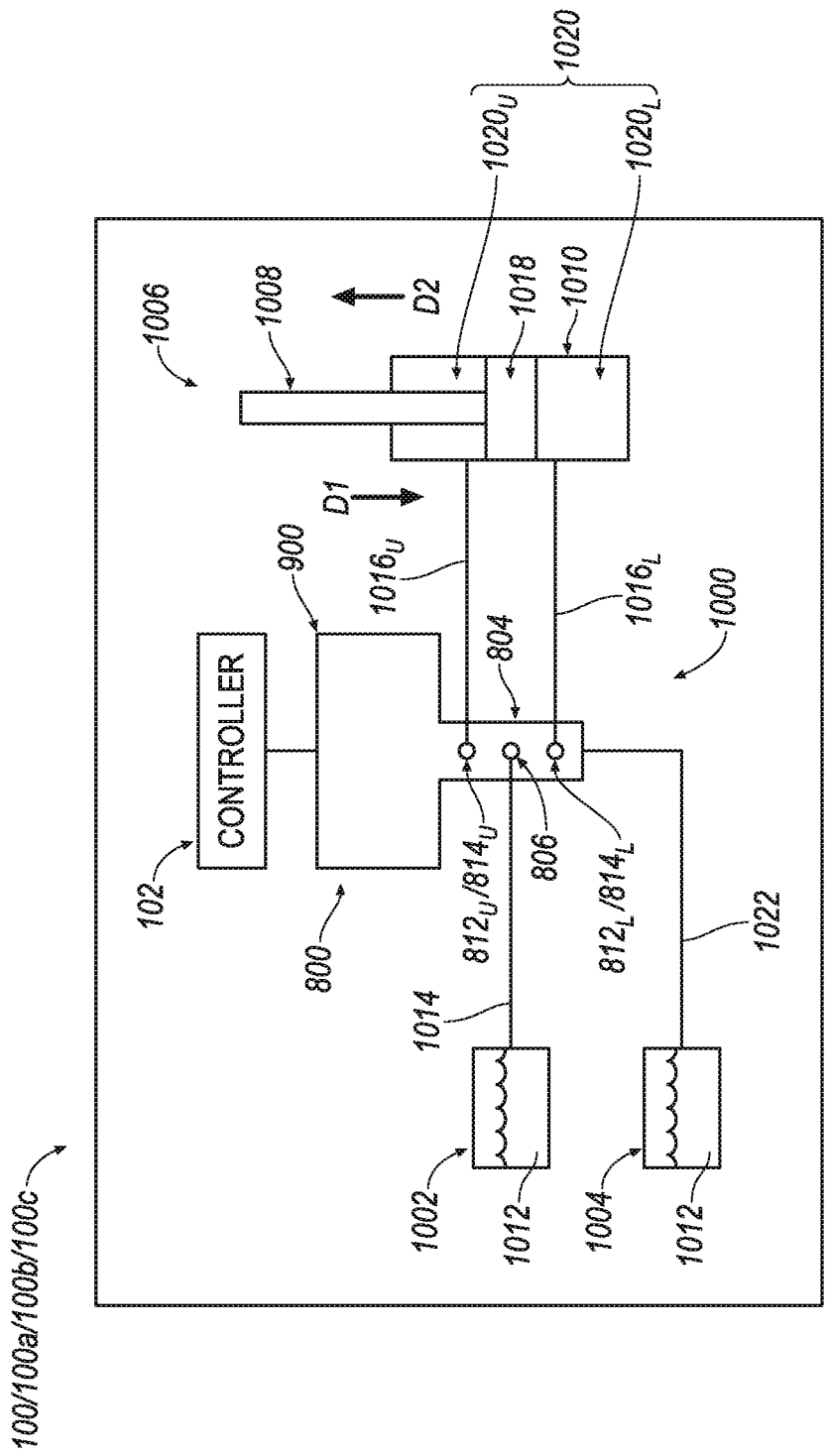
FIG. 4 is a plan view of an example hydraulic circuit including an example valve.

Referring to FIG. 4, a rotary valve assembly 900 receives commands from the controller 102 to control fluid flow through a hydraulic circuit 1000 for actuating a hydraulic actuator 1006. The rotary valve assembly 900 is a non-binary valve assembly that may be selectively arranged in a plurality different positions in order to meter or throttle a flow of hydraulic fluid 1012 as needed through the hydraulic circuit 1000. The hydraulic actuator 1006 may move one or more features of the robot 100, such as the leg(s) 400, arm 600, or counter-balance body 300. The rotary valve assembly 900 includes a rotary valve sub assembly 800 that forms a portion of the hydraulic circuit 1000. The rotary valve subassembly 800 is configured to provide the hydraulic actuator 1006 with bursts of high power (e.g., peak joint power) to enable the robot 100 to jump, run, lift/carry a load, etc.

Figure 5:
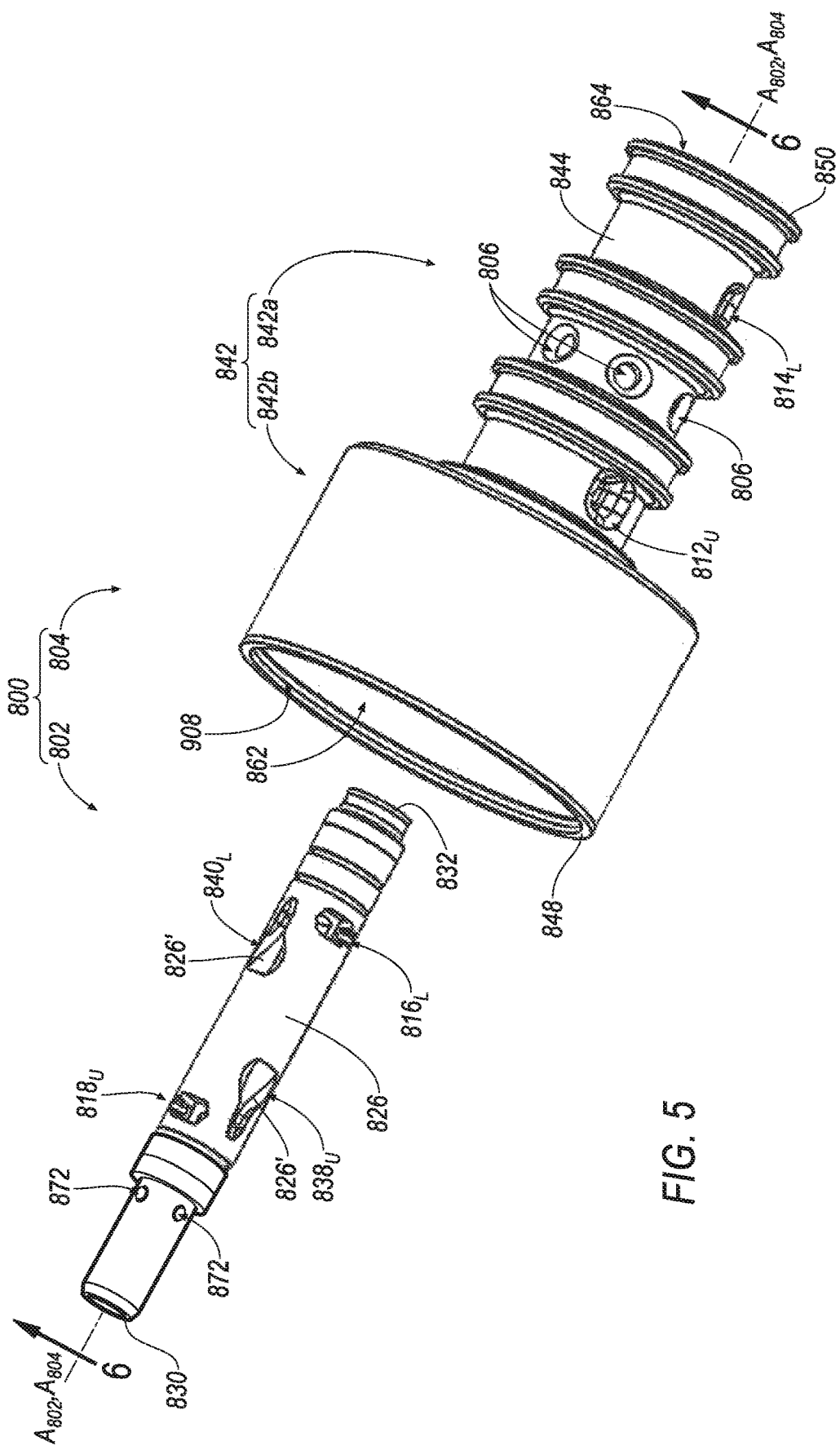
FIG. 5 is an exploded schematic view of an example valve.
Figure 6:
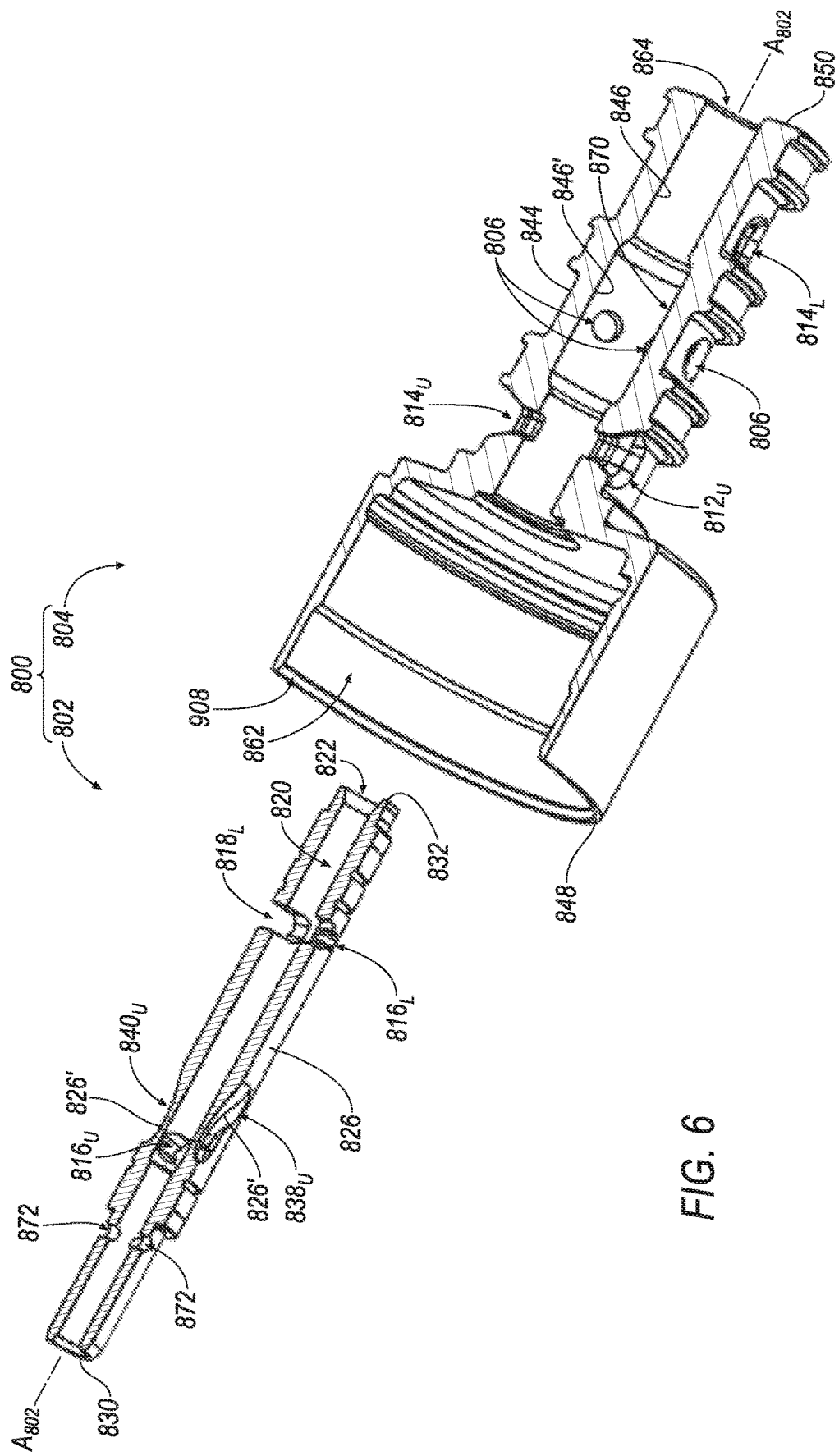
FIG. 6 is an exploded cross-sectional view of the valve according to line 6-6 of FIG. 5.
Figure 7:
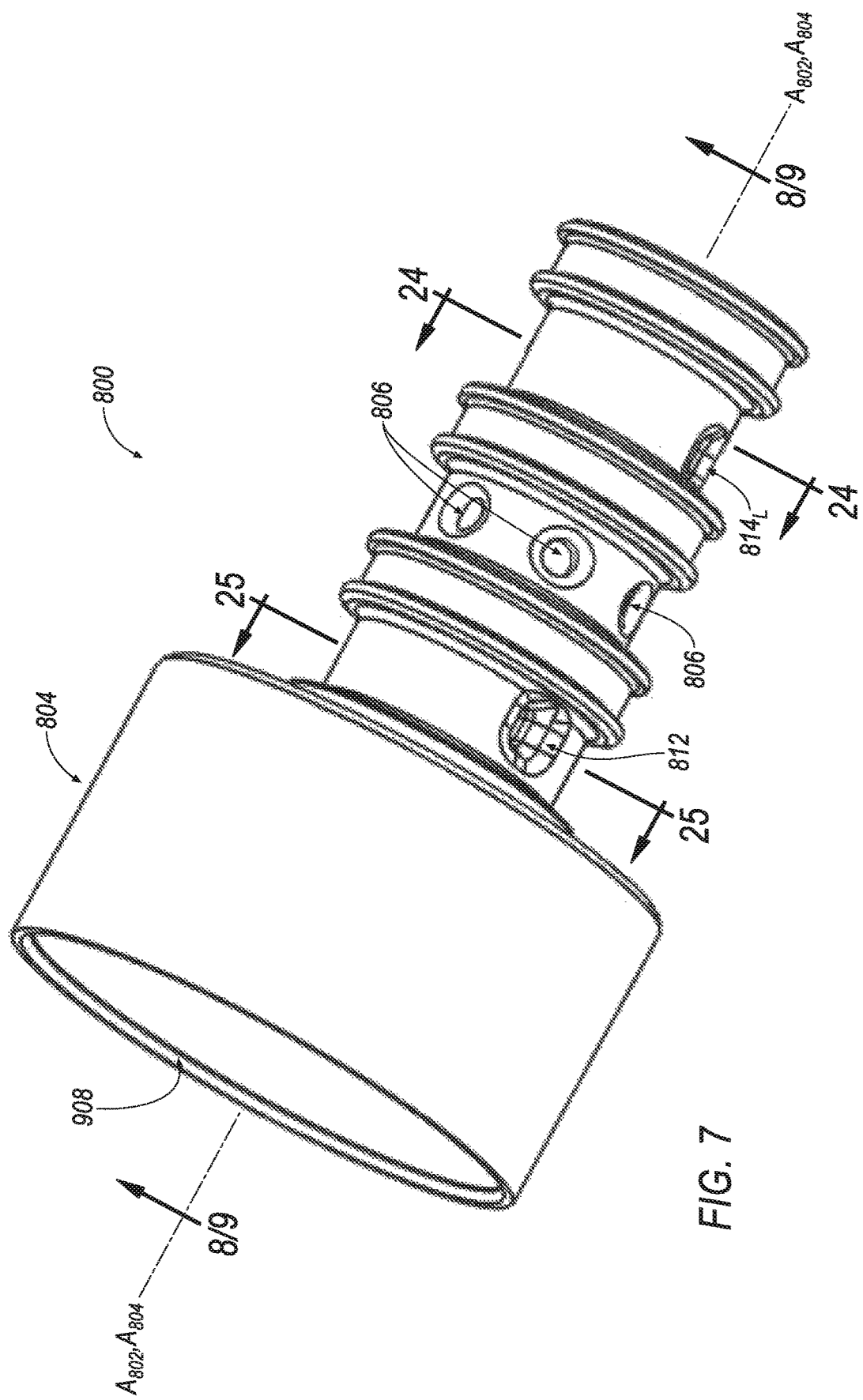
FIG. 7 is an assembled schematic view of the valve of FIG. 5.
Figure 8:
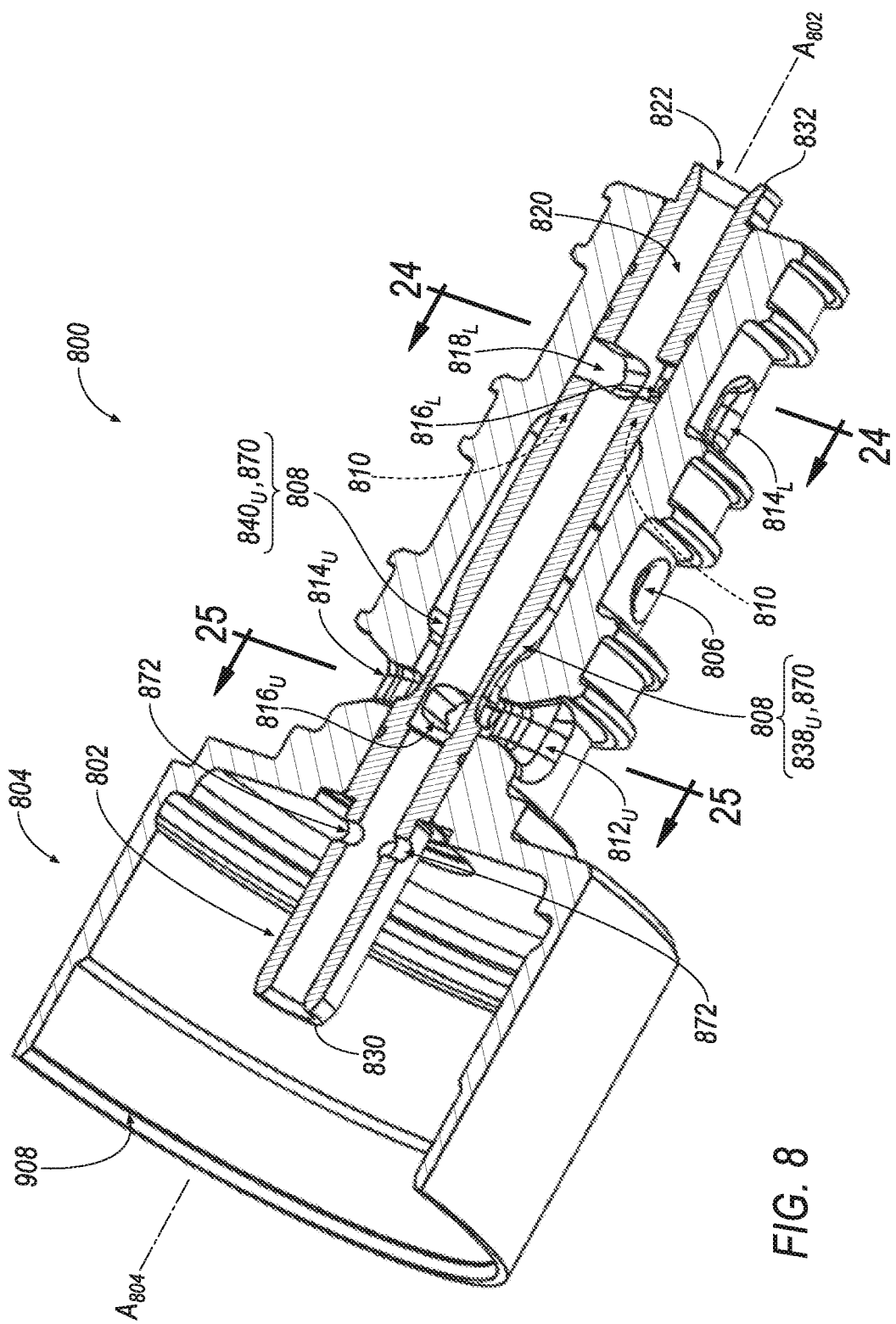
FIG. 8 is an assembled cross-sectional view of the valve according to line 8-8 of FIG. 7.

Referring to FIGS. 5-8, the rotary valve subassembly 800 includes a spool 802 (see also FIGS. 11-18) disposed in a sleeve 804 (see also FIGS. 19-23). FIG. 5 shows an exploded view of the rotary valve assembly 800 in which the spool 802 and the sleeve 804 are coaxial to one another when the spool 802 is disposed in the sleeve 804. Accordingly, a longitudinal axis $A_{804}$ defined by the sleeve 804 is collinear with a corresponding longitudinal axis $A_{802}$ defined by the spool 802 when the spool 802 is disposed within the sleeve 804. While disposed in the sleeve 804, the spool 802 is configured to rotate relative to the sleeve 804 about its longitudinal axis $A_{802}$ that is collinear with the longitudinal axis $A_{804}$ defined by the sleeve 804. The sleeve 804 may also be referred to as a "valve body". FIG. 6 shows an exploded cross-sectional view of the rotary valve subassembly 800 taken along line 6-6 of FIG. 5.

Referring back to FIG. 4, the hydraulic circuit 1000 includes a pressurized fluid source 1002, a low pressure fluid reservoir 1004, and the hydraulic actuator 1006. The rotary valve assembly 900 fluidly connects the pressurized fluid source 1002 and the low pressure fluid reservoir 1004 to the hydraulic actuator 1006. The rotary valve assembly 900 may be a manifold style four-way valve. The rotary valve assembly 900 may be alternatively referred to as a four-way hydraulic servo valve. In some examples, the rotary valve assembly 900 includes an electrically operated valve in communication with the controller 102 for controlling a flow of hydraulic fluid 1012 to the hydraulic actuator 1006. For instance, the rotary valve assembly 900 may receive an input signal from the controller 102 that instructs the rotary valve assembly 900 to direct the flow of hydraulic fluid 1012 to the hydraulic actuator 1006.

With reference to FIGS. 4-9, the hydraulic actuator 1006 may include a piston 1008 that linearly translates in a cylindrical body 1010 between a first axial direction D1 and an opposite second axial direction D2 based on rotational movement by the spool 802 relative to the sleeve 804 of the rotary valve assembly 900 about the longitudinal axis $A_{804}$. The piston 1008 includes a head 1018 that separates a chamber 1020 defined by the cylindrical body 1010 into a first sub-chamber $1020_U$ and a second sub-chamber $1020_L$. To move the piston 1008 in the first axial direction D1, the rotary valve assembly 900 directs a flow of pressurized fluid 1012 along a fluid supply line 1014 from the pressurized fluid source 1002 and into the first sub-chamber $1020_U$ via an upper fluid channel $1016_U$. Here, the pressurized fluid 1012 received by the first sub-chamber $1020_U$ causes the piston 1008 to move in the first axial direction D1. Conversely, to move the piston 1008 in the opposite second axial direction D2, the rotary valve assembly 900 directs a flow of pressurized fluid 1012 along the fluid supply line 1014 from the pressurized fluid source 1002 and into the second sub-chamber 10201, via a lower fluid channel $1016_L$.

The sleeve 804 defines one or more inlet ports 806 in fluid communication with the fluid supply line 1014 for receiving the flow of pressurized fluid 1012 from the pressurized fluid source 1002. The sleeve 804 includes an inner sidewall 846 (also referred to as an "inner side surface") that cooperates with an outer sidewall 826 (also referred to as an "outer side surface") of the spool 802 to define an upper cavity 808 and a lower cavity 810 of the rotary valve subassembly 800. The upper cavity 808 is disposed between the one or more inlet ports 806 of the sleeve 804 and an upper end surface 848 (FIGS. 5 and 6) of the sleeve 804, while the lower cavity 810 is disposed between the one or more inlet ports 806 of the sleeve 804 and a lower end surface 850 (FIGS. 5 and 6) of the sleeve 804. The upper cavity 808 and the lower cavity 810 are in fluid communication with one another to collectively form a unitary cavity. The sleeve 804 defines a length extending along the longitudinal axis $A_{804}$ between the upper end surface 848 and the lower end surface 850.

Proximate the upper cavity 808, the sleeve 804 further defines at least one upper control port $812_U$, $814_U$ in selective communication with the first sub-chamber $1020_U$ via the upper fluid channel $1016_U$. In the examples shown, the sleeve 804 defines first and second upper control port $812_U$, $814_U$ circumferentially spaced 180-degrees (180°) from one another, e.g., the first and second upper control ports $812_U$, $814_U$ are diametrically opposed. In these examples, the first and second upper control port $812_U$, $814_U$ are open, and thus, in fluid communication with the first sub-chamber $1020_U$, when the first and second upper control ports $812_U$, $814_U$ are each radially aligned with either one of first and second upper "scalloped" recesses $838_U$, $840_U$ (FIGS. 11-14) formed into the outer sidewall 826 of the spool 802. Here, the spool 802 may rotate relative to the sleeve 804 about the longitudinal axis $A_{804}$ into a first open position such that the first upper control port $812_U$ is radially aligned with one of the first upper scalloped recess $838_U$ or the second upper scalloped recess $840_U$ and the second upper control port $814_U$ is radially aligned with the other one of the first upper scalloped recess $838_U$ or the second upper scalloped recess $840_U$. Accordingly, when the spool 802 is in the first open position, the fluid 1012 received through the one or more inlet ports 806 and into the cavities 808, 810 is directed through the open first and second upper control ports $812_U$, $814_U$ and into the first sub-chamber $1020_U$ of the hydraulic actuator 1006 to move the piston 1008 in the first axial direction D1.

In some implementations, with continued reference to FIGS. 4-9, when the spool 802 is in the first open position for moving the piston 1008 in the first axial direction D1, the piston head 1018 displaces fluid 1012 out of the second sub-chamber $1020_L$ for return to the fluid reservoir 1004 through the hydraulic circuit 1000. Here, the second sub-chamber $1020_L$ is in fluid communication with at least one lower control port $812_L$, $814_L$ defined by the sleeve 804 proximate the lower cavity 810 to permit the hydraulic fluid 1012 to exit the second sub-chamber $1020_L$ and flow upstream along the lower fluid channel $1016_L$. The returned hydraulic fluid 1012 received through the at least one lower control port $812_L$, $814_L$ defined by the sleeve 804 is directed radially through at least one lower return pressure port $816_L$, $818_L$ formed through the spool 802 and into an axial chamber 820 defined by the spool 802. The axial chamber 802 extends along the longitudinal axis $A_{802}$ of the spool 802. Finally, the hydraulic fluid 1012 exits the rotary valve subassembly 800 via an axial exit port 822 of the axial chamber 820 and flows to the low pressure fluid reservoir 1004 via a fluid return line 1022 fluidly connecting the axial exit port 822 to the fluid reservoir 1004.

In the examples shown, the sleeve 804 defines first and second lower control port $812_L$, $814_L$ in selective fluid communication with the second sub-chamber $1020_L$ and circumferentially spaced 180-degrees (180°) from one another, e.g., the first and second lower control ports $812_L$, $814_L$ are diametrically opposed. In these examples, the first and second upper control port $812_U$, $814_U$ are open, and thus, in fluid communication with the second sub-chamber $1020_L$, when the first and second lower control port $812_L$, $814_L$ are each radially aligned with either one of first and second lower "scalloped" recesses $838_L$ $840_L$ (FIGS. 11-14) formed into the outer sidewall 826 of the spool 802. Here, the spool 802 may rotate relative to the sleeve 804 about the longitudinal A804 into a second open position such that the first lower control port $812_L$ is radially aligned with one of the first lower scalloped recess $838_L$ or the second lower scalloped recess $840_L$ and the second lower control port $814_L$ is radially aligned with the other one of the first lower scalloped recess $838_L$ or the second lower scalloped recess $840_L$. In some implementations, the second open position of the spool 802 is offset 90-degrees (90°) from the first open position of the spool 802. In these implementations, the first and second lower scalloped recesses $838_L$ $840_L$ are circumferentially spaced 180-degrees (180°) from one another and offset 90-degrees (90°) from each of the first and second upper scalloped recesses $838_U$, $840_U$. Accordingly, when the spool 802 is in the second open position, the fluid 1012 received through the one or more inlet ports 806 and into the cavities 808, 810 is directed through the lower control ports $812_L$, $814_L$ and into the second sub-chamber $1020_L$ of the hydraulic actuator 1006 to move the piston 1008 in the second axial direction D2.

In some implementations, with continued reference to FIGS. 4-9, when the spool 802 is in the second open position for moving the piston 1008 in the second axial direction D2, the piston head 1018 displaces fluid 1012 out of the first sub-chamber $1020_U$ for return to the fluid reservoir 1004 through the hydraulic circuit 1000. Here, the first sub-chamber $1020_U$ is in fluid communication with the at least one upper control port $812_U$, $814_U$ defined by the sleeve 804 proximate the upper cavity 808 to permit the hydraulic fluid 1012 to exit the first sub-chamber $1020_U$ and flow upstream along the upper fluid channel $1016_U$. The returned hydraulic fluid 1012 received through the at least one upper control port $812_U$, $814_U$ defined by the sleeve 804 is directed radially through at least one upper return pressure port $816_U$, $818_U$ formed through the spool 802 and into the axial chamber 820 defined by the spool 802. Finally, the hydraulic fluid 1012 exits the rotary valve subassembly 800 via the axial exit port 822 of the axial chamber 820 and flows to the low pressure fluid reservoir 1004 via the fluid return line 1022.

Referring to FIGS. 11-14, the spool 802 includes a tube-shaped body 824 having an outer sidewall 826 and an inner sidewall (also referred to as an "inner side surface") 828 disposed on an opposite side of the tube-shaped body 824 than the outer sidewall 826. The spool 802 defines a length $L_{802}$ extending along the longitudinal axis $A_{802}$ between, an upper end surface 830 of the tube-shaped body 824 and a lower end surface 832 of the tube-shaped body 824. Described in greater detail below, portions 826' of the outer sidewall 826 define the plurality of "scalloped" recesses $838_U$, $838_L$, $840_U$, $840_L$ each having a recessed edge profile 836. The recessed edge profile 836 provides each scalloped recess $838_U$, $838_L$, $840_U$, $840_L$ with a substantially "pear" shaped (also referred to as "clam" shaped) perimeter. Each scalloped recess $838_U$, $838_L$, $840_U$, $840_L$ further defines a depth $D_{836}$ extending radially from an outer periphery of the outer sidewall 826 toward the inner sidewall 828. In the examples shown, the portions 826' of the outer sidewall 826 defining each scalloped recess $838_U$, $838_L$, $840_U$, $840_L$ includes a constant depth portion $D_{836'}$ and a non-constant depth portion $D_{836''}$. The combination of the depth $D_{836}$ of each scalloped recess $838_U$, $838_L$, $840_U$, $840_L$ and the recessed edge profile 836 providing the pear-shaped perimeter advantageously enlarges an orifice area for the rotary valve assembly 900 to provide higher flow rates for actuating the hydraulic actuator 1006. Moreover, this geometry associated with the scalloped recesses $838_U$, $838_L$, $840_U$, $840_L$ imparts increased strength and stiffness to the spool 802 while providing smooth transitions (i.e., progressive, non-linear orifice area-to-spool position relationship) between various changes in orifice area (occurring between open and closed positions) of both the aforementioned control ports $812_U$, $812_L$, $814_U$, $814_L$ defined by the sleeve 804.

Figure 12:
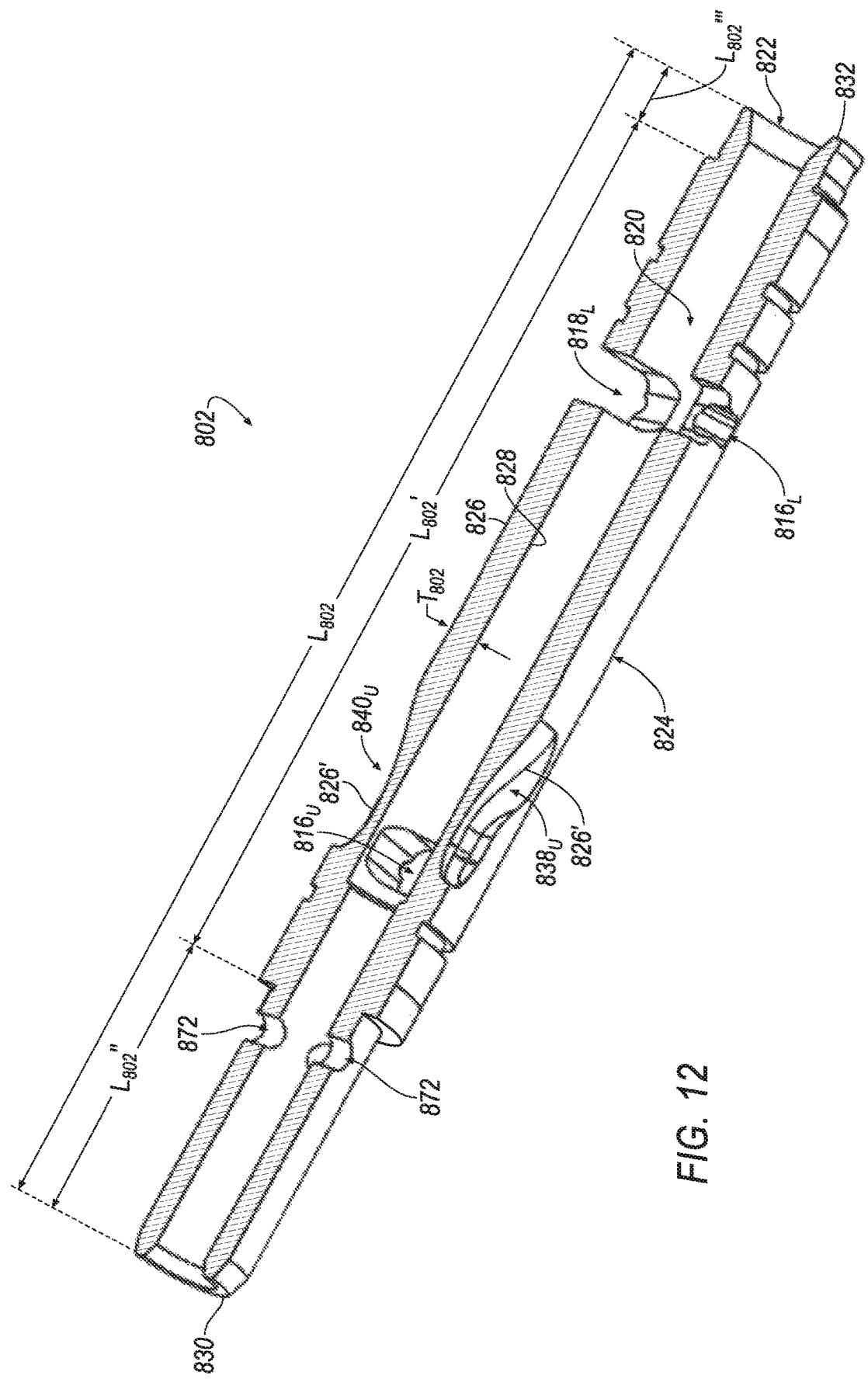
FIG. 12 is a cross-sectional view of the spool according to line 12-12 of FIG. 11.
Figure 13:
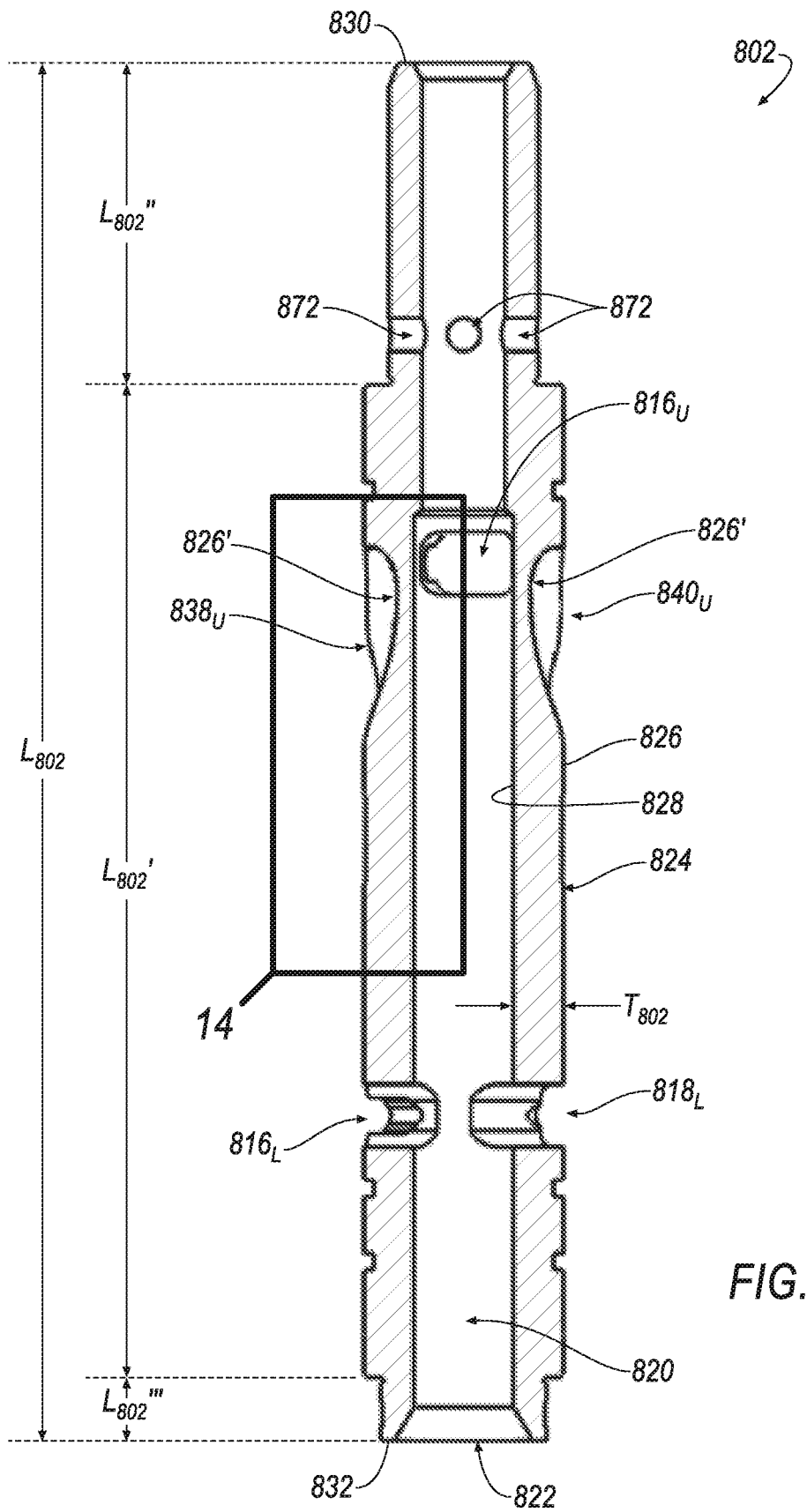
FIG. 13 is another cross-sectional view of the spool according to line 13-13 of FIG. 11.
Figure 14:
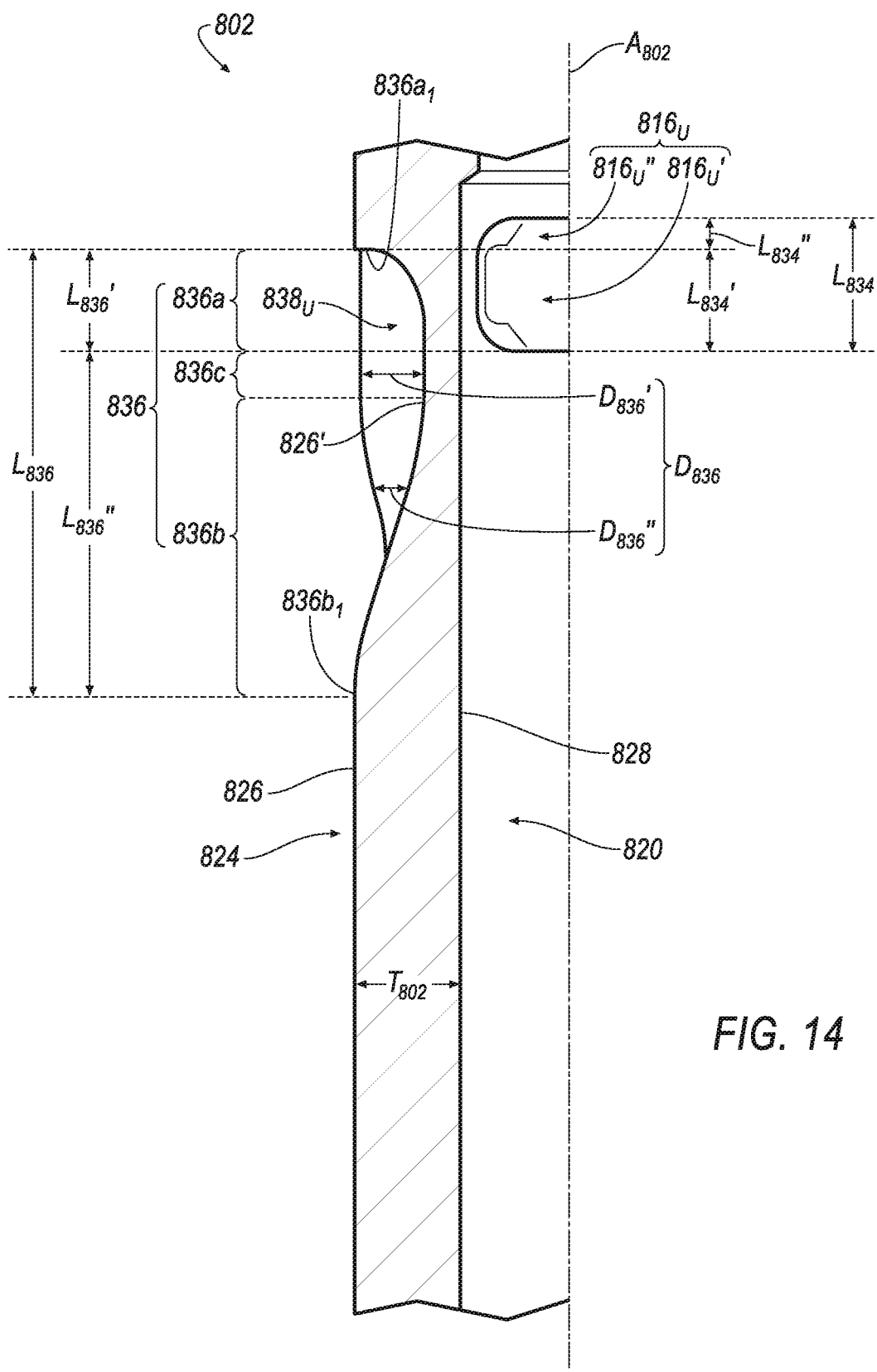
FIG. 14 is an enlarged cross-sectional view of the spool according to line 14 of FIG. 13.
Figure 15:
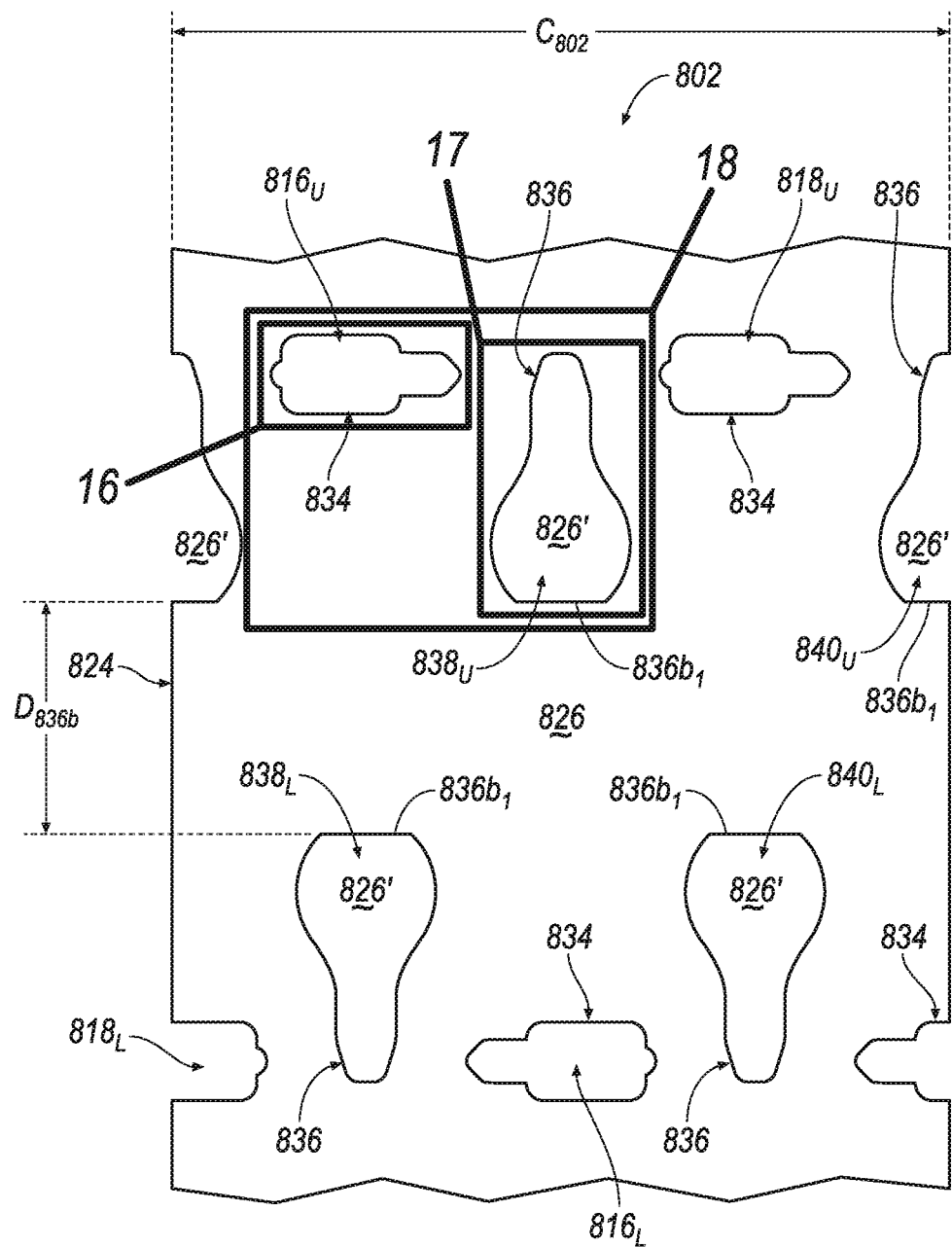
FIG. 15 is a plan view of a surface area of a side surface of the spool of FIGS. 11-14.
Figure 16:
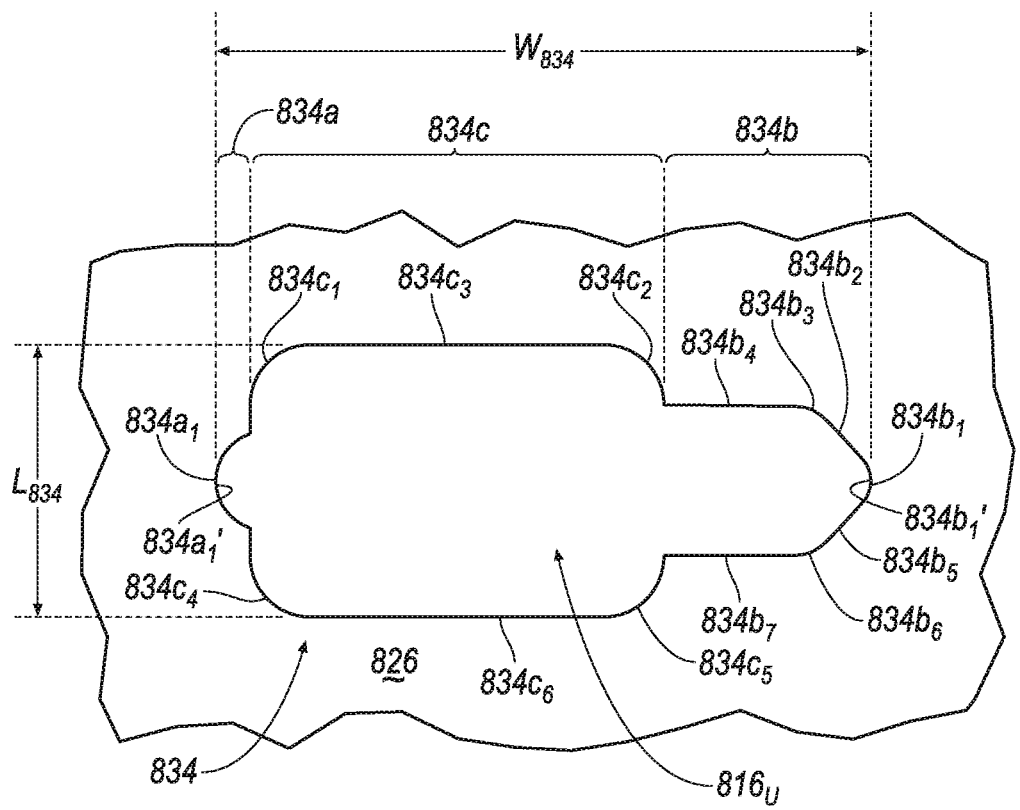
FIG. 16 is an enlarged view of a portion of the surface area of the side surface of spool according to line 16 of FIG. 15.

Referring to FIGS. 12-14, the spool 802 defines a thickness $T_{802}$ extending radially between the outer side surface 826 and the inner side surface 828 of the tube-shaped body 824. The inner side surface 828 of the tube-shaped body 824 circumscribes the axial chamber 820. The axial exit port 822 is formed through the lower end surface 832 and in fluid communication with the axial chamber 820. FIGS. 15 and 16 show each of the return pressure ports $816_U$, $816_L$, $818_U$, $818_L$ formed through the outer and inner sidewalls 826, 828 of the tube-shaped body 824 having a return pressure port edge profile 834. The return pressure port edge profile 834 associated with the shape of each return pressure port $816_U$, $816_L$, $818_U$, $818_L$ of the spool 802 extends through the thickness $T_{802}$ of the spool 802. FIG. 16 shows a detailed view of the first upper return pressure port 816U of FIG. 15 with the edge profile 814 having a width $W_{834}$ and a length $L_{834}$. The width $W_{834}$ extends along a portion of a circumference of the tube-shaped body 824 in a direction substantially perpendicular to the longitudinal axis $A_{802}$. The length $L_{834}$ extends in a direction substantially parallel to the longitudinal axis $A_{802}$.

Each return pressure port edge profile 834 includes a first portion 834a, a second portion 834b, and an intermediate portion 834c between the first portion 834a and the second portion 834b. The intermediate portion 834c may also be referred to as a third portion 834c. In some instances, each return pressure port edge profile 834 is symmetrical about an axis extending across the width $W_{834}$ that bisects the length $L_{834}$. In some implementations, the first, second, and intermediary portions 834a, 834b, 834c of each return pressure port edge profile 834 define about ⅛6, ⅝6, ⅝, respectively, of the width $W_{834}$ of the return pressure port edge profile 834.

In some examples, the first portion 834a of each return pressure port edge profile 834 includes an arcuate end segment $834a_1$ having an upper end, a lower end, and a middle region or peak $834a_1$. The second portion 834b of each return pressure port edge profile 834 may include: (1) an arcuate end segment $834b_1$; (2) an upper diagonal linear segment $834b_2$ extending from an upper end of the arcuate end segment $834b_1$; (3) an upper intermediate arcuate segment $834b_3$ extending from the upper diagonal linear segment $834b_2$; (4) an upper linear segment $834b_4$ extending from the upper intermediate arcuate segment; (5) a lower diagonal linear segment $834b_5$ extending from a lower end of the arcuate end segment $834b_1$; (6) a lower intermediate arcuate segment $834b_6$ extending from the lower diagonal linear segment $834b_5$; and (7) a lower linear segment $834b_7$ extending from the lower intermediate arcuate segment $834b_6$. The arcuate end segment $834b_1$ of the second portion 834b also defines a middle region or peak $834b_1$.

In some implementations, the intermediary portion 834c of each return pressure port edge profile 834 includes: (1) a first upper arcuate end segment $834c_1$; (2) a second upper arcuate end segment $834c_2$; (3) an upper intermediate linear segment $834c_3$ that connects the first upper arcuate end segment $834c_1$ to the second upper arcuate end segment $834c_2$; (4) a first lower arcuate end segment $834c_4$; (5) a second lower arcuate end segment $834c_5$; and (6) a lower intermediate linear segment $834c_6$ that connects the first lower arcuate end segment $834c_5$ to the second lower arcuate end segment $834c_6$. The first upper arcuate end segment $834c_1$ of the intermediary portion 834c extends from an upper end of the arcuate end segment $834a_1$ of the first portion 834a of each return pressure port edge profile 834. The second upper arcuate end segment $834c_2$ of the intermediary portion 834c extends from the upper linear segment $834b_4$ of the second portion 834b of each return pressure port edge profile 834. The first lower arcuate end segment $834c_4$ of the intermediary portion 834c extends from a lower end of the arcuate end segment $834a_1$ of the first portion 834a of each return pressure port edge profile 834. The second lower arcuate end segment $834c_5$ of the intermediary portion 834c extends from the lower linear segment $834b_7$ of the second portion 834b of each return pressure port edge profile 834.

In some instances, the first upper and lower arcuate end segments $834c_1$, $834c_4$ of the intermediary portion 834c of each return pressure port edge profile 834 defines a non-constant, increasing length as the intermediary portion 834c extends from the first portion 834a. In some examples, the upper and lower intermediate linear segments $834c_3$, $834c_6$ of the intermediary portion 834c are parallel to one another and define a constant length. In some instances, the second upper and lower arcuate end segments $834c_2$, $834c_5$ of the intermediary portion 834c each define a radius of curvature and a non-constant, increasing length as the intermediary portion 834c extends away from the second portion 834b of each return pressure port edge profile 834.

In some configurations, the arcuate end segment $834b_1$, the upper and lower diagonal linear segments $834b_2$, $834b_5$, and the upper and lower intermediate arcuate segments $834b_3$, $834b_6$ of the second portion 834b at least one return pressure port edge profile 834 define a non-constant, increasing length as the second portion 834b extends toward the intermediate portion 834c. In some examples, the upper and lower linear segments $834b_4$, $834b_7$ of the second portion 834b are parallel to one another and define a constant length along the second portion 834b.

Figure 17:
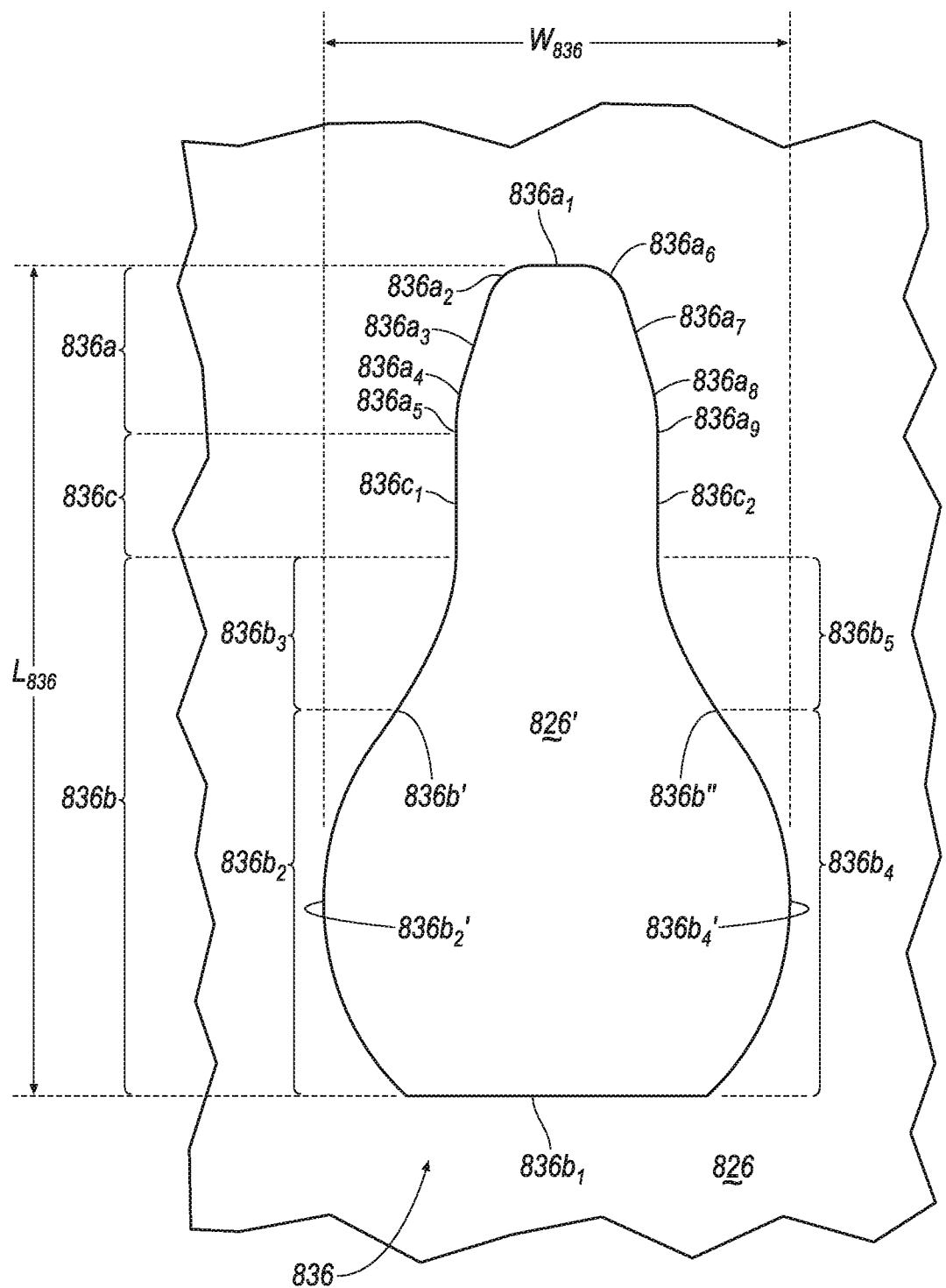
FIG. 17 is an enlarged view of a portion of the surface area of the side surface of spool according to line 17 of FIG. 15.

Referring to FIGS. 15 and 17, outer side surface portions 826' of the outer side surface 826 of the tube-shaped body 824 of the spool 802 are each bound by a recessed edge profile 836. Referring to FIG. 15, in some implementations, the outer side surface 826 of the tube-shaped body 824 of the spool 802 includes four recesses edge profiles 836, and, as such, the outer side surface 826 includes four outer side surface portions 826'.

Each outer side surface portion 826' defines a "scalloped" recess $838_U$, $838_L$, $840_U$, $840_L$ that extends into the outer side surface 826 of the spool 802. The term "scalloped" recess may be interchangeably referred to as a "clammed" recess. The terms "scalloped" and "clammed" may mean concave, non-linear, arcuate, rounded or curved. As seen at FIG. 14, each scalloped recess $838_U$, $838_L$, $840_U$, $840_L$ (which may be defined by a recess having a concave, non-linear, arcuate, rounded or curved outer side surface portion 826' in comparison to/with respect to the outer side surface portion 826) extends partially into but not entirely through the thickness $T_{802}$ of the spool 802. Accordingly, each of the recesses $838_U$, $838_L$, $840_U$, $840_L$ scallop into the outer side surface 826 such that the respective outer side surface portions 826' define a singular groove having a concave profile relative to a longitudinal line extending collinear with the outer side surface 826. Furthermore, the example of FIG. 17 shows each scalloped recess $838_U$, $838_L$, $840_U$, $840_L$ having a substantially "pear" shape (also referred to as "clam" shape) cross-section. Here each recessed edge profile 835 defines a length $L_{836}$ and a width $W_{836}$. The width $W_{836}$ extends along a portion of a circumference of the tube-shaped body 824 in a direction substantially perpendicular to the longitudinal axis $A_{802}$. The length $L_{836}$ extends in a direction substantially parallel to the longitudinal axis $A_{802}$.

Each recessed edge profile 836 includes a head portion 836a, a body portion 836b and a neck portion 836c connecting the head portion 836a to the body portion 836b. In some instances, each recessed edge profile 836 is symmetrical about an axis extending parallel along longitudinal axis $A_{802}$ to bisect the width $W_{836}$ in half.

In some implementations, the head portion 836a of each recessed edge profile 836 is defined by a non-constant width portion and a constant width portion. The constant width portion of the head portion 836a of each recessed edge profile 836 may define a maximum width that is equal to about 5/11 the width $W_{836}$. The maximum width of the head portion 836a is proximate to and extends from the neck portion 836c of each recessed edge profile 836. In some examples, the head portion 836a defines about 3/10 the length $l_{836}$ of the recessed edge profile 836. In some implementations, the body portion 836b of each recessed edge profile 836 is defined by a non-constant width having a maximum width that is equal to the width $W_{836}$. In some examples, the body portion 836b of each recessed edge profile 836 defines about 3/5 the length $l_{836}$. In some examples, the neck portion 836c of each recessed edge profile defines a constant width that is equal to about 5/11 of the width $W_{836}$ of the recessed edge profile 836. The body portion 836b of each recessed edge profile 836 may define about 1/5 the length $l_{836}$ of the recessed edge profile 836.

In some examples, the head portion 836a of each recessed edge profile 836 includes: (1) a linear end segment $836a_1$; (2) a first upper arcuate segment $836a_2$ extending from a first end of the linear end segment $836a_1$; (3) a first diagonal linear segment $836a_3$ extending from the first upper arcuate segment $836a_2$; (4) a first lower arcuate segment $836a_4$ extending from the first diagonal linear segment $836a_3$; (5) a first linear segment $836a_5$ extending from the first lower arcuate segment $836a_4$; (6) a second upper arcuate segment $836a_6$ extending from a second end of the linear end segment $836a_1$; (7) a second diagonal linear segment $836a_7$ extending from the second upper arcuate segment $836a_6$; (8) a second lower arcuate segment $836a_8$ extending from the second diagonal linear segment $836a_7$; and (9) a second linear segment $836a_9$ extending from the second lower arcuate segment $836a_5$.

In some implementations, the body portion 836b of each recessed edge profile 836 includes: (1) a linear end segment $836b_1$; (2) a first lower arcuate segment $836b_2$ extending from a first end of the linear end segment $836b_1$; (3) a first upper arcuate segment $836b_3$ extending from the first lower arcuate segment $836b_2$; (4) a second lower arcuate segment $836b_4$ extending from a second end of the linear end segment $836b_1$; and (5) a second upper arcuate segment $836b_5$ extending from the second lower arcuate segment $836b_4$.

The first lower arcuate segment $836b_2$ defines a different concavity than the first upper arcuate segment $836b_3$ at a first inflection point 836b', while the second lower arcuate segment $836b_4$ defines a different concavity than the second upper arcuate segment $836b_5$ at a second inflection point 836b". The first inflection point 836b' demarcates the first lower arcuate segment $836b_2$ from the first upper arcuate segment $836b_3$, and the second inflection point 836b" demarcates the second lower arcuate segment $836b_4$ from the second upper arcuate segment $836b_5$.

In the example shown, the neck portion 836c of each recessed edge profile 836 includes first and second linear segments $836c_1$, $836c_2$ each extending parallel to the longitudinal axis $A_{802}$ of the spool 802. The first linear segment $836c_1$ between the first linear segment $836a_5$ of the head portion 836a the first upper arcuate segment $836b_3$ of the body portion 836c, while second linear segment $836c_2$ extends between the second linear segment $836a_9$ of the head portion 836a and the second upper arcuate segment of the body portion 836b.

In some implementations, the head portion 836a of each recessed edge profile 836 defines (in a direction extending away from the linear end segment $836a_1$ and toward the body portion 836b) a non-constant increasing width along: (1) the first upper arcuate segment $836a_2$ and the second upper arcuate segment $836a_6$ and (2) the first diagonal linear segment 836a3 and the second diagonal linear segment $836a_7$. The head portion 836a of each recessed edge profile 836 defines (in a direction extending from the non-constant width described above toward the body portion $836b_6$) a constant width along the first linear segment $836a_5$ and the second linear segment $836a_9$ parallel to the first linear segment $836a_5$.

In other examples, the neck portion $836c$ of each recessed edge profile 836 defines (in a direction extending from the constant width of the head portion $836a$ described above toward the body portion $836b$) a constant width along the first linear segment $836c_1$ and the second linear segment $836c_2$. The constant width of the neck portion $836c$ extends from and is approximately equal to the constant width of the head portion $836a$ described above.

In some implementations, the width of the body portion $836b$ of each recess profile 836 increases as the body portion $836b$ extends away from the neck portion $836c$. In some examples, the width of the body portion $836b$ increases as the first and second upper arcuate segments $836b_3$, $836b_5$ extend away from the respective first and second linear segments $836c_1$, $836c_2$ of the neck portion $836c$. The width of the body portion $836b$ continues to increase to a maximum width at a respective middle region or peak $836b_{2'}$, $836b_{4'}$ of each of the first and second lower arcuate segments $836b_2$, $836b_4$. Thereafter, the non-constant width of the body portion $836b$ then decreases as the body portion $836b$ further extends from the middle regions or peaks $836b_{2'}$, $836b_{4'}$ toward the linear end segment $836b_1$.

Figure 18:
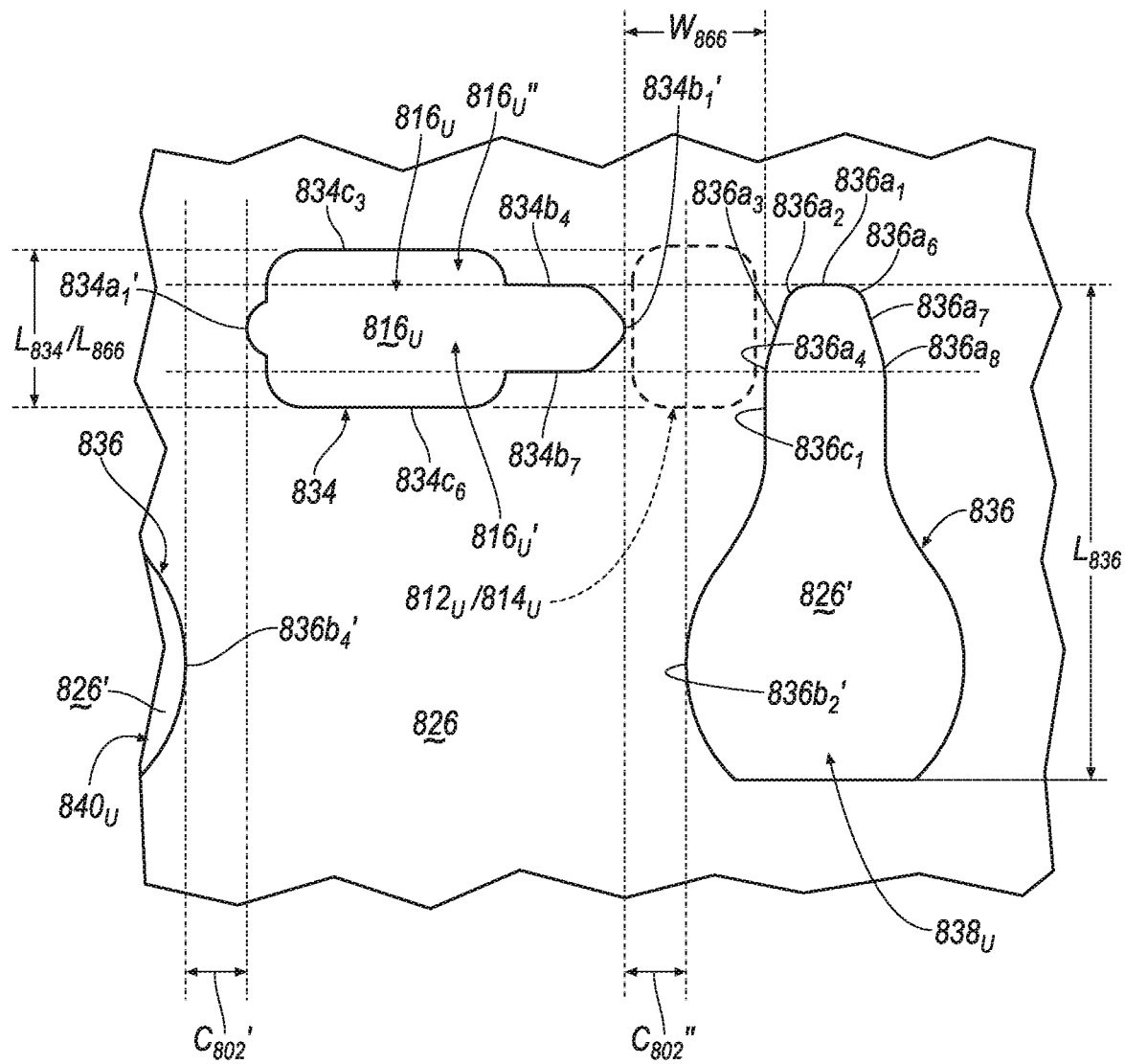
FIG. 18 is an enlarged view of a portion of the surface area of the side surface of spool according to line 18 of FIG. 15.
Figure 19:
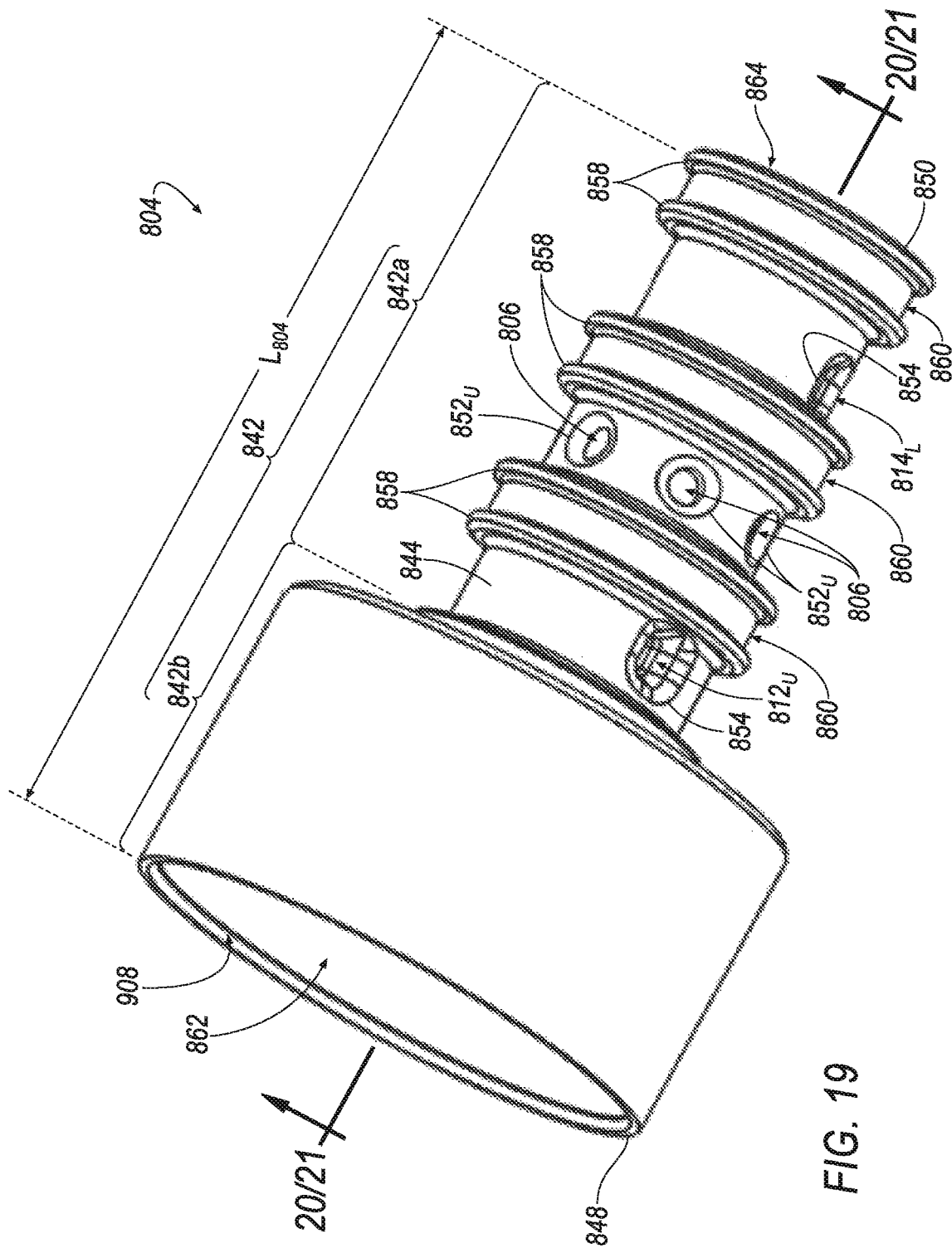
FIG. 19 is a schematic view of an example sleeve of the valve of FIG. 5.

Referring to FIG. 18, the pressure port edge profiles 834 and the recessed edge profiles 836 are circumferentially spaced around the circumference C802 of the outer side surface 826 of the spool 802 in an alternating repeating fashion. That is, each pressure port edge profile 834 is disposed between a pair of adjacent recessed edge profiles 836 and each recessed edge profile 836 is disposed between a pair of pressure port edge profiles 834. In the example shown, the arcuate end segment $834a_1$ of the first portion $834a$ of each return pressure port edge profile 834 is spaced at a first circumferential distance $C_{802'}$ from the adjacent recessed edge profile 836 on one side of the return pressure port edge profile 834, while the arcuate end segment $834b_1$ of the second portion $834b$ of each return pressure port edge profile 834 is spaced at a second circumferential distance $C_{802''}$ from the adjacent recessed edge profile 836 on the other side of the return pressure port edge profile 834. In some examples, the first circumferential distance $C_{802'}$ is approximately equal to the second circumferential distance $C_{802''}$. Each of the first circumferential distance $C_{802'}$ and the second circumferential distance $C_{802''}$ circumferentially extends across a respective portion of the circumference $C_{802}$ of the outer side surface 826 of the spool 802.

In some implementations, the first circumferential distance $C_{802'}$ extends between the middle region or peak $834a_{1'}$ of the arcuate end segment $834a_1$ of the first portion $834a$ of the return pressure port edge profile 834 and the middle region or peak $836b_{4'}$ of the second lower arcuate segment $836b_4$ of the body portion $836b$ of the recessed edge profile 836. On the other hand, the second circumferential distance $C_{802''}$ may extend between the middle region or peak $834b_{1'}$ of the arcuate end segment $834b_1$ of the second portion $834b$ of the return pressure port edge profile 834 and the middle region or peak $836b_{2'}$ of the first lower arcuate segment $836b_2$ of the body portion $836b$ of the recessed edge profile 836.

Furthermore, FIG. 18 shows the spool 802 positioned relative to the sleeve 804 such that no portion of a width $W_{866}$ of one of the upper control ports $812_U$, $814_U$ of the sleeve 804 overlaps with either of the return pressure port profile 834 or the recessed edge profile 836. As a result, supply fluid is prevented from flowing through the upper control port $812_U$, $814_U$ to the hydraulic actuator 1006 and return fluid is prevented from flowing in the opposite direction through the upper control port $812_U$, $814_U$ back to the low pressure fluid reservoir 1004. Yet even further as seen at FIG. 18 (and also at, for example, FIGS. 26A, 26C, 26G, 26I), the length $L_{834}$ of each return pressure port edge profile 834 may be approximately equal to a length $L_{866}$ (FIG. 23) of each control port edge profile 866 (FIG. 23) of each of the one or more control ports $812_U$, $812_L$, $814_U$, $814_L$.

With reference to FIGS. 14 and 18, a portion (see, e.g., $L_{834'}$ in FIG. 14) of the length $L_{834}$ of each return pressure port edge profile 834 axially overlaps with a portion (see, e.g., $L_{836'}$ in FIG. 14) of the length $L_{836}$ of adjacent recessed edge profiles 836. Referring to FIG. 18, in some implementations, the upper linear segment $834b_4$ of the second portion $834b$ of each return pressure port edge profile 834 is aligned with the linear end segment $836a_1$ of the head portion $836a$ of each adjacent recessed edge profiles 836. Accordingly, a portion (see, e.g., $816_{U'}$ in FIGS. 14 and 18) of each of the return pressure ports $816_U$, $816_L$, $818_U$, $818_L$ extending between the upper linear segment $834b_4$ of the second portion $834b$ and the lower intermediate linear segment $834c_6$ of the intermediate portion $834c$ defines the portion $L_{834'}$ of the length $L_{834}$ that axially overlaps with the portion $L_{836'}$ of the length $L_{836}$ of adjacent recessed edge profiles 836.

Furthermore, as also seen at FIGS. 14 and 18, a portion (see, e.g., $816_{U''}$) of each of the return pressure ports $816_U$, $816_L$, $818_U$, $818_L$ does not axially overlap with a portion of the length $L_{836}$ of adjacent recessed edge profiles 836. Here, the portion $816_{U''}$ of each of the return pressure ports $816_U$, $816_L$, $818_U$, $818_L$ extends between the upper intermediate linear segment $834c_3$ of the intermediate portion $834c$ and a region bound by a plane aligned with the upper linear segment $834b_4$ of the second portion $834b$. The portion $816_{U''}$ defines a portion (see, e.g., $L_{834''}$ in FIG. 14) of the length $L_{834}$ of each return pressure port edge profile 834. Furthermore, with reference to FIG. 18, the lower linear segment $834b_7$ of the second portion $834b$ is aligned with regions of each adjacent recessed edge profiles 836 that is defined by a middle region or peak of each of, respectively, the first lower arcuate segment $836a_4$ and the second lower arcuate segment $836a_8$ of the head portion $836a$ of the recessed edge profile 836.

Referring to FIG. 14, the outer side surface portions 826' defining the scalloped recesses $838_U$, $838_L$, $840_U$, $840_L$ of the spool 802 are recessed into the outer side surface 826 of the tube-shaped body 824 by a depth D836. In some examples, the depth $D_{836}$ associated with the outer side surface portions 826' may include one or more of a constant depth $D_{836'}$ or a non-constant depth $D_{836''}$ extending along the length $L_{836}$ of the recessed edge profile 836. For instance, the non-constant depth $D_{836''}$ may increase as the head portion $836a$ of the recessed edge profile 836 extends away from the linear end segment $836a_1$ and toward the neck portion $836c$ of the recessed edge profile 836. Thereafter, the depth $D_{836}$ associated with the outer side surface portions 826' may then stop increasing and transition to define the constant depth $D_{836'}$ as the head portion $836a$ further extends toward the neck portion $836c$ of the recessed edge profile 836. Thus, the depth $D_{836}$ of the head portion $836a$ extends along the portion $L_{836'}$ of the length $L_{836}$ of the recessed edge profile 836 that axially aligns with the portion $L_{834'}$ of the length $L_{834}$ of the return pressure port edge profile 834.

In other instances as seen at FIG. 14, the neck portion $836c$ of each recessed edge profile 836 of the spool 802 may define the constant depth $D_{836''}$. In yet other instances, the body portion 836b of each recessed edge profile 836 of the spool 802 may define: (1) an increasing non-constant depth $D_{836''}$ as the body portion 836b extends from the linear end segment $836b_1$ toward the neck portion 836c of the recessed edge profile 836; and then transitions to (2) approximately about the constant depth $D_{836'}$ near the neck portion 836c of each recessed edge profile 836. Furthermore, as seen at FIG. 14, the depth $D_{836}$ of both of the body portion 836b and the neck portion 836c extends along a portion $L_{836''}$ of the length $L_{836}$ of the recessed edge profile 836 that does not axially align with any portion of the length $L_{834}$ of each return pressure port edge profile 834. In an example, the portion $L_{836''}$ of the length $L_{836}$ of the recessed edge profile 836 extends in a direction away from the lower intermediate linear segment $834c_6$ of the intermediate portion 834c of each return pressure port edge profile 834.

Referring to FIG. 15, the plurality of return pressure ports $816_U$, $816_L$, $818_U$, $818_L$ of the spool 802 includes: a first upper return pressure port $816_U$; a second upper return pressure port $818_U$; a first lower return pressure port $816_L$; and a second lower return pressure port $818_L$. In some implementations, the first and second upper return pressure ports $816_U$, $818_U$ are circumferentially spaced 180-degrees (180°) from one another and offset 90-degrees (90°) from each of the first and second lower return pressure port $816_L$, $818_L$. Thus, in these implementations, the first and second lower return pressure port $816_L$, $818_L$ are circumferentially spaced 180° from one another and offset 90° from each of the first and second upper return pressure ports $816_U$, $818_U$.

An orientation of the return pressure port edge profile 834 associated with each of the first and second lower return pressure port $816_L$, $818_L$ is "horizontally flipped" in comparison to an orientation of the return pressure port edge profile 834 associated with each of the first and second upper return pressure port $816_L$, $818_L$. For example, FIGS. 15 and 16 show the first portion 834a and second portion 834b of the first upper return pressure port $816_U$ and the second upper return pressure port $818_U$ appear, respectively, on the left and the right of the first upper return pressure port $816_U$ and the second upper return pressure port $818_U$ whereas the first portion 834a and second portion 834b of the first lower return pressure port $816_L$ and the second lower return pressure port $818_L$ appear, respectively, on the right and the left of the first portion 834a and second portion 834b of the first lower return pressure port $816_L$.

FIG. 15 also shows the plurality of scalloped recesses $838_U$, $838_L$, $840_U$, $840_L$ of the spool 802 includes: a first upper scalloped recess $838_U$; a second upper scalloped recess $840_U$; a first lower scalloped recess $838_L$; and a second lower scalloped recess $840_L$. The first upper scalloped recess $838_U$ may be circumferentially spaced or offset from the second upper scalloped recess $840_U$ by approximately 180°. Similarly, the first lower scalloped recess $838_L$ may be circumferentially spaced or offset from the second lower scalloped recess $840_L$ by about 180°. Each upper scalloped recess $838_U$, $840_U$ may be offset from each lower scalloped recess $838_U$, $840_U$.

An orientation of the recessed edge profile 836 associated with each of the first and second lower scalloped recesses $838_L$, $840_L$ is "vertically flipped" in comparison to an orientation of the recessed edge profile 836 associated with each of the first and second upper scalloped recesses $838_U$, $840_U$. For example, FIGS. 15 and 17 show the first and second upper scalloped recesses $838_U$, $840_U$ each having their respective head portion 836a axially above their respective body portion 836b, whereas the first and second lower scalloped recesses $838_L$, $840_L$ each have their respective head portion 836a axially below their body portion 836b. Thus, the linear end segments $836b_1$ associated with each of the first and second upper scalloped recesses $838_U$, $840_U$ may oppose the linear end segments $836b_1$ associated with each of first and second lower scalloped recesses $838_L$, $840_L$. In some examples, the upper scalloped recesses $838_U$, $840_U$ and the lower scalloped recesses $838_L$, $840_L$ are axially spaced from one another by distance $D_{836b}$.

Referring to FIGS. 19-22, a tube-shaped body 842 generally defines the sleeve 804 that includes the plurality of inlet ports 806 and the one or more control ports $812_U$, $812_L$, $814_U$, $814_L$. The tube-shaped body 842 includes an outer side surface 844, an inner sidewall 846 (see, e.g., FIGS. 20-22) an upper end surface 848, and a lower end surface 850. The sleeve 804 defines a thickness T804 (see, e.g., FIGS. 20-22) extending between the outer side surface 844 and the inner sidewall 846 of the tube-shaped body 842. The sleeve 804 defines a length L804 extending between the upper end surface 848 and the lower end surface 850 of the tube-shaped body 842. The outer side surface 844 of the sleeve 804 also defines a circumference C804 (see, e.g., FIG. 23) of the tube-shaped body 842.

The outer side surface 844 of the tube-shaped body 842 defines: (1) a plurality of upstream openings $852_U$ associated with the inlet ports 806; and (2) a plurality of first openings 854 associated with the control ports $812_U$, $812_L$, $814_U$, $814_L$. The inner sidewall 846 of the tube-shaped body 842 defines: (1) a plurality of downstream openings $852_D$ (see, e.g., FIGS. 20-22) associated with the inlet ports 806; and (2) a plurality of second openings 856 (see, e.g., FIGS. 20-22) associated with the control ports $812_U$, $812_L$, $814_U$, $814_L$. The outer side surface 844 of the tube-shaped body 842 may also include pairs of ribs 858 defining a circumferential channel 860 that is sized for receiving one or more circumferential seals (not shown).

Figure 20:
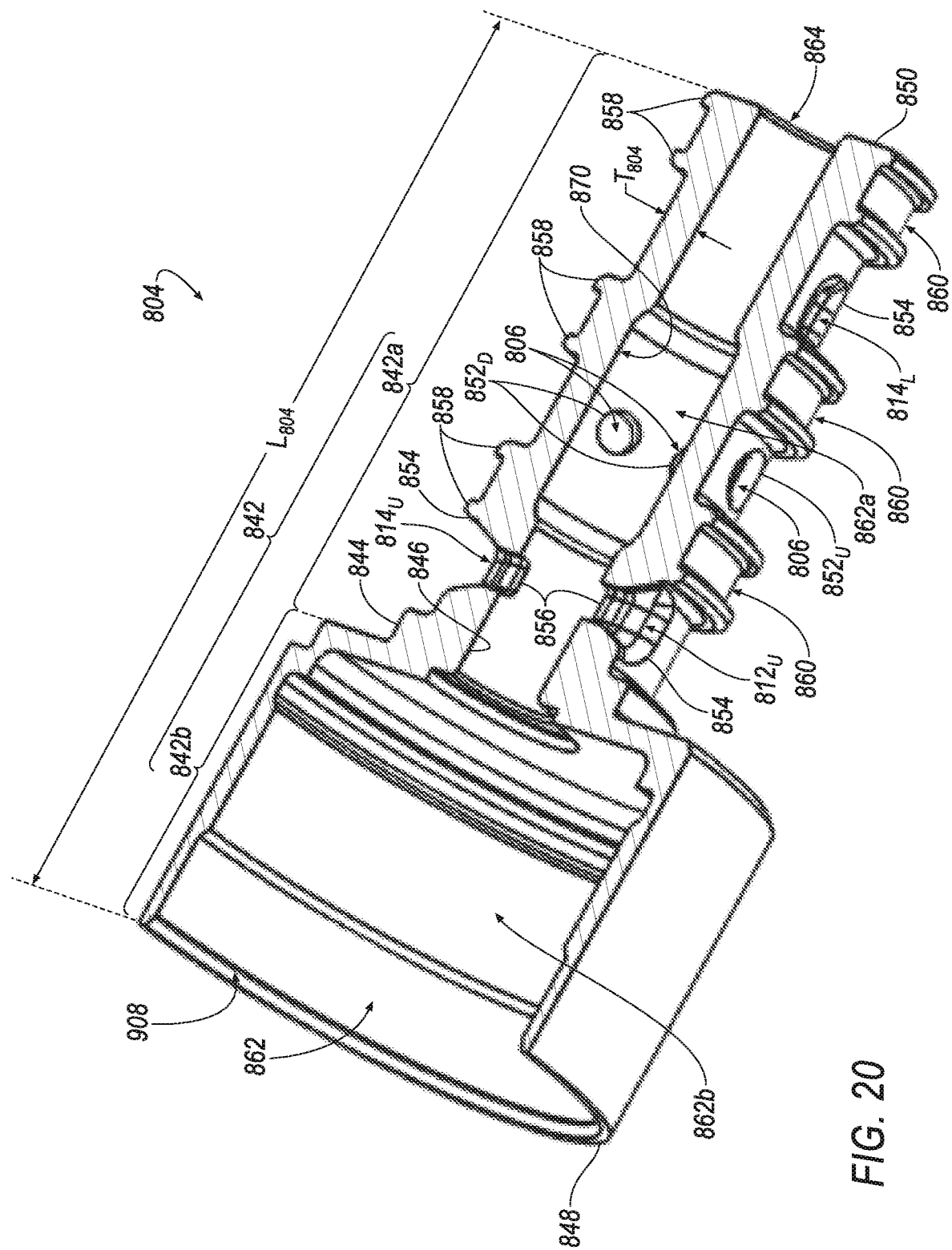
FIG. 20 is a cross-sectional view of the sleeve according to line 20-20 of FIG. 19.
Figure 21:
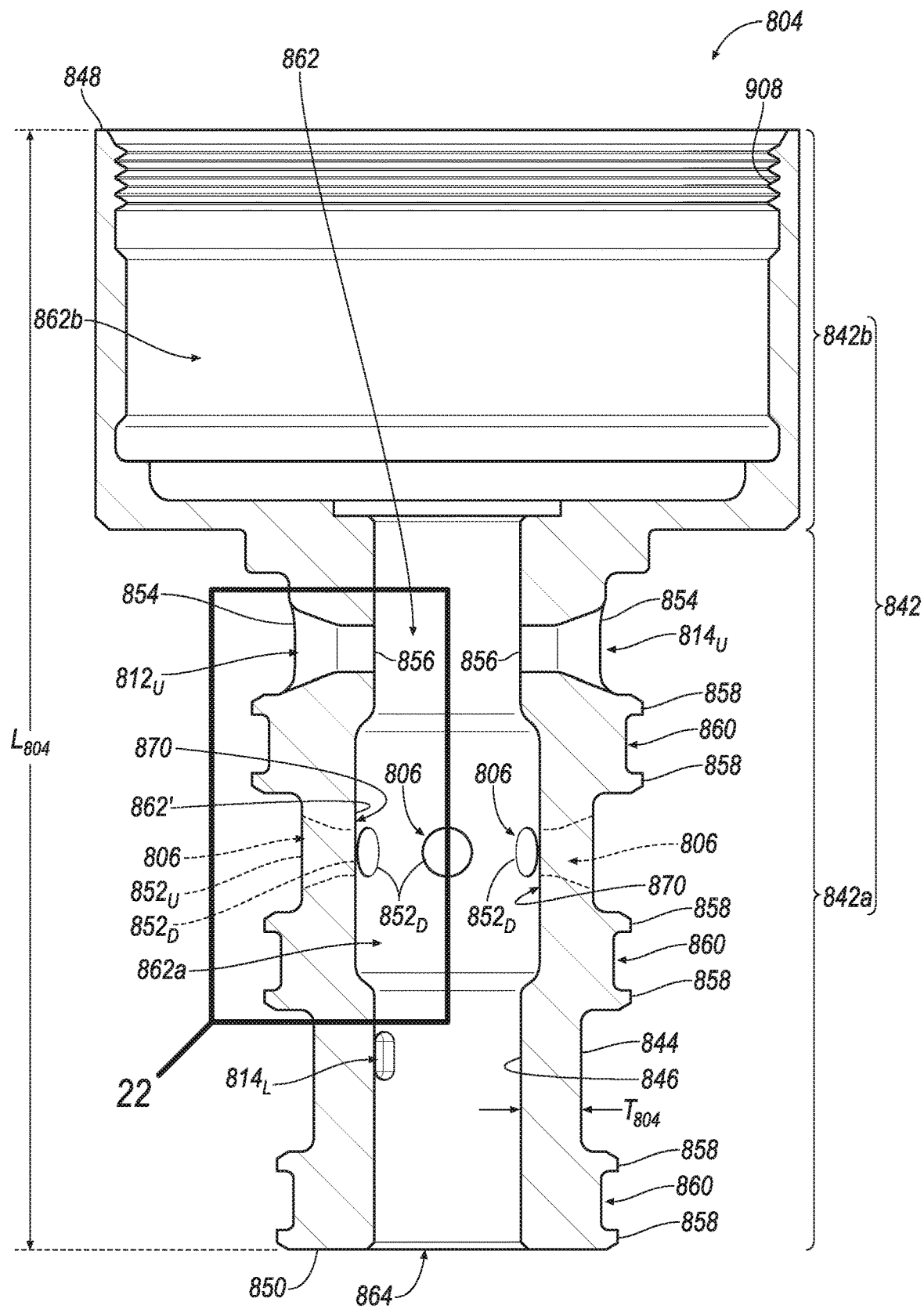
FIG. 21 is another cross-sectional view of the sleeve according to line 21-21 of FIG. 10.
Figure 22:
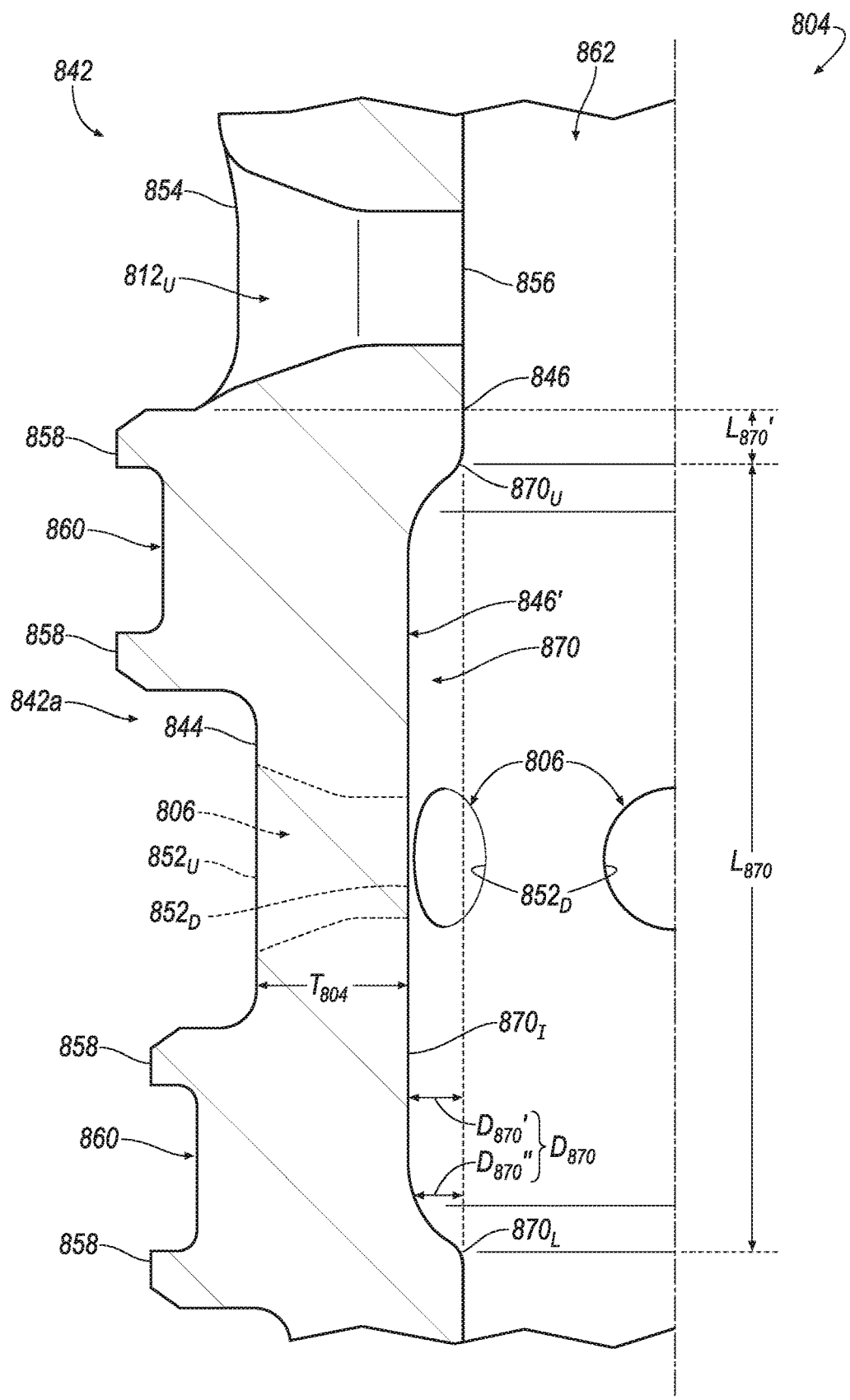
FIG. 22 is an enlarged cross-sectional view of the sleeve according to line 22 of FIG. 21.

Referring to FIGS. 20-22, each inlet port 806 extends entirely through the thickness $T_{804}$ of the sleeve 804. With reference to FIG. 21, in some implementations, each inlet port 806 defines a non-constant diameter as the inlet port 806 extends radially through the thickness $T_{804}$ of the tube-shaped body 842 from the outer side surface 844 toward the inner sidewall 846. In some examples, the non-constant diameter of each inlet port 806 is defined by a largest diameter formed by the upstream opening $852_U$ that progressively decreases as the inlet port 806 extends radially inward to a smallest diameter formed by the downstream opening $852_D$. In other implementations, one or more of the inlet ports 806 includes the non-constant diameter progressively decreasing from the largest diameter formed by the upstream opening $852_U$ to the smallest diameter at a location disposed radially between the upstream opening $852_U$ and the downstream opening $852_D$. Here, the one or more inlet ports 806 may include a constant diameter associated with the smallest diameter that extends radially through the downstream opening $852_U$. Accordingly, the non-constant diameter extending into the thickness $T_{804}$ of the tube-shaped body 842 from the outer side surface 844 may be referred to as a flared portion of each inlet port 806.

Each of the one or more control ports $812_U$, $812_L$, $814_U$, $814_L$ extend entirely through the thickness $T_{804}$ of the sleeve 804. With reference to FIG. 21, in some implementations, at least a portion of each of the one or more control ports $812_U$, $812_L$, $814_U$, $814_L$ defines a non-constant diameter as each of the one or more control ports $812_U$, $812_L$, $814_U$, $814_L$ extend radially inward through the thickness $T_{804}$ of the tube-shaped body 842 from the outer side surface 844 toward the inner sidewall 846. In some examples, the non-constant diameter of each of the one or more control ports 812$_U$, 812$_L$, 814$_U$, 814$_L$ is defined by a larger diameter formed by each of the first openings 854 that progressively decreases to a smallest diameter formed by each of the second openings 856. In other implementations, a first portion of each of the one or more control ports 812$_U$, 812$_L$, 814$_U$, 814$_L$ may define: (1) a non-constant diameter having a largest diameter (defined by each first opening 854) at the outer side surface 844 that progressively decreases to a smallest diameter disposed at a location radially between the outer side surface 844 and the inner sidewall 846; and (2) a constant diameter as each of the one or more control ports 812$_U$, 812$_L$, 814$_U$, 814$_L$ extends radially inward from the smallest diameter of the non-constant diameter toward each of the second openings 856 formed by the inner sidewall 846. Accordingly, the non-constant diameter extending into the thickness T$_{804}$ of the tube-shaped body 842 from the outer side surface 844 may be referred to as a flared portion of each of the one or more control ports 812$_U$, 812$_L$, 814$_U$, 814$_L$.

The inner sidewall 846 of the tube-shaped body 842 circumscribes/defines an axial chamber 862 that axially extends through the tube-shaped body 842 of the sleeve 804. The plurality of downstream openings 852$_D$ associated with the inlet ports 806 and the plurality of second openings 856 associated with the one or more control ports 812$_U$, 812$_L$, 814$_U$, 814$_L$ permit each of the plurality of inlet ports 806 and the one or more control ports 812$_U$, 812$_L$, 814$_U$, 814$_L$ to be in fluid communication with the axial chamber 862 of the sleeve 804. As seen at FIGS. 20 and 21, the lower end surface 850 defines an axial exit port 864 of the tube-shaped body 842 of the sleeve 804. The axial exit port 864 is in axial fluid communication with the axial chamber 862 of the sleeve 804. The tube-shaped body 842 includes a stem portion 842a and a cap portion 842b. The axial chamber 862 defines a first axial chamber portion 862a extending through the stem portion 842a and a second axial chamber portion 862b extending through the cap portion 842b.

The first axial chamber portion 862a extending through the stem portion 842a of the sleeve 804 is sized for receiving a first portion (see, e.g., L$_{802'}$ in FIGS. 11-13) of the length L$_{802}$ of the spool 802. The second axial chamber portion 862b extending through the cap portion 842b of the sleeve 804 is sized for receiving a second portion (see, e.g., L$_{802''}$ in FIGS. 11-13) of the length L$_{802}$ of the spool 802. The second portion L$_{802''}$ of the length L$_{802}$ of the spool 802 extends from an upper end of the first portion L$_{802'}$ of the length L$_{802}$ of the spool 802. A third portion (see, e.g., L$_{802'''}$ in FIGS. 11-13) of the length L802 of the spool 802 (extending from a lower end of the first portion L$_{802'}$ of the length L$_{802}$ of the spool 802) extends through the axial exit port 864 of the tube-shaped body 842 of the sleeve 804 and beyond the lower end surface 850 of the tube-shaped body 842 of the sleeve 804.

Figure 23:
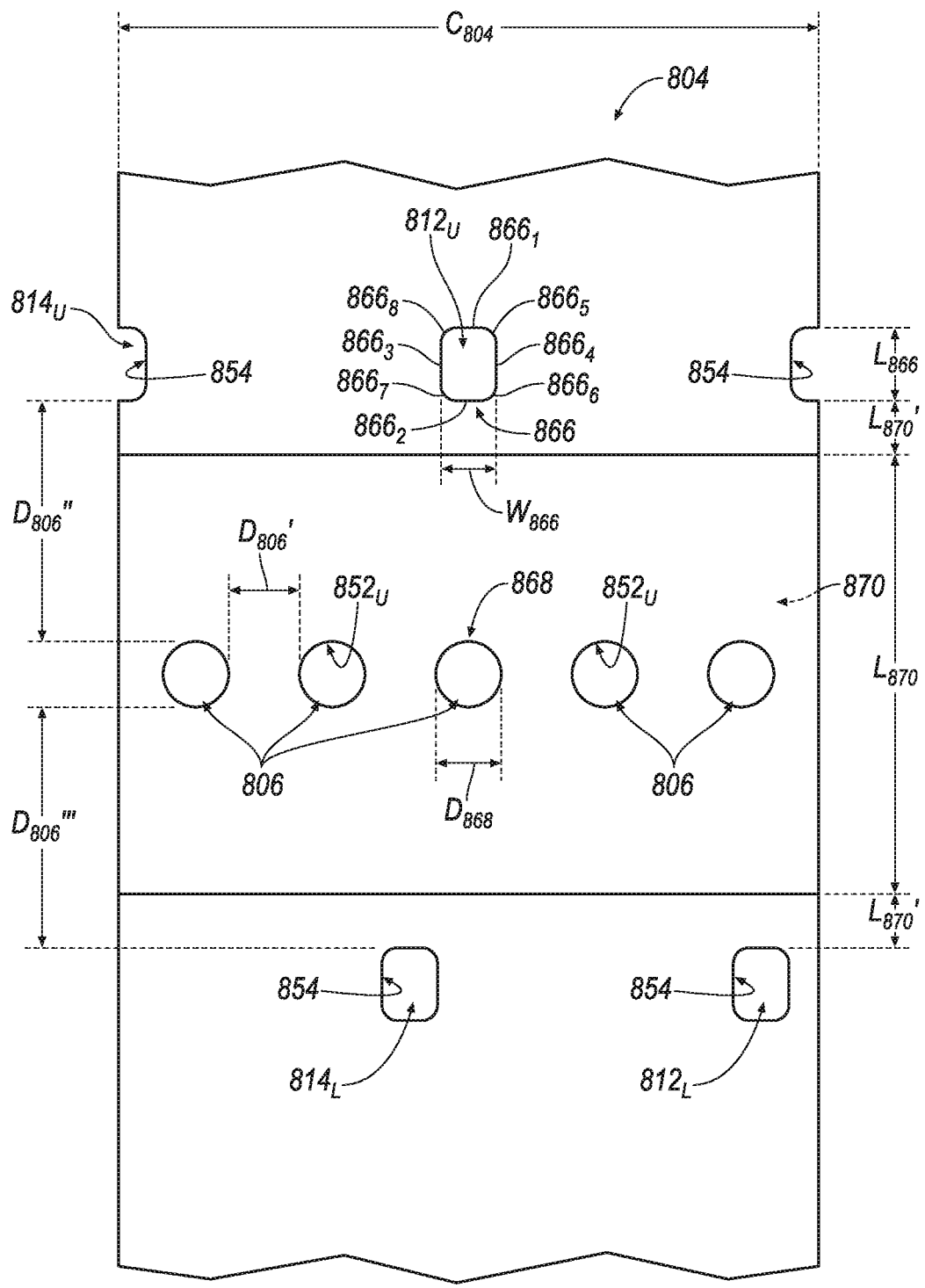
FIG. 23 is a plan view of a surface area of a side surface of the sleeve of FIGS. 19-22.
Figure 25A:
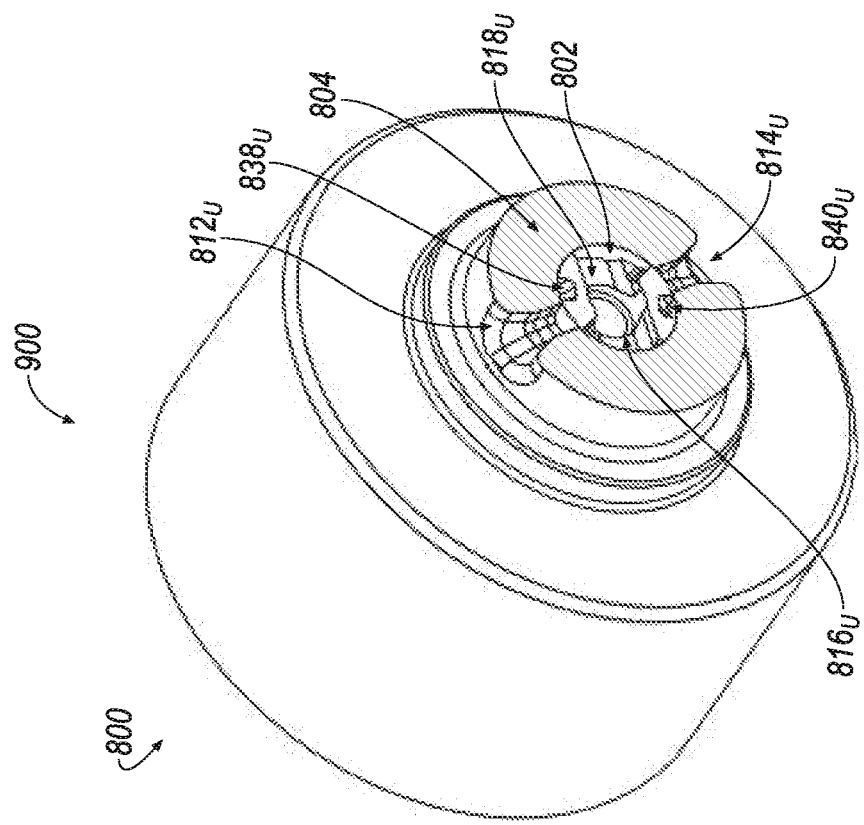
FIG. 25A is a schematic cross-sectional view of the valve of FIGS. 5-10 showing the spool rotated relative the sleeve for arranging the valve in a first example orientation that is referenced from line 25-25 of any of FIGS. 7-9.
Figure 24A:
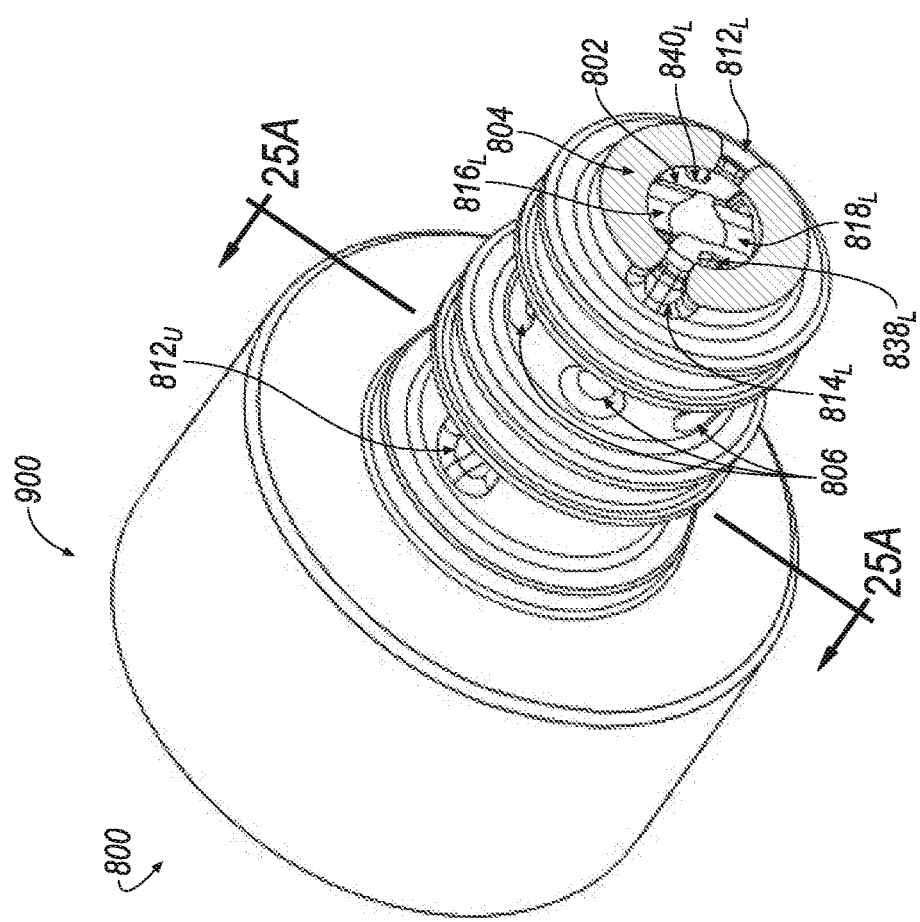
FIG. 24A is a schematic cross-sectional view of the valve of FIGS. 5-10 showing the spool rotated relative the sleeve for arranging the valve in a first example orientation that is referenced from line 24-24 of any of FIGS. 7-9.
Figure 25B:
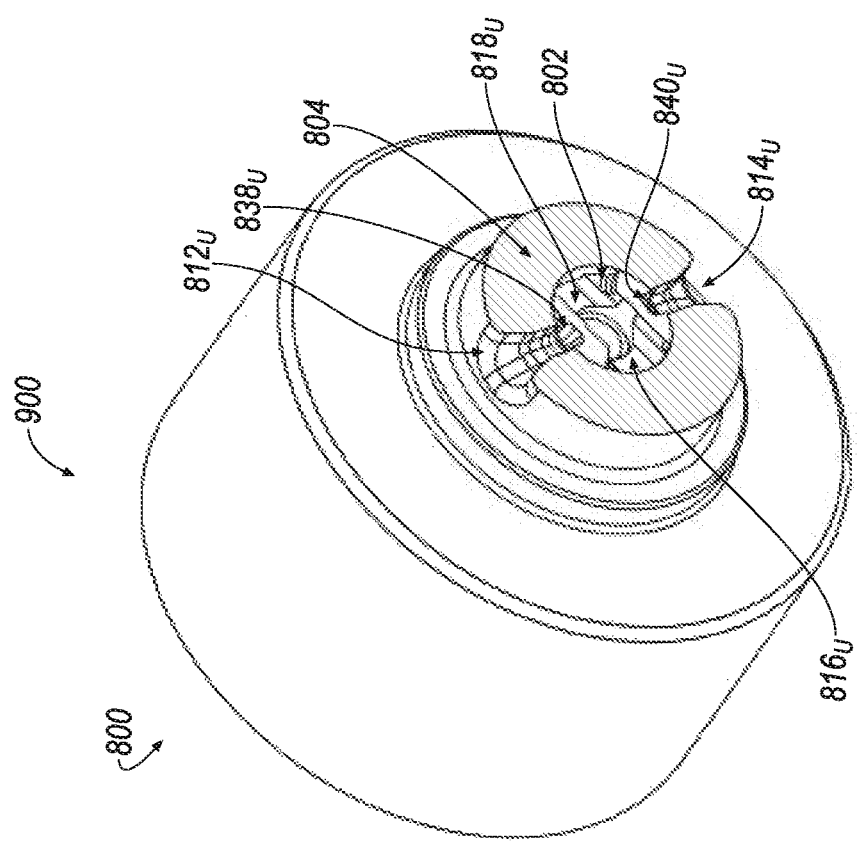
FIG. 25B is a schematic cross-sectional view of the valve of FIGS. 5-10 showing the spool rotated relative the sleeve for arranging the valve in a second example orientation that is referenced from line 25-25 of any of FIGS. 7-9.
Figure 24B:
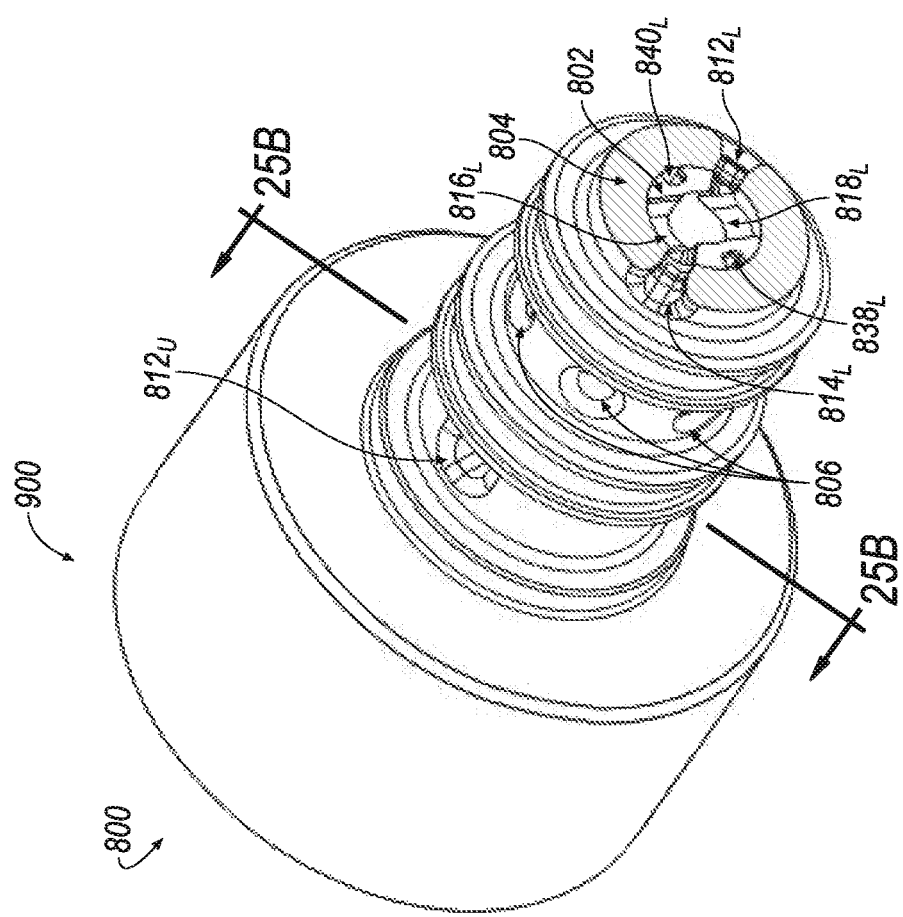
FIG. 24B is a schematic cross-sectional view of the valve of FIGS. 5-10 showing the spool rotated relative the sleeve for arranging the valve in a second example orientation that is referenced from line 24-24 of any of FIGS. 7-9.
Figure 25C:
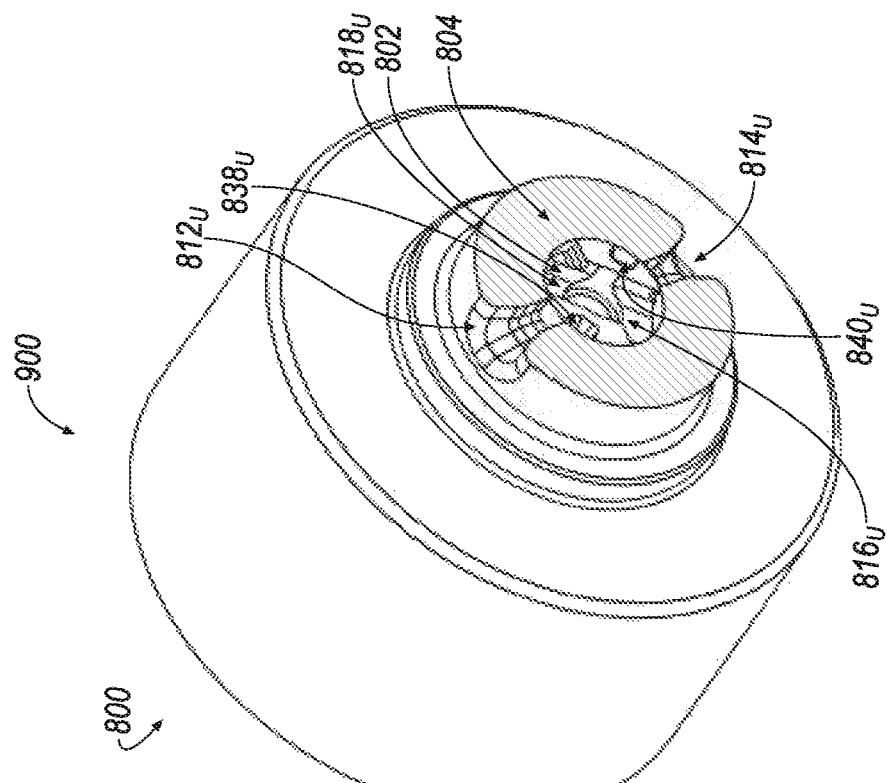
FIG. 25C is a schematic cross-sectional view of the valve of FIGS. 5-10 showing the spool rotated relative the sleeve for arranging the valve in a third example orientation that is referenced from line 25-25 of any of FIGS. 7-9.
Figure 24C:
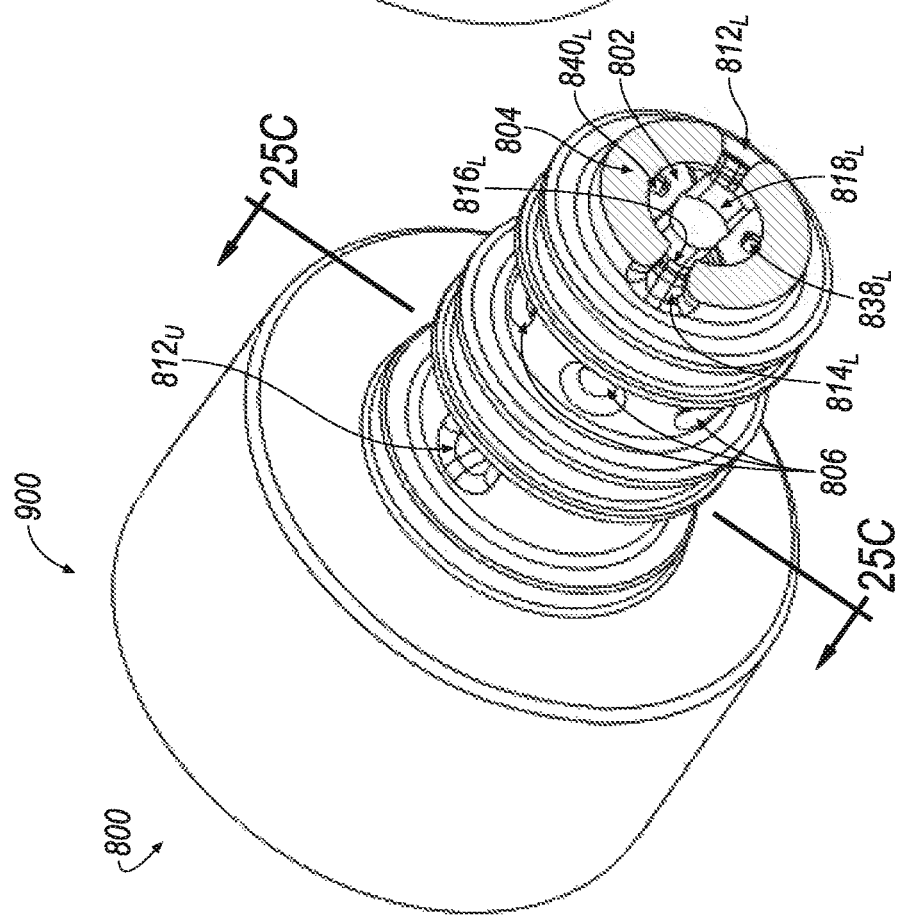
FIG. 24C is a schematic cross-sectional view of the valve of FIGS. 5-10 showing the spool rotated relative the sleeve for arranging the valve in a third example orientation that is referenced from line 24-24 of any of FIGS. 7-9.
Figure 25D:
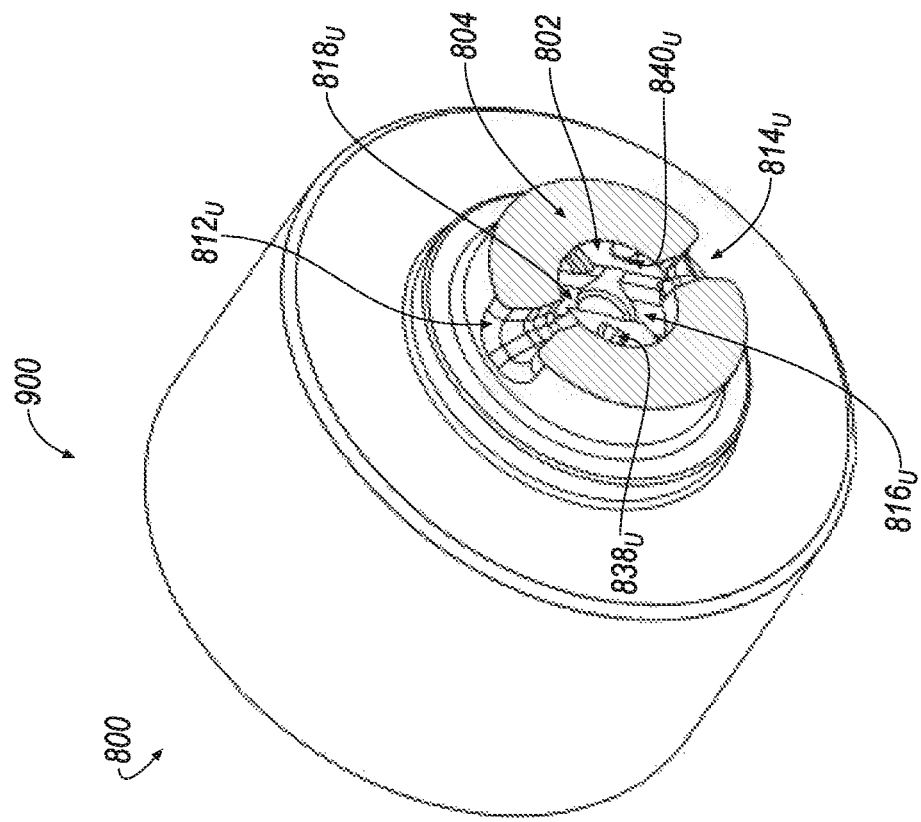
FIG. 25D is a schematic cross-sectional view of the valve of FIGS. 5-10 showing the spool rotated relative the sleeve for arranging the valve in a fourth example orientation that is referenced from line 25-25 of any of FIGS. 7-9.
Figure 24D:
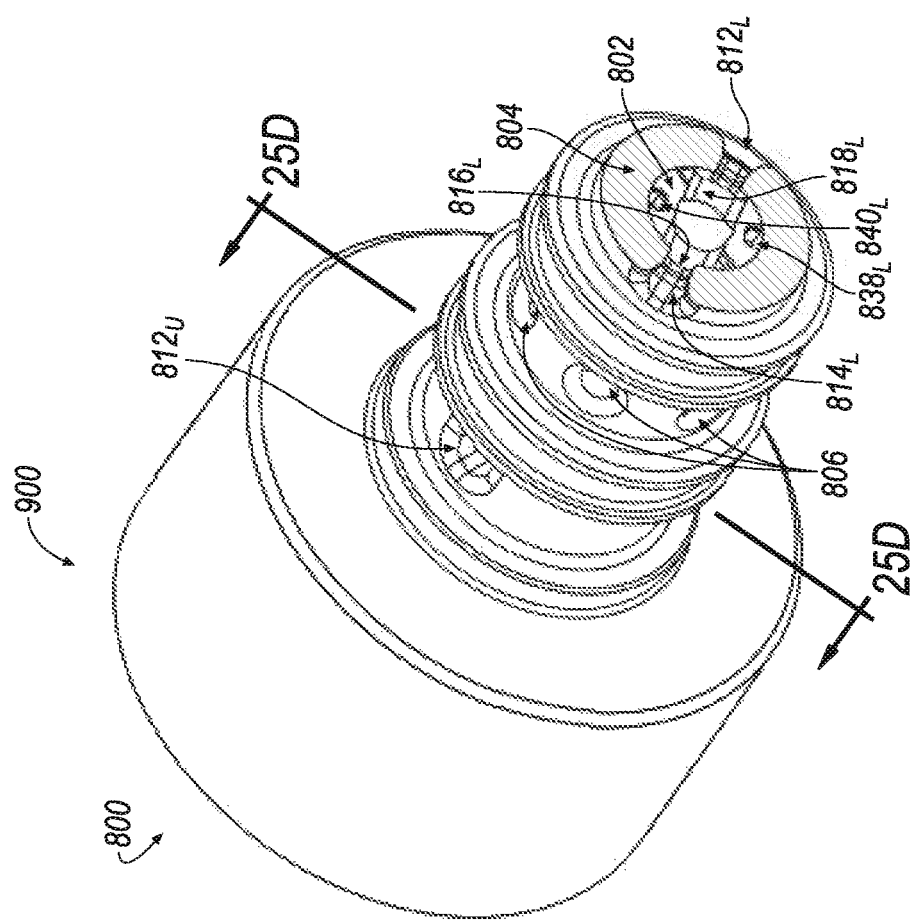
FIG. 24D is a schematic cross-sectional view of the valve of FIGS. 5-10 showing the spool rotated relative the sleeve for arranging the valve in a fourth example orientation that is referenced from line 24-24 of any of FIGS. 7-9.
Figure 25E:
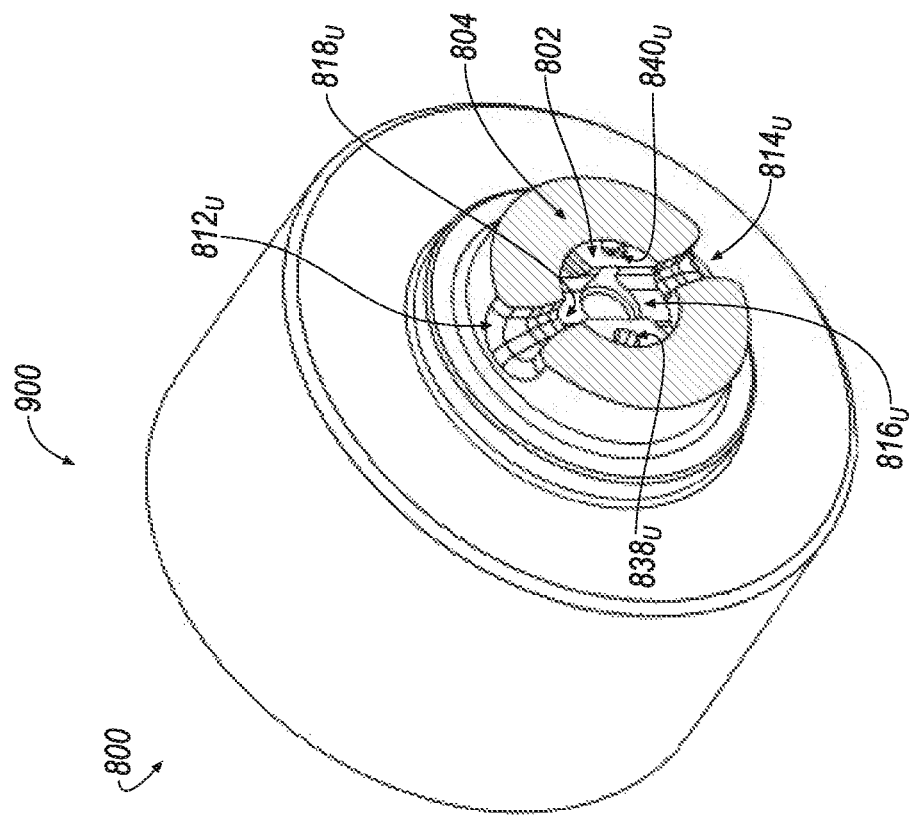
FIG. 25E is a schematic cross-sectional view of the valve of FIGS. 5-10 showing the spool rotated relative the sleeve for arranging the valve in a fifth example orientation that is referenced from line 25-25 of any of FIGS. 7-9.
Figure 24E:
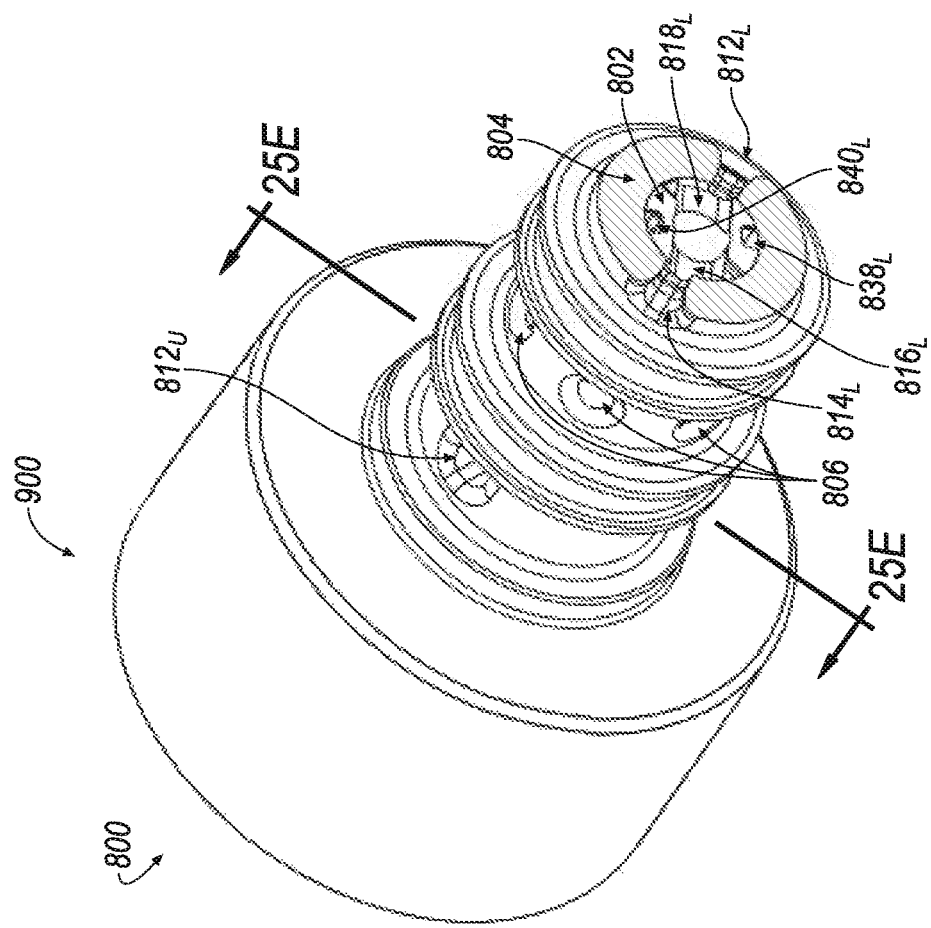
FIG. 24E is a schematic cross-sectional view of the valve of FIGS. 5-10 showing the spool rotated relative the sleeve for arranging the valve in a fifth example orientation that is referenced from line 24-24 of any of FIGS. 7-9.
Figure 25F:
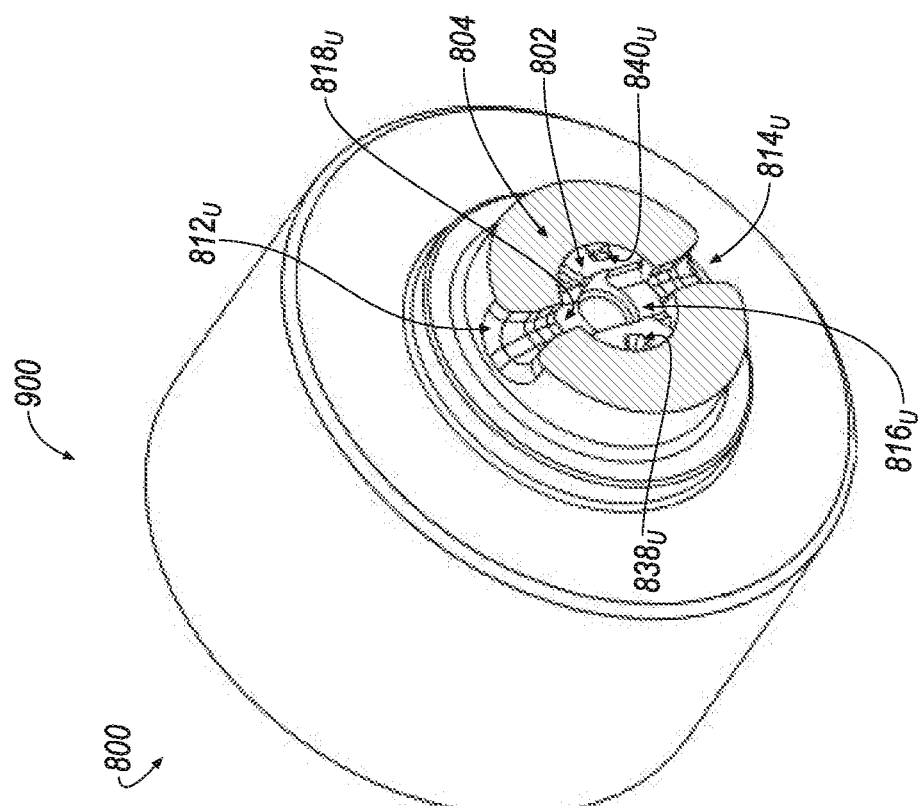
FIG. 25F is a schematic cross-sectional view of the valve of FIGS. 5-10 showing the spool rotated relative the sleeve for arranging the valve in a sixth example orientation that is referenced from line 25-25 of any of FIGS. 7-9.
Figure 24F:
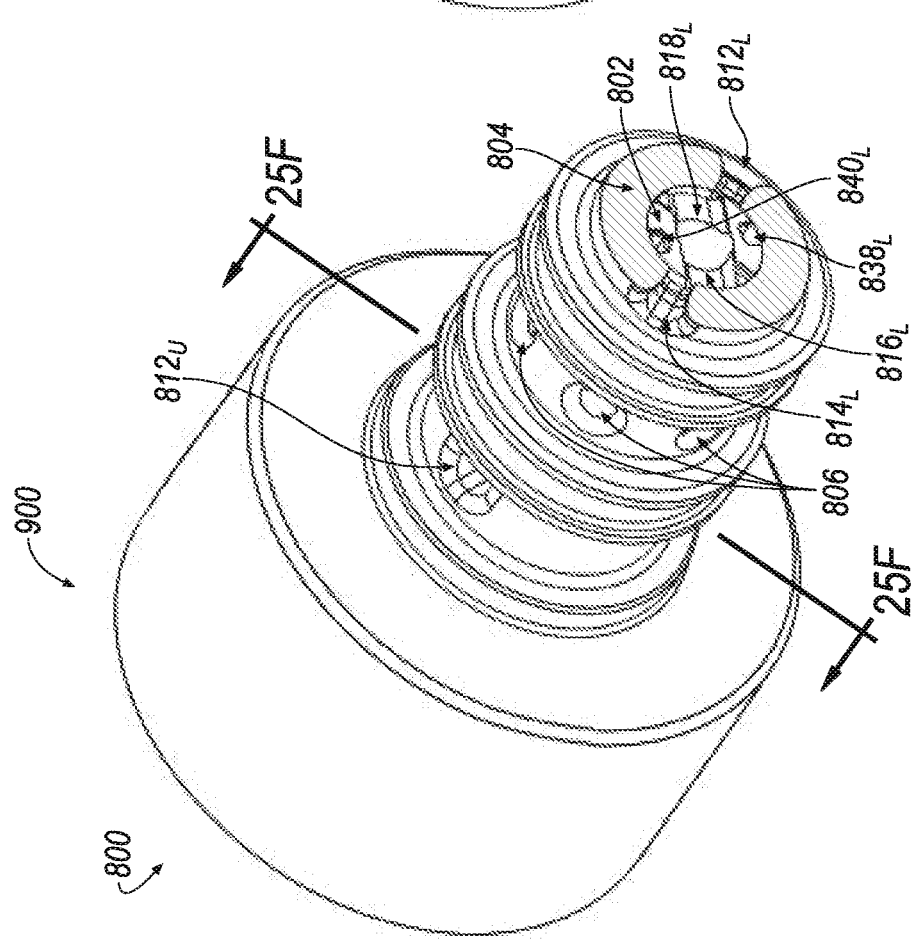
FIG. 24F is a schematic cross-sectional view of the valve of FIGS. 5-10 showing the spool rotated relative the sleeve for arranging the valve in a sixth example orientation that is referenced from line 24-24 of any of FIGS. 7-9.
Figure 25G:
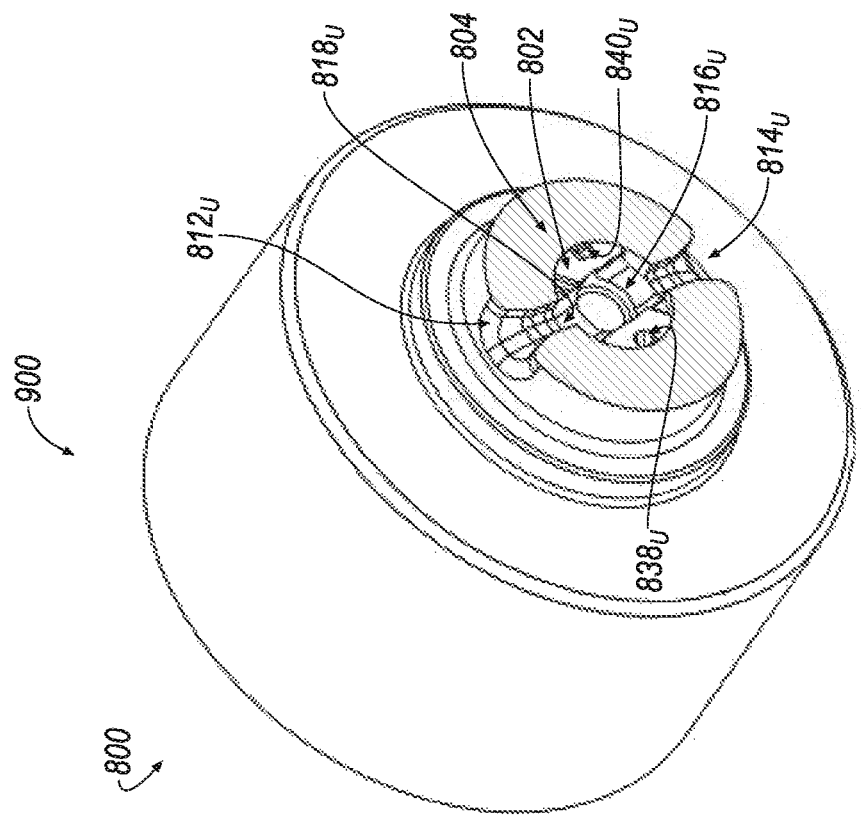
FIG. 25G is a schematic cross-sectional view of the valve of FIGS. 5-10 showing the spool rotated relative the sleeve for arranging the valve in a seventh example orientation that is referenced from line 25-25 of any of FIGS. 7-9.
Figure 24G:
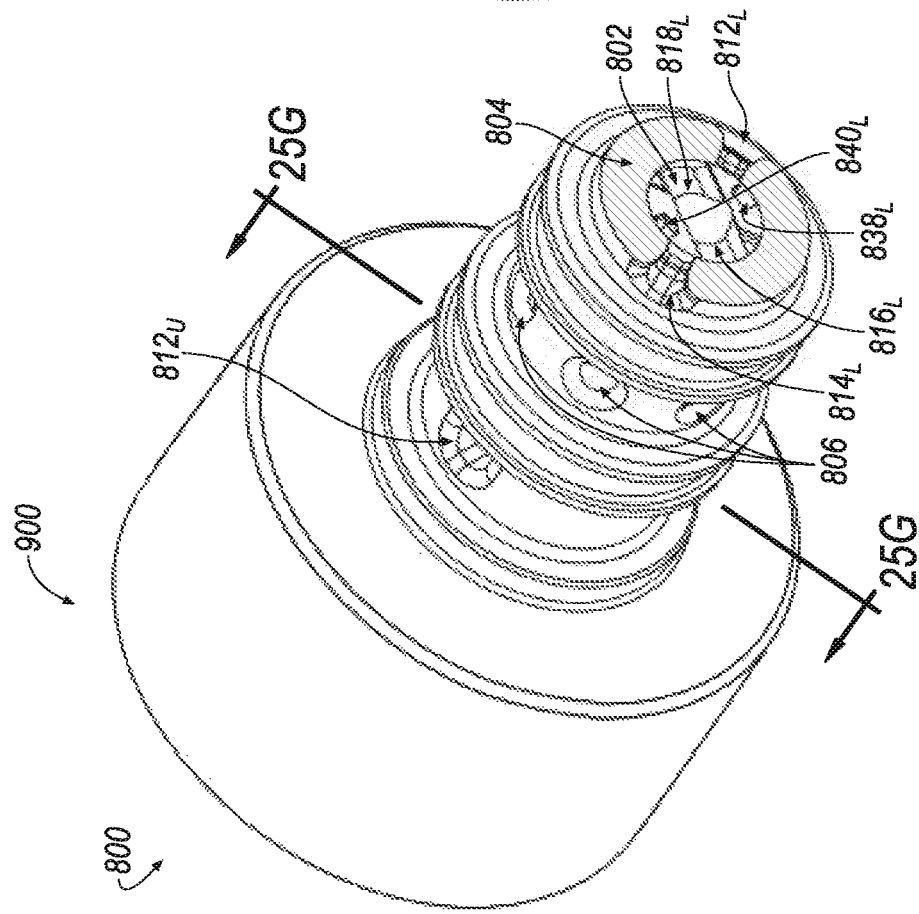
FIG. 24G is a schematic cross-sectional view of the valve of FIGS. 5-10 showing the spool rotated relative the sleeve for arranging the valve in a seventh example orientation that is referenced from line 24-24 of any of FIGS. 7-9.
Figure 25H:
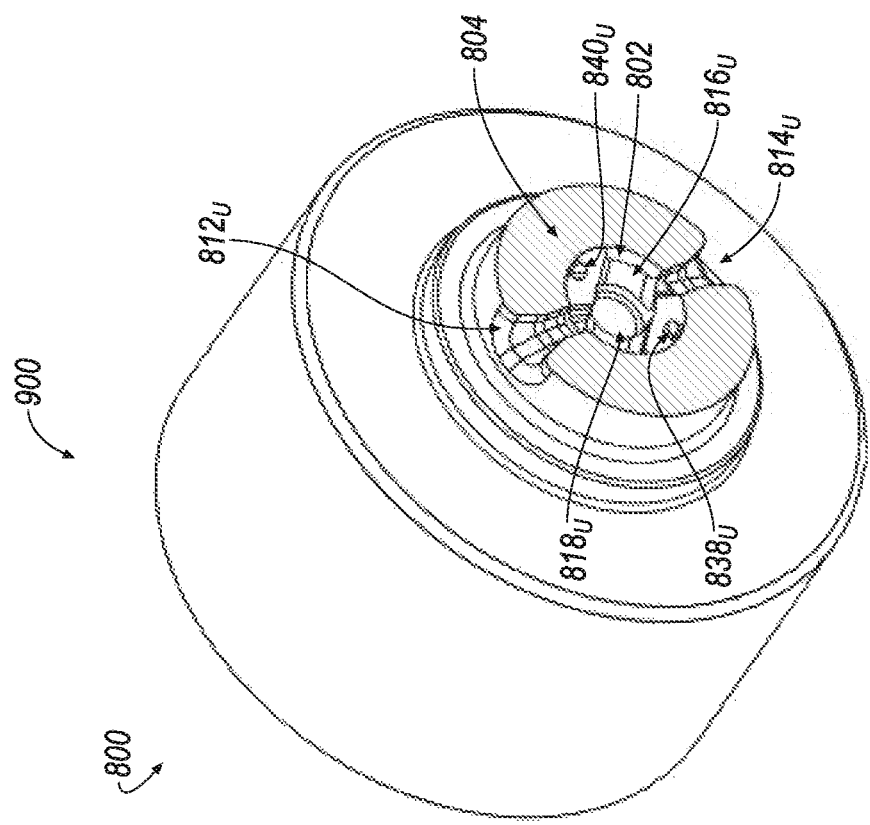
FIG. 25H is a schematic cross-sectional view of the valve of FIGS. 5-10 showing the spool rotated relative the sleeve for arranging the valve in an eighth example orientation that is referenced from line 25-25 of any of FIGS. 7-9.
Figure 24H:
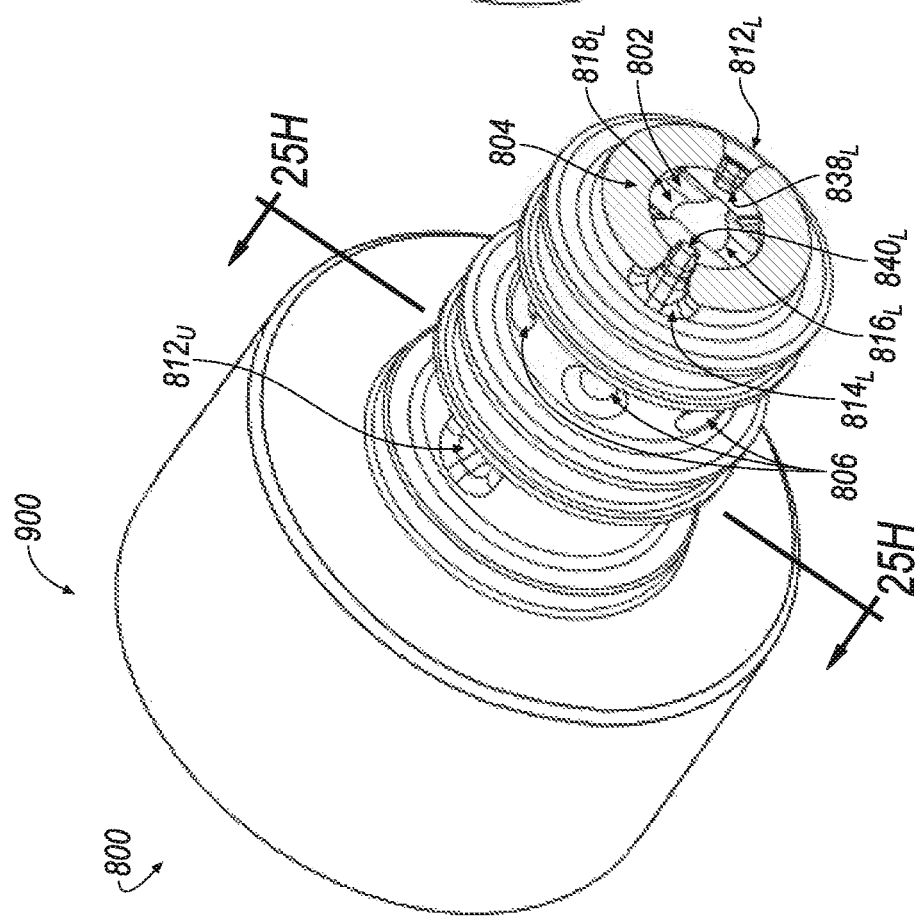
FIG. 24H is a schematic cross-sectional view of the valve of FIGS. 5-10 showing the spool rotated relative the sleeve for arranging the valve in an eighth example orientation that is referenced from line 24-24 of any of FIGS. 7-9.
Figure 25I:
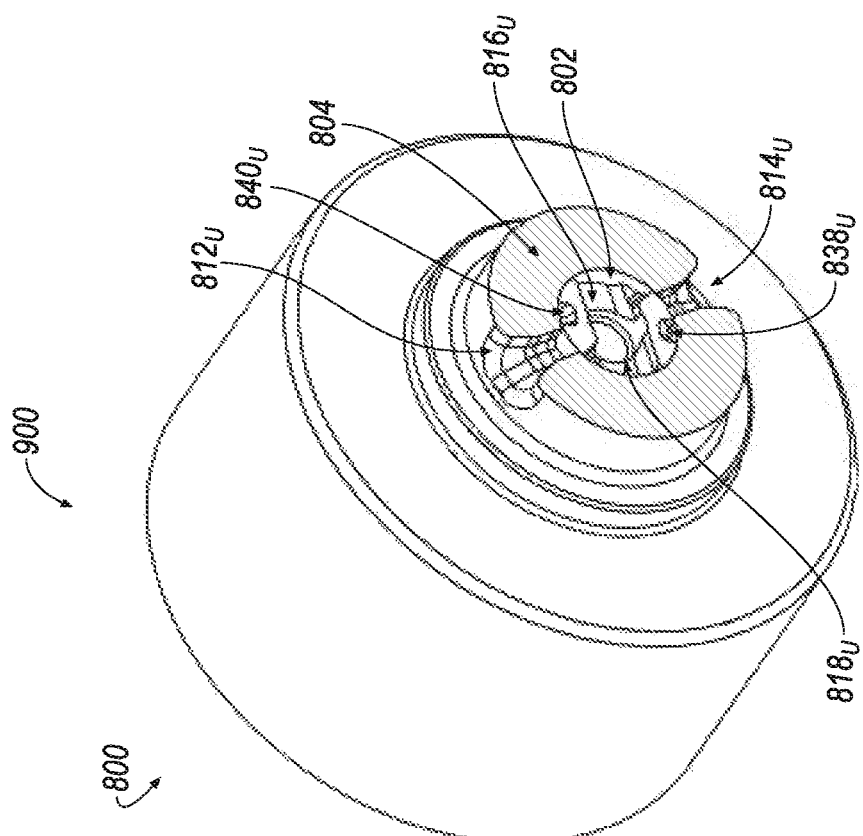
FIG. 25I is a schematic cross-sectional view of the valve of FIGS. 5-10 showing the spool rotated relative the sleeve for arranging the valve in a ninth example orientation that is referenced from line 25-25 of any of FIGS. 7-9.
Figure 24I:
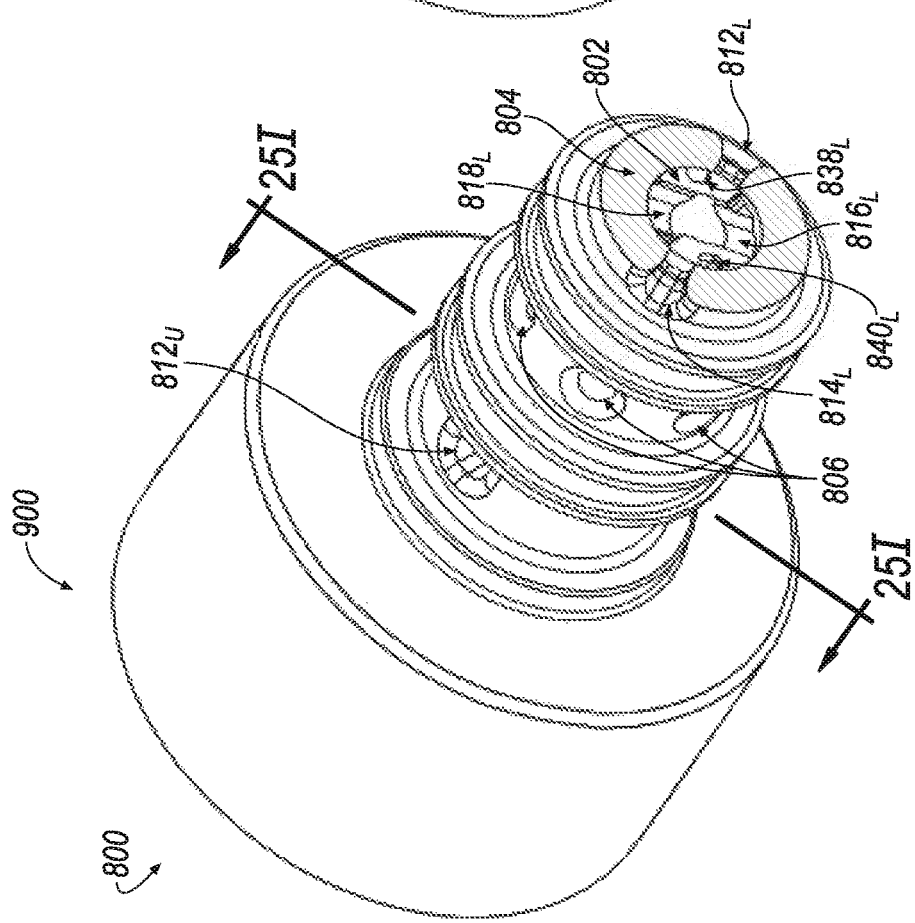
FIG. 24I is a schematic cross-sectional view of the valve of FIGS. 5-10 showing the spool rotated relative the sleeve for arranging the valve in a ninth example orientation that is referenced from line 24-24 of any of FIGS. 7-9.

Referring to FIG. 23, each of the one or more control ports 812$_U$, 812$_L$, 814$_U$, 814$_L$ is defined by a control port edge profile 866 having a length L$_{866}$ and a width W$_{866}$. The width W$_{866}$ extends along a portion of a circumference of the tube-shaped body 842 in a direction substantially perpendicular to the longitudinal axis A$_{804}$ of the sleeve 804. The length I$_{866}$ extends in a direction substantially parallel to the longitudinal axis A$_{804}$ of the sleeve 804.

Each control port edge profile 866 includes: an upper linear segment 866$_1$; a lower linear segment 866$_2$; a first side linear segment 866$_3$; and a second side linear segment 866$_4$. In some implementations, each control port edge profile 866 includes first, second, third and fourth arcuate corner segments 866$_5$, 866$_6$, 866$_7$, 866$_8$ connecting adjacent linear segments defined by the upper linear segment 866$_1$, the lower linear segment 866$_2$, the first side linear segment 866$_3$, and the second side linear segment 866$_4$. Each control port edge profile 866 may generally define a square shape or a rectangular shape with curved corners. In the example shown, the length L$_{866}$ of each control port edge profile 866 is greater than the width W$_{866}$ of each control port edge profile 866.

With continued reference to FIG. 23, the one or more control ports 812$_U$, 812$_L$, 814$_U$, 814$_L$ include: a first upper control port 812$_U$; a second upper control port 814$_U$; a first lower control port 812$_L$; and a second lower control port 814$_L$. The first and second upper control ports 812$_U$, 814$_U$ may be circumferentially arranged around an upper portion/row of the tube-shaped body 842, while the first and second lower control ports 812$_L$, 814$_L$ may be circumferentially arranged around lower portion/row of the tube-shaped body 842. In the example shown, the lower portion/row of the tube-shaped body 842 is axially below the upper portion/row of the tube-shaped body 842.

In some implementations, each inlet port 806 is defined by a pressure port edge profile 868 that forms a diameter D$_{868}$ of each inlet port 806. Each inlet port 806 of the plurality of inlet ports 806 may be circumferentially arranged around an intermediate portion/row of the tube-shaped body 842 disposed axially between the upper and lower portions/rows of the tube-shaped body 842. For instance, each adjacent inlet port 806 may be spaced by a distance D$_{806'}$. Further, each inlet port 806 is axially spaced apart from the lower linear segments 866$_2$ associated with the first and second upper control ports 812$_U$, 814$_U$ by a second distance D$_{806''}$. Each inlet port 806 is further spaced apart from the upper linear segments 866$_1$ associated with the first and second lower control ports 812$_L$, 814$_L$ by a third distance D$_{806'''}$.

Referring to FIGS. 20-22, a portion 846' of the inner sidewall 846 of the tube-shaped body 842 of the sleeve 804 defines inner circumferential recess 870. As seen at FIGS. 22 and 23, the inner circumferential recess 870 includes a length L$_{870}$ that axially extends along a portion of a length of the first axial chamber portion 862a that axially extends through the stem portion 842a of the tube-shaped body 842.

Referring to FIG. 22, the portion 846' of the inner sidewall 846 defines an upper end 870$_U$ of the inner circumferential recess 870, a lower end 870$_L$ of the inner circumferential recess 870, and an intermediate portion 870$_1$ of the inner circumferential recess 870 extending between and connecting the upper end 870$_U$ to the lower end 870$_L$. Referring to FIGS. 22 and 23, in some implementations, the upper end 870$_U$ of the inner circumferential recess 870 is axially spaced apart from the lower linear segments 866$_2$ of the first and second upper control port 812$_U$, 814$_U$ by a length L$_{870'}$. Similarly, the lower end 870$_U$ of the inner circumferential recess 870 is axially spaced apart from the upper linear segment 866$_1$ of the first and second lower control ports 812$_L$, 8141_, by the length L$_{870''}$.

Referring to FIG. 22, the inner circumferential recess 870 of the sleeve 804 is recessed into the inner side surface 846 of the sleeve 804 at a distance or depth D$_{870}$. In some examples, the distance or depth D$_{870}$ may define one or more of a constant distance or depth D$_{870'}$ or a non-constant distance or depth D$_{870''}$. In some implementations, the constant distance or depth D$_{870'}$ of the inner circumferential recess 870 of the sleeve 804 extends along most of the length L$_{870}$ of the circumferential recess 870 defined by the intermediate portion 870$_1$. On the other hand, the non-constant distance or depth D$_{870''}$ of the inner circumferential recess

870 of the sleeve 804 may decrease as the inner circumferential recess 870 extends from the intermediate portion 870$_1$ of the inner circumferential recess 870 toward the upper end 870$_U$ of the inner circumferential recess 870. In other implementations, the non-constant distance or depth D$_{870"}$ of the inner circumferential recess 870 of the sleeve 804 decreases as the inner circumferential recess 870 extends from the intermediate portion 870$_1$ of the inner circumferential recess 870 toward the lower end 870$_L$ of the inner circumferential recess 870.

Figure 9:
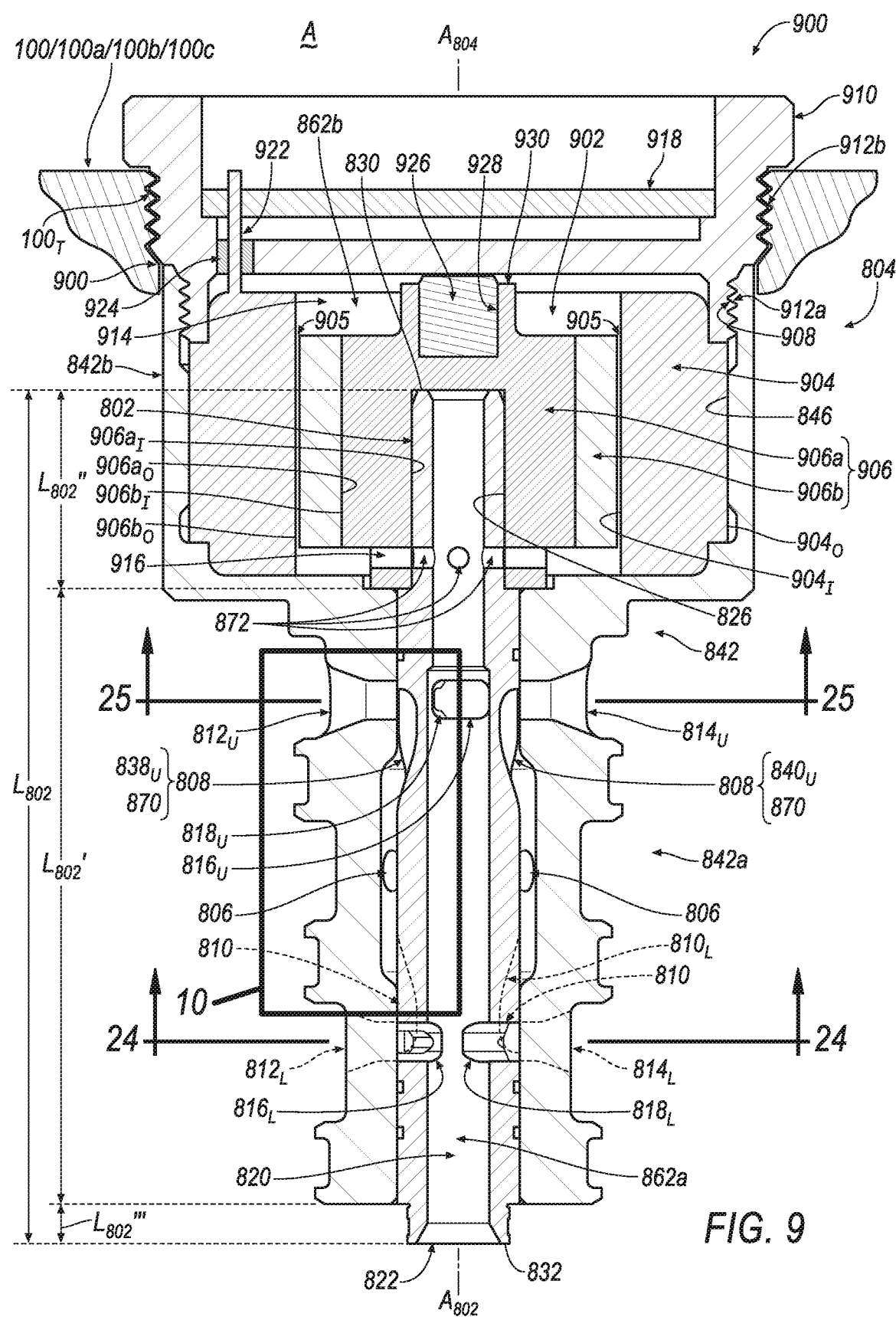
FIG. 9 is another assembled cross-sectional view of the valve according to line 9-9 of FIG. 7.

Referring to FIG. 9, the rotary valve assembly 900 may be a manifold style four-way valve or a four-way hydraulic servo valve that includes a spool-rotating portion 902. In some implementations, the spool-rotating portion 902 is configured to drive 360° rotational movement of the spool 802 about the longitudinal axis A$_{802}$ relative to the sleeve 804. Thus, the spool-rotating portion 902 is coupled for common rotation with the spool 802. The spool-rotating portion 902 may drive the spool in a first direction of rotation about the longitudinal axis A$_{802}$, e.g., one of a clockwise direction or a clockwise direction, and/or in a second direction of rotation about the longitudinal axis A$_{802}$, e.g., the other one of the clockwise direction or the clockwise direction.

The rotary valve assembly 900 can be an electrically operated valve. In an example, the spool-rotating portion 902 is in communication with the controller 102. Here, the controller 102 may instruct the spool-rotating portion 902 (e.g., via a changing analog or digital input signal) to drive rotation of the spool 802 about the longitudinal axis A$_{802}$ relative to the sleeve 804. Rotation of the spool 802 about the longitudinal axis A$_{802}$ relative to the sleeve 804 may control how the fluid 1012 is hydraulically ported to the hydraulic actuator 1006 for providing a smooth set of movements or a smooth motion of the piston 1008 in the first axial direction D1 (see FIGS. 26A', 26B and 26B') and/or the opposite second axial direction D2 (FIGS. 26G', 26H and 26H').

Referring to FIG. 9, the second portion L$_{802"}$ of the length L$_{802}$ of the spool 802 is arranged within the second axial chamber portion 862b extending through the cap portion 842b of the tube-shaped body 842 of the sleeve 804. The spool-rotating portion 902 is also arranged within the second axial chamber portion 862b and engages a portion of the outer side surface 826 of the tube-shaped body 824 extending along the second portion L$_{802"}$ of the length L$_{802}$ of the spool 802. The spool-rotating portion 902 may include a rotary actuator such as a brushless direct current (DC) motor including a stator 904 and a rotor 906. The rotor may include a rotor hub 906a and a rotor 906b. An inner surface 906a$_I$ of the rotor hub 906a circumscribes and is spaced apart from the outer side surface 826 (extending along the second portion L$_{802"}$ of the length L$_{802}$) of the tube-shaped body 824 of the spool 802, defining a radial gap 905 therebetween. An inner surface 906b$_1$ of the rotor 906b circumscribes and engages an outer surface 906a$_O$ of the rotor hub 906a. An inner surface 904$_I$ of the stator 904 circumscribes an outer surface 906b$_O$ of the rotor 906b. An outer surface 904$_O$ of the stator 904 may be disposed adjacent the inner side surface 846 of the sleeve 804 that defines the second axial chamber portion 862b extending through the cap portion 842b of the tube-shaped body 842 of the sleeve 804.

A portion of the inner sidewall 846 of the sleeve 804 may define an inner threaded surface 908. The rotary valve assembly 900 may further include a valve cap 910 including a first threaded outer surface 912a and a second threaded outer surface 912b. The first threaded outer surface 912a of the valve cap 910 is sized for engaging the inner threaded surface 908 extending along the portion of the inner side surface 846 of the sleeve 804 that extends from the upper end surface 848 of the tube-shaped body 842 of the sleeve 804. Upon coupling the valve cap 910 to the sleeve 804 by way of engagement of the inner threaded surface 908 of the sleeve 804 and the first threaded outer threaded surface 912a of the valve cap 910, the valve cap 910 fluidly seals the second axial chamber portion 862b extending through the cap portion 842b of the tube-shaped body 842 of the sleeve 804 from surrounding atmosphere A and thereby defines a motor cavity 914 of the rotary valve assembly 900. Thereafter, the second threaded outer surface 912b of the valve cap 910 may be threadingly-engaged with an inner threaded surface 100$_T$ of a base structure 100. Here, the inner threaded surface 100$_T$ of the base structure 100 may include a threaded surface 100$_T$ of the robotic device 100 configured for connect to the rotary valve assembly 900.

The rotor hub 906a may further define a plurality of radial fluid-flow passages 916 extending radially through the rotor hub 906a between the inner surface 906b$_1$ and the outer surface 906b$_O$ of the rotor hub 906. The tube-shaped body 824 of the spool 802 defines a plurality of radial fluid-flow passages 872 extending through the thickness T$_{802}$ of the tube-shaped body 824 of the spool 802. The plurality of radial fluid-flow passages 872 are arranged along the second portion L$_{802"}$ of the length L$_{802}$ of the spool 802. Accordingly, low pressure fluid 1012 may be communicated from the hydraulic actuator 1006 (see also, e.g., FIGS. 26B-26H), into the axial chamber 820 of the spool 802, and through the plurality of radial fluid-flow passages 872 extending through the thickness T8$o$2 of the tube-shaped body 824 of the spool 802. The low pressure fluid 1012 may then be directed through the plurality of radial fluid-flow passages 916 extending radially through the rotor hub 906a and into the motor cavity 914 of the rotary valve assembly 900 for flooding the motor cavity 914 with the low pressure fluid 1012.

The rotary valve assembly 900 may further include data processing hardware (e.g., a printed circuit board 918 including electronics) in communication with the controller 102. The valve cap 910 may include an outer surface 920 that engages or supports the printed circuit board 918. The stator 904 may further include one or more motor leads 922 extending away from the stator 904. The valve cap 910 may define one or more passages 924 that is/are sized for permitting passage of the one or more motor leads 922 in order to permit that one or more motor leads 922 to connect the stator 904 of the spool rotating portion 902 to one or more of the controller 102 or the printed circuit board 918. The one or more passages 924 are sealed with a seal in order fluidly-seal the motor cavity 914 from surrounding atmosphere A.

In some examples, the rotary valve assembly 900 further includes a rotary position sensor 926 configured to measure rotational position of the spool 802 relative to the sleeve 804. The rotary position sensor 926 may be disposed within a recess 928 formed within an end surface 930 of the rotor hub 906a. The rotary position sensor 926 may be in communication the controller 102 directly, or via the printed circuit board 918, in order to provide instantaneous measurements of the rotational position of the spool 802 back to the controller 102. In some instances, the rotary position sensor 926 may include a magnetic rotary encoder.

Figure 10:
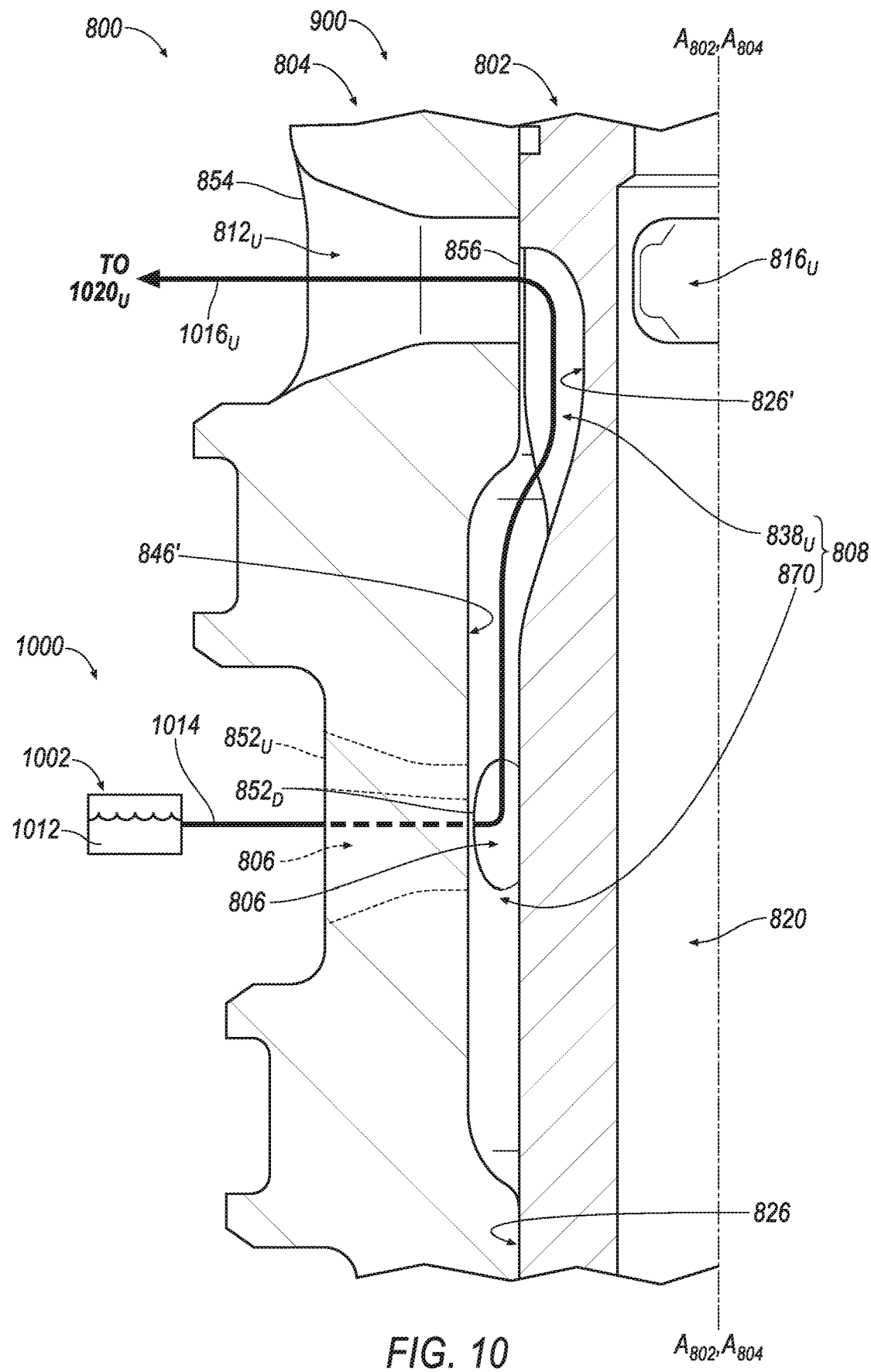
FIG. 10 is an enlarged cross-sectional view of the valve according to line 10 of FIG. 9.
Figure 11:
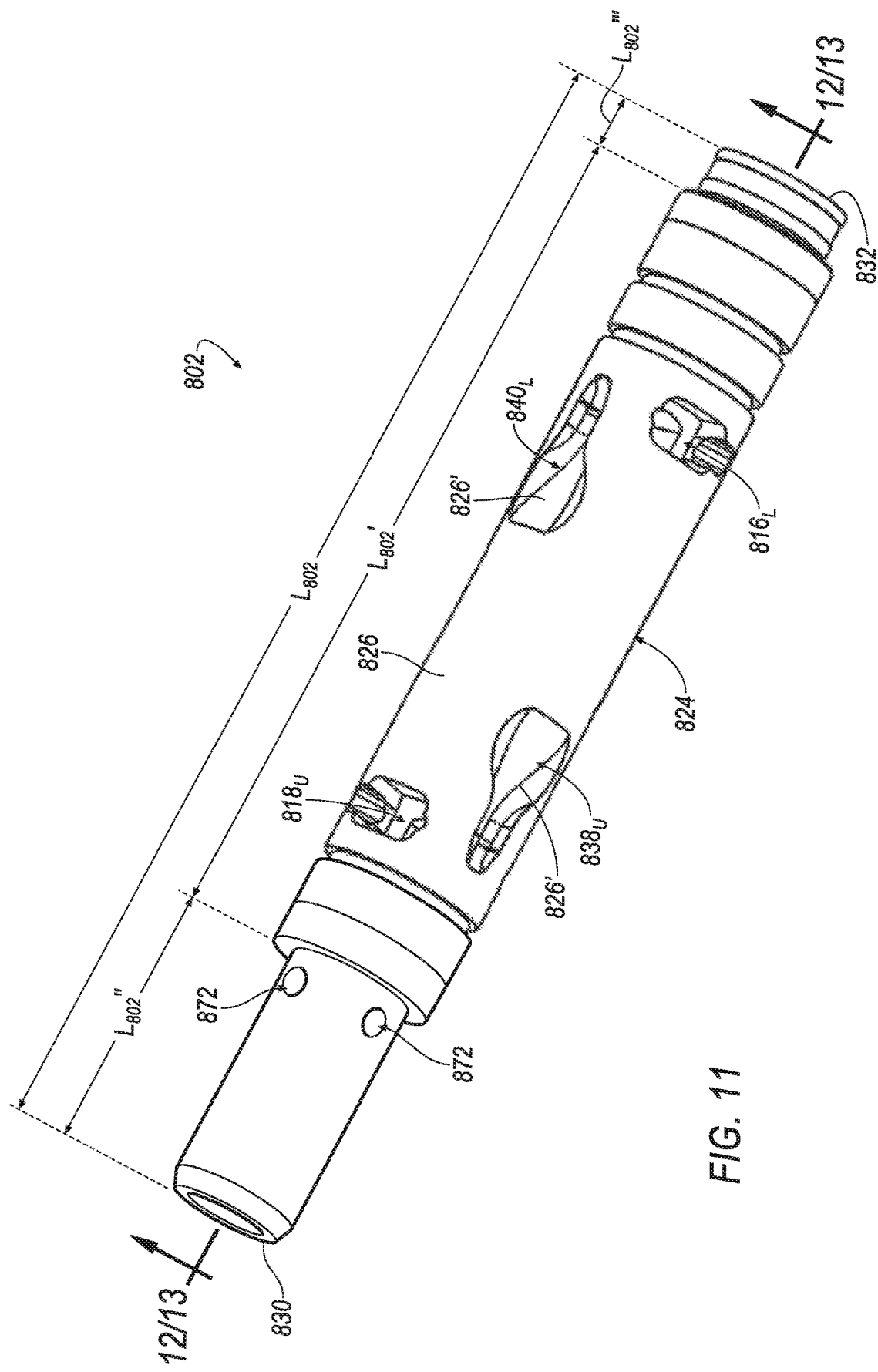
FIG. 11 is a schematic view of an example spool of the valve of FIG. 5.

When the spool 802 is disposed within the sleeve 804, the outer side surface portions 826' of the outer sidewall 826 of the spool 802 and the inner circumferential recess 870 defined by the portion 846' of the inner sidewall 846 of the sleeve 804 cooperate to form the upper cavity 808 and the lower cavity 810 in communication with the inlet ports. In some examples, with reference to FIGS. 10, 26A', 26B and 26B', upon sufficient rotation of the spool 802 relative the sleeve 804, pressurized fluid 1012 is permitted to flow between: (1) the outer side surface portions 826' of the outer side surface 826 of the tube-shaped body 824 of the spool 802 that define the first upper scalloped recess $838_U$ and the second upper scalloped recess $840u$; and (2) the inner circumferential recess 870 defined by the portion 846' of the inner side surface 846 of the tube-shaped body 842 the sleeve 804 that collectively form the upper cavity 808. Although not represented in an enlarged cross-sectional view at FIG. 10, in some other examples, with reference to FIGS. 26G', 26H and 26H', upon sufficient rotation of the spool 802 relative the sleeve 804, pressurized fluid 1012 is permitted to flow between: (1) the outer side surface portions 826' of the outer side surface 826 of the tube-shaped body 824 of the spool 802 that define the first lower scalloped recess $838_L$ and the second lower scalloped recess $840_L$; and (2) the inner circumferential recess 870 defined by the portion 846' of the inner side surface 846 of the tube-shaped body 842 the sleeve 804 that collectively form the lower cavity 810.

Referring to FIGS. 24A-24I, 25A-25I and 26A-26I, a 180° rotational movement of the spool 802 about the longitudinal axis $A_{802}$ relative to the sleeve 804 is shown. Furthermore, with reference to FIGS. 27 and 28, a relationship between an orifice area (see the X-axis) of the rotary valve assembly 900 in comparison to a rotational angle (see the Y-axis) of the spool 802 relative the sleeve 804 is also shown as the spool 802 rotates 180° about the longitudinal axis $A_{802}$.

Figure 29:
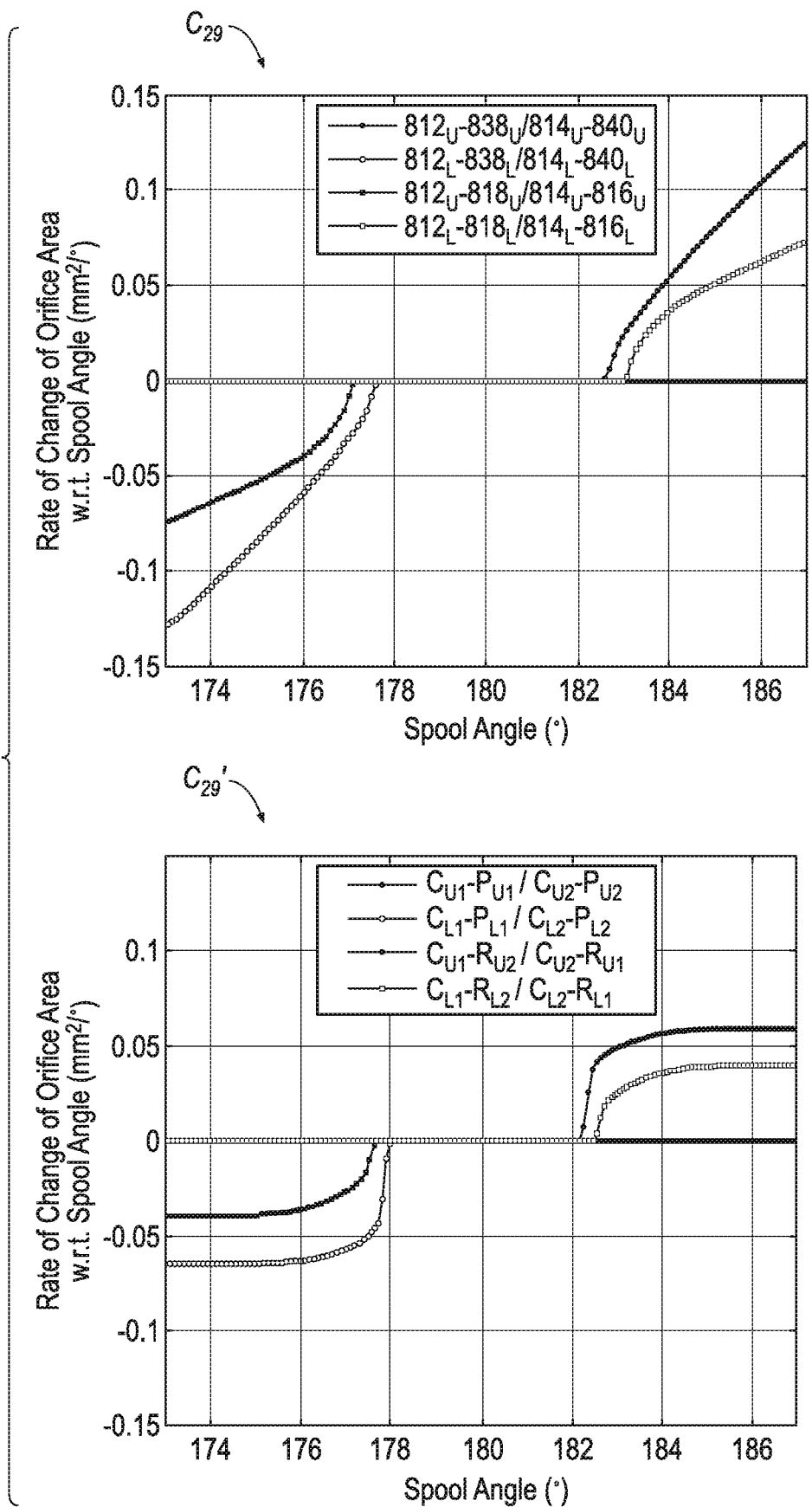
FIG. 29 includes graphs illustrating a rate of change of the orifice area relationship according to rotation of the spool relative the sleeve of the valve of FIGS. 5-10 according to rotation of the spool relative the sleeve according to FIGS. 24A-24I, 25A-25I and 26A-26I that is juxtaposed against another graph illustrating a rate of change of the orifice area relationship according to rotation of a spool relative a sleeve of another valve.

The spool 800 and the sleeve 804 of the rotary valve subassembly 800 cooperate in a manner to provide exceptional peak flow capability. As seen at, for example, FIGS. 26A' and 26G', the rotary valve subassembly 800 provides a progressive orifice opening (and a corresponding progressive orifice closing at FIGS. 26B' and 26H') in order to: avoid cavitation (thereby avoiding the use of anti-cavitation check valves); preserve fine control of fluid flow; and allow high peak flow or pressurized fluid 1012 from the pressurized fluid source 1002 while maintaining good flow sensitivity at low flowrates (as seen at, e.g., FIG. 29). Furthermore, the flared portion of each of: (1) the inlet ports 806; and (2) the one or more control ports $812_U$, $812_L$, $814_U$, $814_L$ minimizes pressure drops and reduces stress and deflection of the spool 802 relative the sleeve 804.

Figure 27:
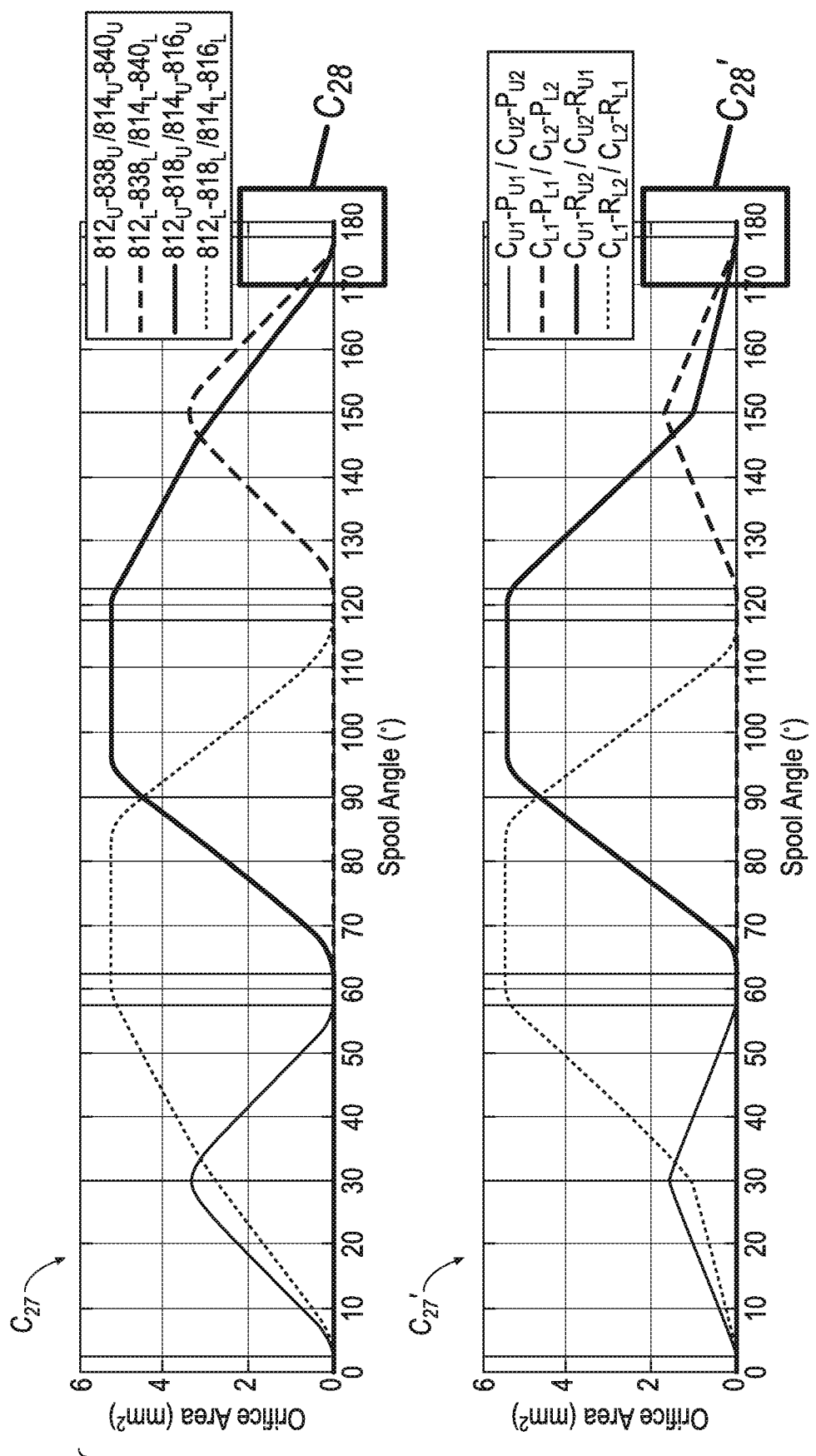
FIG. 27 is a graph illustrating orifice area relationship of the valve of FIGS. 5-10 according to rotation of the spool relative the sleeve according to FIGS. 24A-24I, 25A-25I and 26A-26I that is juxtaposed against another graph illustrating orifice area relationship according to rotation of a spool relative a sleeve of another valve.

The orifice area of FIGS. 27 and 28 is represented in square millimeters (mm²) and is shown ranging between 0.00 mm² and 6.00 mm² along the X-axis. The rotational angle of the spool 802 is represented in degrees. With reference to FIGS. 24A-24I and 25A-25I, the spool 802 is shown rotating relative the sleeve 804 in a counter-clockwise direction; however, the spool 802 may alternatively be rotated in a clockwise direction, and, as such, a similar graphical representation of FIG. 27 may be symmetrically reflected to the left of the X-axis to thereby represent a range between 0° and −180° to define a full 360° rotation of the spool 802 relative the sleeve 804.

Figure 26A:
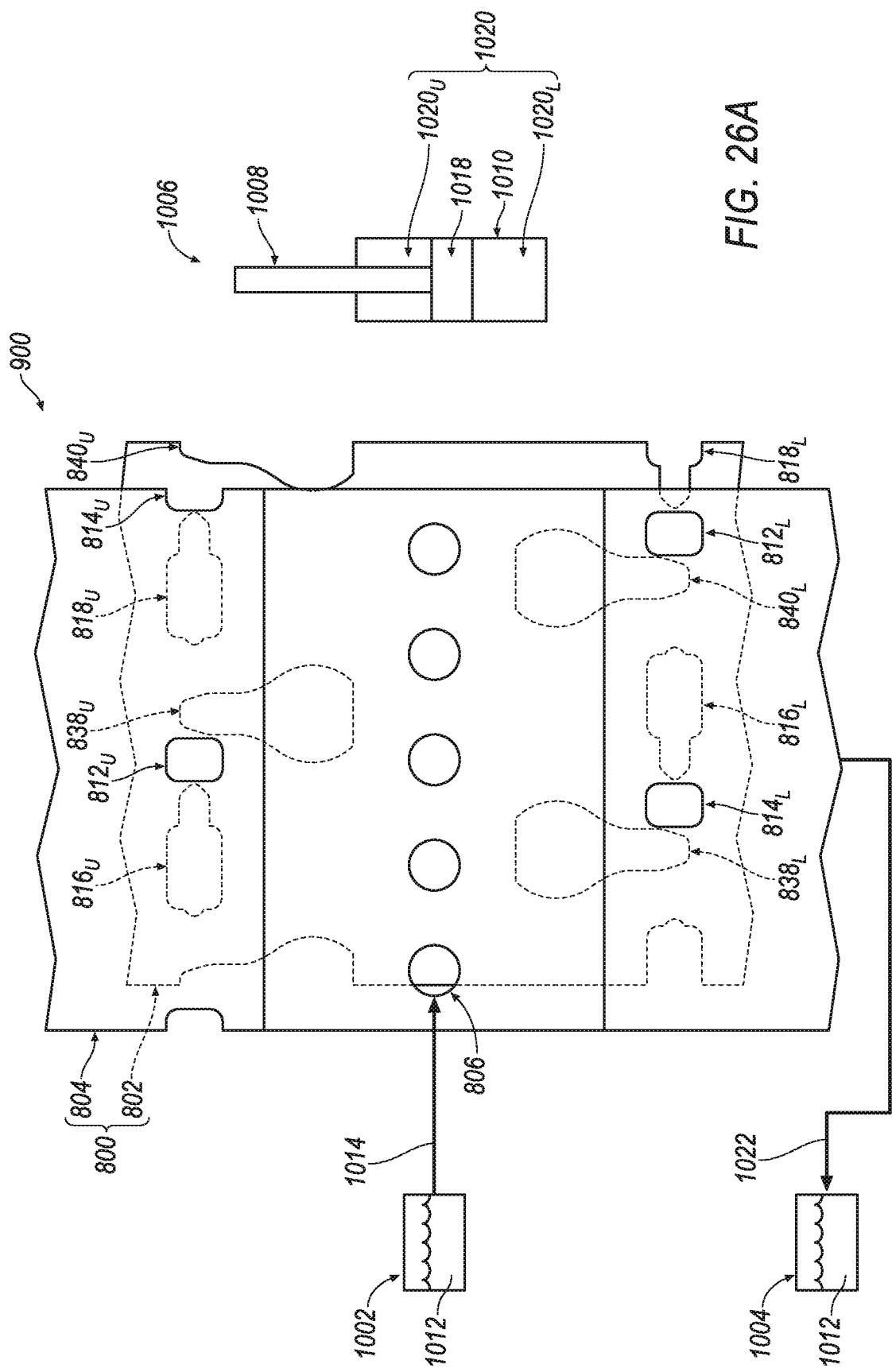
FIG. 26A is a plan view of valve of FIGS. 5-10 represented by the surface area of the side surface of the spool of FIG. 15 that is overlapped with the plan view of the surface area of the side surface of the sleeve of FIG. 23 that corresponds to the first example orientation of the spool rotated relative the sleeve of FIGS. 24A and 25A.

With reference to FIG. 26A (see also corresponding views at FIGS. 24A and 25A) and 27, the rotary valve assembly 900 is in a closed or "null" position when the rotational angle (see the Y-axis) of the spool 802 relative the sleeve 804 is 0°. When arranged in the closed position, the pressurized fluid 1012 within the pressurized fluid source 1002 is communicated to the plurality of inlet ports 806 of the sleeve 804 and into the upper cavity 808 and the lower cavity 810. However, because the plurality of scalloped recesses $838_U$, $838_L$, $840_U$, $840_L$ of the spool 802 are not rotated for alignment with the one or more control ports $812_U$, $812_L$, $814_U$, $814_L$ of the sleeve 804, the rotary valve assembly 900 does not permit the pressurized fluid 1012 within either of the upper cavity 808 and the lower cavity 810 to be communicated to the hydraulic actuator 1006; similarly, because the return pressure ports $816_U$, $816_L$, $818_U$, $818_L$ of the spool 802 are not rotated for alignment with the one or more control ports $812_U$, $812_L$, $814_U$, $814_L$ of the sleeve 804, the rotary valve assembly 900 does not permit the fluid 1012 within the hydraulic actuator 1006 to be communicated to the low pressure fluid reservoir 1004.

Referring to FIG. 26A', the spool 802 rotates relative to the sleeve 804 by about 10° to transition the rotary valve assembly 900 from the closed position to a "hi/lo servo" mode. Here, the orifice area resulting from the rotational alignment of the first upper control port $812_U$ with the first upper scalloped recess $838_U$ and the second upper control port $814_U$ with the second upper scalloped recess $840_U$ is about 0.75 mm² (see, e.g., FIG. 27) whereas the orifice area resulting from the rotational alignment of the first lower control port $812_L$ with the second lower return pressure port $818_L$ and the second lower control port $814_L$ with the first lower return pressure port 816L about 0.50 mm² (see, e.g., FIG. 27).

As seen at FIG. 26A', when the rotational angle (see the Y-axis) of the spool 802 relative the sleeve 804 is 10°: a portion of the width $W_{836}$ of the recessed edge profile 836 is rotationally aligned with a portion of the width $W_{866}$ of the control port edge profiles 866 associated with the first and second upper control ports $812_U$, $814_U$; and (2) a portion of the width $W_{834}$ of the return pressure port edge profiles 834 associated the first and lower return pressure ports $816_L$, $818_L$ being rotationally aligned with a portion of the width $W_{866}$ of the control port edge profiles 866 associated with the first and second lower control ports $812_L$, $814_L$. As a result, pressurized fluid 1012 within the pressurized fluid source 1002 is communicated in a downstream direction: (1) firstly though the upper cavity 808 of the rotary valve subassembly 800; (2) then secondly through fluid control line, channel or branch $1016_U$; and (3) then thirdly into the first sub-chamber $1020_U$ of the cylindrical body 1010 of the hydraulic actuator 1006 for causing movement of the piston 1008 of the hydraulic actuator 1006 in the first axial direction D1. Furthermore, as a result of: (A) rotational alignment of some of the first lower return pressure port $816_L$ and some of the second lower return pressure port $818_L$ with, respectively, some of the width $W_{866}$ of the control port edge profile 866 defined by the second lower control port $814_L$ and the first lower control port $812_L$; and (B) movement of the piston 1008 of the hydraulic actuator 1006 in the first axial direction D1, the head 1018 of the piston 1008 forces fluid 1012 out of the second sub-chamber $1020_L$ of the cylindrical body 1010 of the hydraulic actuator 1006 in an upstream direction: (1) firstly from the second sub-chamber $1020_L$ and into the fluid control line, channel or branch $1016_L$; (2) then secondly from the fluid control line, channel or branch $1016_L$ and through the rotary valve subassembly 800 as a result of the rotational alignment of some of the first lower return pressure port $816_L$ and some of the second lower return pressure port $818_L$ with, respectively, some of the width $W_{866}$ of the control port edge profile 866 defined by the second lower control port $814_L$ and the first lower control port $812_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Figure 26B:
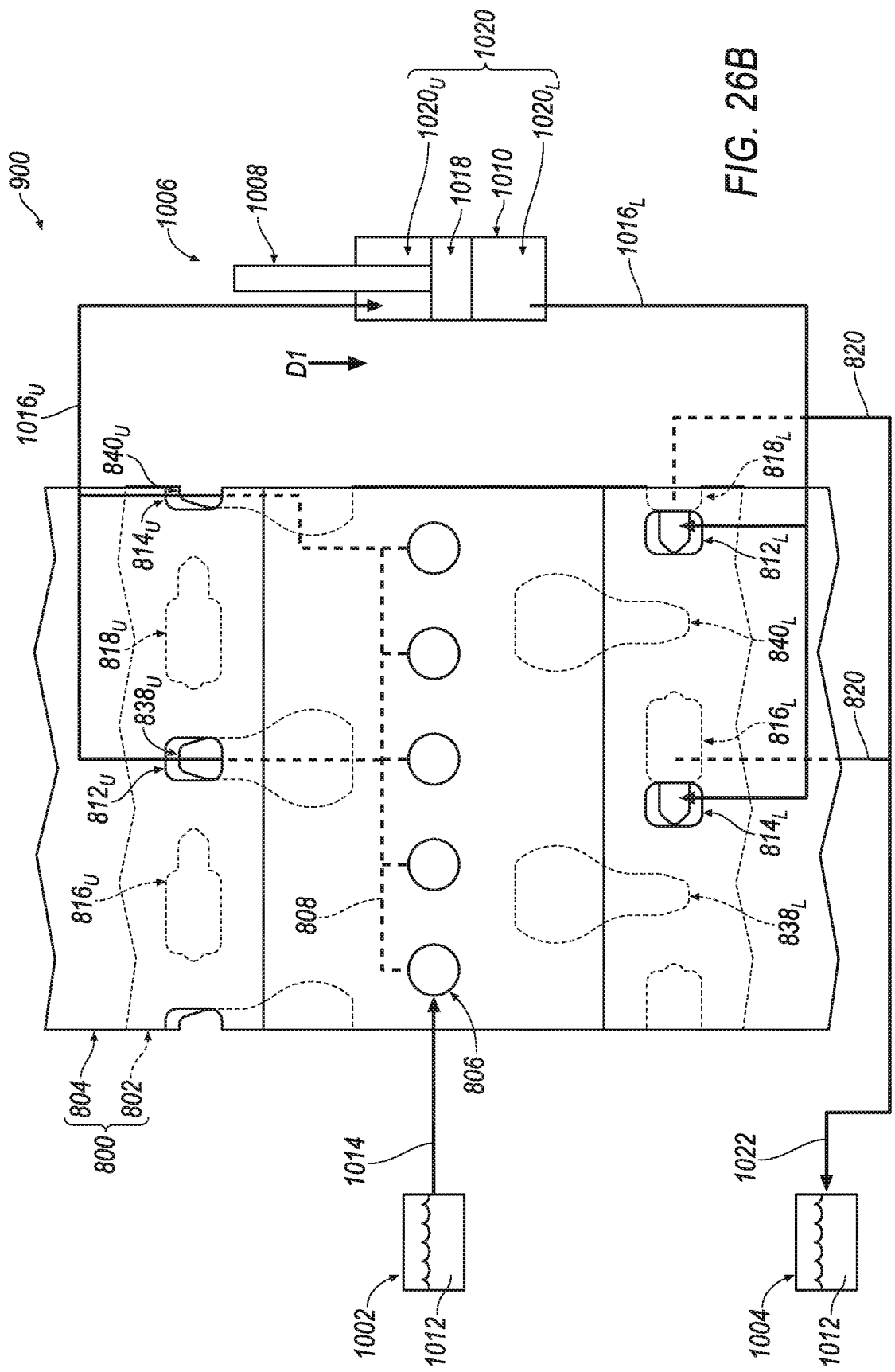
FIG. 26B is a plan view of valve of FIGS. 5-10 represented by the surface area of the side surface of the spool of FIG. 15 that is overlapped with the plan view of the surface area of the side surface of the sleeve of FIG. 23 that corresponds to the second example orientation of the spool rotated relative the sleeve of FIGS. 24B and 25B.

Referring to FIG. 26B, the spool 802 rotates to define an angular position relative the sleeve 804 equal to about 30° to transition the rotary valve assembly 900 into a "hi/lo max extension mode". Here, the orifice area resulting from the rotational alignment of the first upper control port 812$_U$ with the first upper scalloped recess 838$_U$ and the second upper control port 814$_U$ with the second upper scalloped recess 840$_U$ is maximized to be about 3.25 mm$^2$ (see, e.g., FIG. 27) whereas the orifice area resulting from the rotational alignment of the first lower control port 812$_L$ with the second lower return pressure port 818$_L$ and the second lower control port 814$_L$ with the first lower return pressure port 816$_L$ is about 2.75 mm$^2$ (see, e.g., FIG. 27).

As seen at FIG. 26B, when the rotational angle (see the Y-axis) of the spool 802 relative the sleeve 804 is 30°: (1) a greater portion of the width $W_{836}$ of the recessed edge profiles 836 associated with the first and upper scalloped recess 838$_U$, 840$_U$ is rotationally aligned with the entire width $W_{866}$ of the control port edge profile 866 associated with the first and second upper control ports 812$_U$, 814$_U$; and (2) a greater portion of the width $W_{834}$ of the return pressure port edge profiles 834 associated with the first and second lower return pressure ports 816$_L$, 818$_L$ is rotationally aligned with the entire width $W_{866}$ of the control port edge profiles 866 associated with the first and second lower control ports 812$_L$, 814$_L$. As a result of the rotational arrangement of the spool 802 relative the sleeve 804 as described above in association with FIG. 26B, pressurized fluid 1012 within the pressurized fluid source 1002 is communicated in the downstream direction: (1) firstly though the upper cavity 808 of the rotary valve subassembly 800; (2) then secondly through fluid control line, channel or branch 1016$_U$; and (3) then thirdly into the first sub-chamber 1020$_U$ of the cylindrical body 1010 of the hydraulic actuator 1006 for causing further movement of the piston 1008 of the hydraulic actuator 1006 in the first axial direction D1. Furthermore, as a result of: (A) rotational alignment of some of the first lower return pressure port 816$_L$ and some of the second lower return pressure port 818$_L$ with, respectively, all of the width $W_{866}$ of the control port edge profile 866 defined by the second lower control port 814$_L$ and the first lower control port 812$_L$; and (B) further movement of the piston 1008 of the hydraulic actuator 1006 in the first axial direction D1, the head 1018 of the piston 1008 forces fluid 1012 out of the second sub-chamber 1020$_L$ of the cylindrical body 1010 of the hydraulic actuator 1006 in the upstream direction: (1) firstly from the second sub-chamber 1020$_L$ and into the fluid control line, channel or branch 1016$_L$; (2) then secondly from the fluid control line, channel or branch 1016$_L$ and through the rotary valve subassembly 800 as a result of the rotational alignment of some of the first lower return pressure port 816$_L$ and some of the second lower return pressure port 818$_L$ with, respectively, all of the width $W_{866}$ of the control port edge profile 866 defined by the second lower control port 814$_L$ and the first lower control port 812$_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26B', the spool 802 rotates to define an angular position relative the sleeve 804 equal to about 50° to transition the rotary valve assembly 900 into "hi/lo motoring extension mode". Here, the orifice area resulting from the rotational alignment of the first upper control port 812$_U$ with the first upper scalloped recess 838$_U$ and the second upper control port 814$_U$ with the second upper scalloped recess 840$_U$ is about 0.75 mm$^2$ (see, e.g., FIG. 27) whereas the orifice area resulting from the rotational alignment of the first lower control port 812$_L$ with the second lower return pressure port 818$_L$ and the second lower control port 814$_L$ with the first lower return pressure port 816$_L$ diverges to a larger amount equal to about 4.50 mm$^2$ (see, e.g., FIG. 27).

As seen at FIG. 26B', when the rotational angle (see the Y-axis) of the spool 802 relative the sleeve 804 is 50°: (1) a portion of the width $W_{836}$ of the recessed edge profile 836 associated with the first and upper scalloped recesses 838$_U$, 840$_U$ being rotationally aligned with a portion of the width $W_{866}$ of the control port edge profile 866 associated with the first and second upper control ports 812$_U$, 814$_U$; and (2) a greater portion of the width $W_{834}$ of the return pressure port edge profiles 834 associated with the first and second lower return pressure ports 816$_L$, 818$_L$ being rotationally aligned with the entire width $W_{866}$ of the control port edge profiles 866 associated with the first and second lower control ports 812$_L$, 814$_L$. As a result of the rotational arrangement of the spool 802 relative the sleeve 804 as described above in association with FIG. 26B', pressurized fluid 1012 within the pressurized fluid source 1002 is communicated in the downstream direction: (1) firstly though the upper cavity 808 of the rotary valve subassembly 800; (2) then secondly through fluid control line, channel or branch 1016$_U$; and (3) then thirdly into the first sub-chamber 1020$_U$ of the cylindrical body 1010 of the hydraulic actuator 1006 for causing even further movement of the piston 1008 of the hydraulic actuator 1006 in the first axial direction D1. Furthermore, as a result of: (A) rotational alignment of some of the first lower return pressure port 816$_L$ and some of the second lower return pressure port 818$_L$ with, respectively, all of the width $W_{866}$ of the control port edge profile 866 defined by the second lower control port 814$_L$ and the first lower control port 812$_L$; and (B) even further movement of the piston 1008 of the hydraulic actuator 1006 in the first axial direction D1, the head 1018 of the piston 1008 forces fluid 1012 out of the second sub-chamber 1020$_L$ of the cylindrical body 1010 of the hydraulic actuator 1006 in the upstream direction: (1) firstly from the second sub-chamber 1020$_L$ and into the fluid control line, channel or branch 1016$_L$; (2) then secondly from the fluid control line, channel or branch 1016$_L$ and through the rotary valve subassembly 800 as a result of the rotational alignment of some of the first lower return pressure port 816$_L$ and some of the second lower return pressure port 818$_L$ with, respectively, all of the width $W_{866}$ of the control port edge profile 866 defined by the second lower control port 814$_L$ and the first lower control port 812$_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Figure 26C:
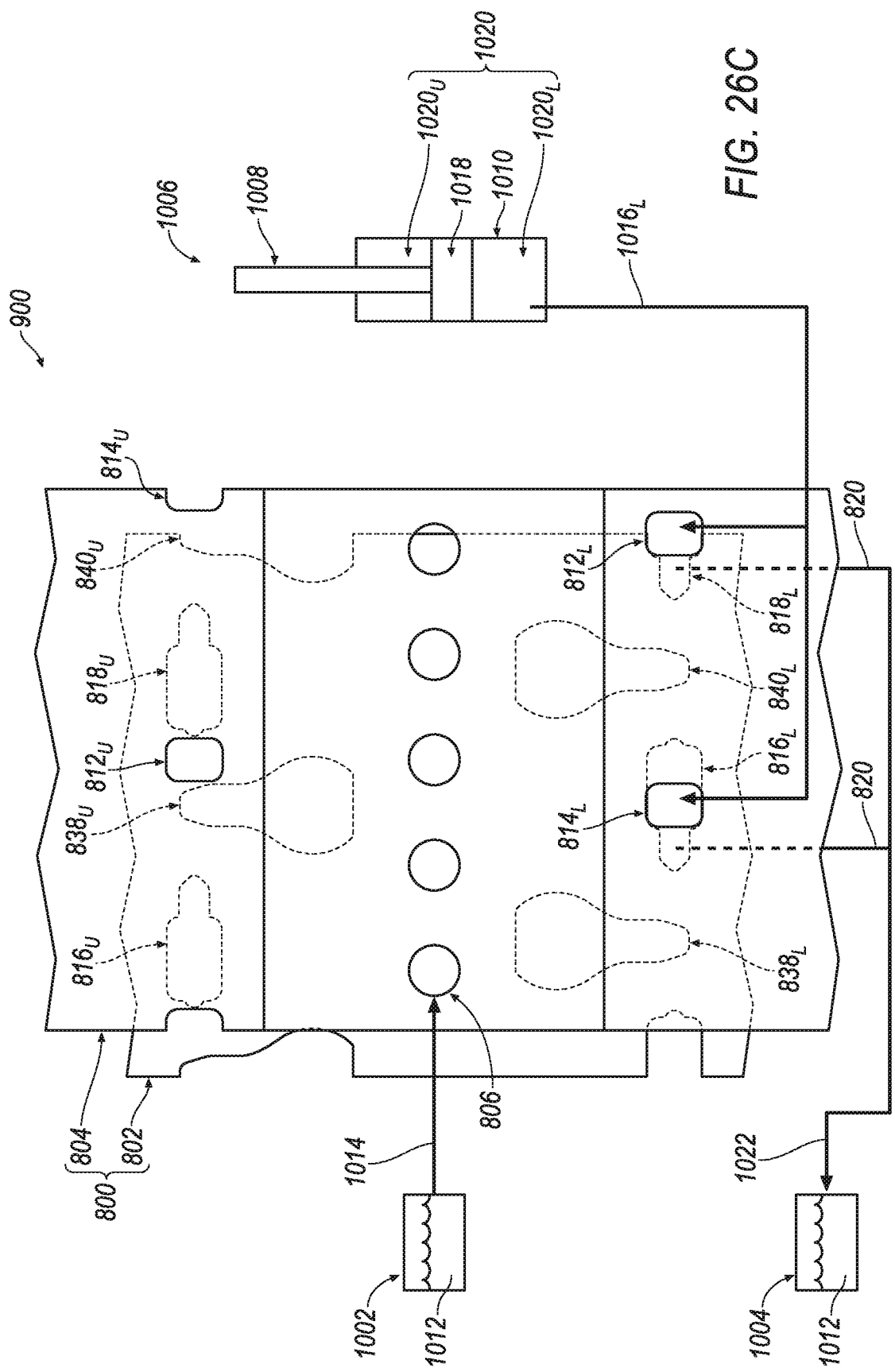
FIG. 26C is a plan view of valve of FIGS. 5-10 represented by the surface area of the side surface of the spool of FIG. 15 that is overlapped with the plan view of the surface area of the side surface of the sleeve of FIG. 23 that corresponds to the third example orientation of the spool rotated relative the sleeve of FIGS. 24C and 25C.
Figure 26G:
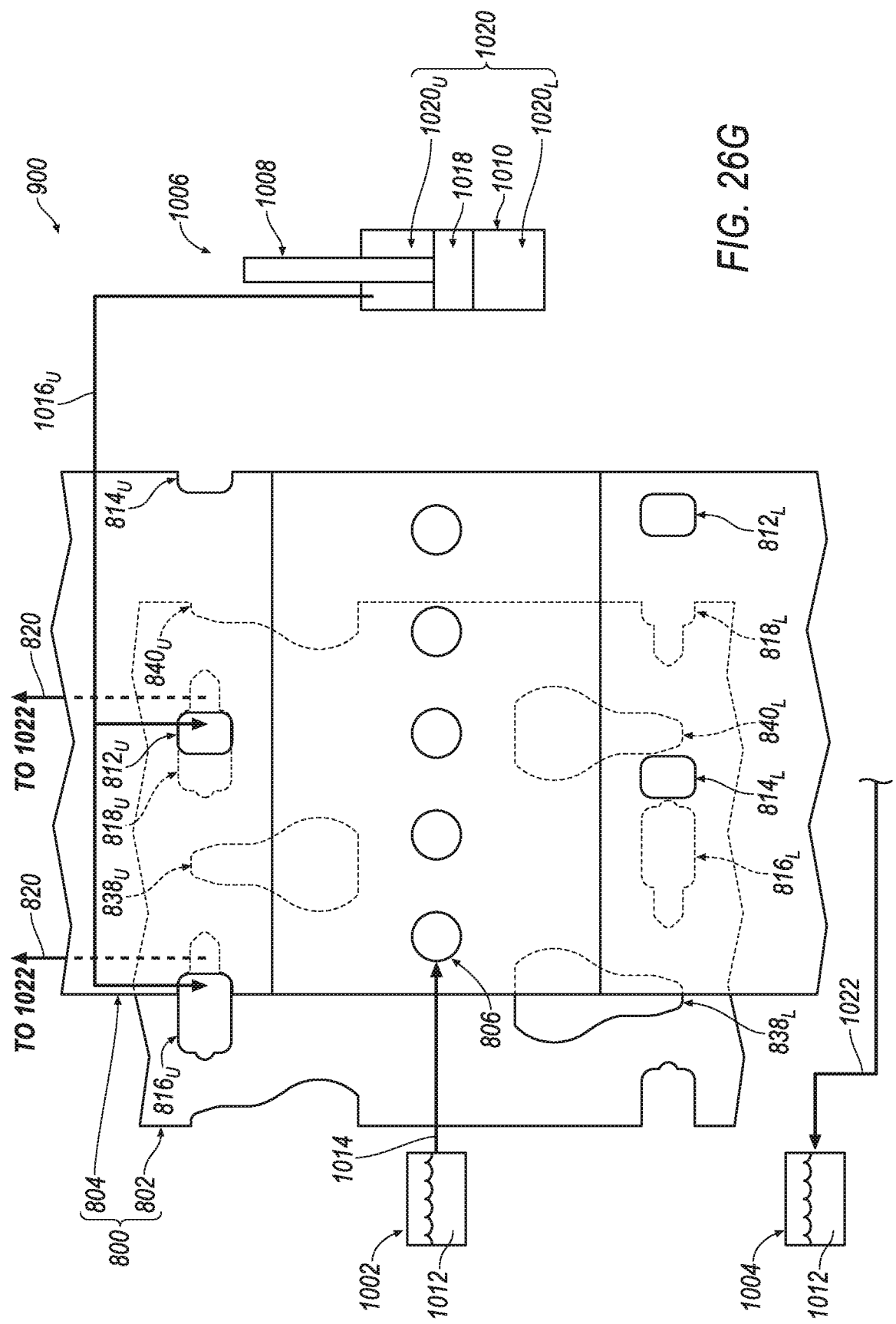
FIG. 26G is a plan view of valve of FIGS. 5-10 represented by the surface area of the side surface of the spool of FIG. 15 that is overlapped with the plan view of the surface area of the side surface of the sleeve of FIG. 23 that corresponds to the seventh example orientation of the spool rotated relative the sleeve of FIGS. 24G and 25G.
Figure 26G:
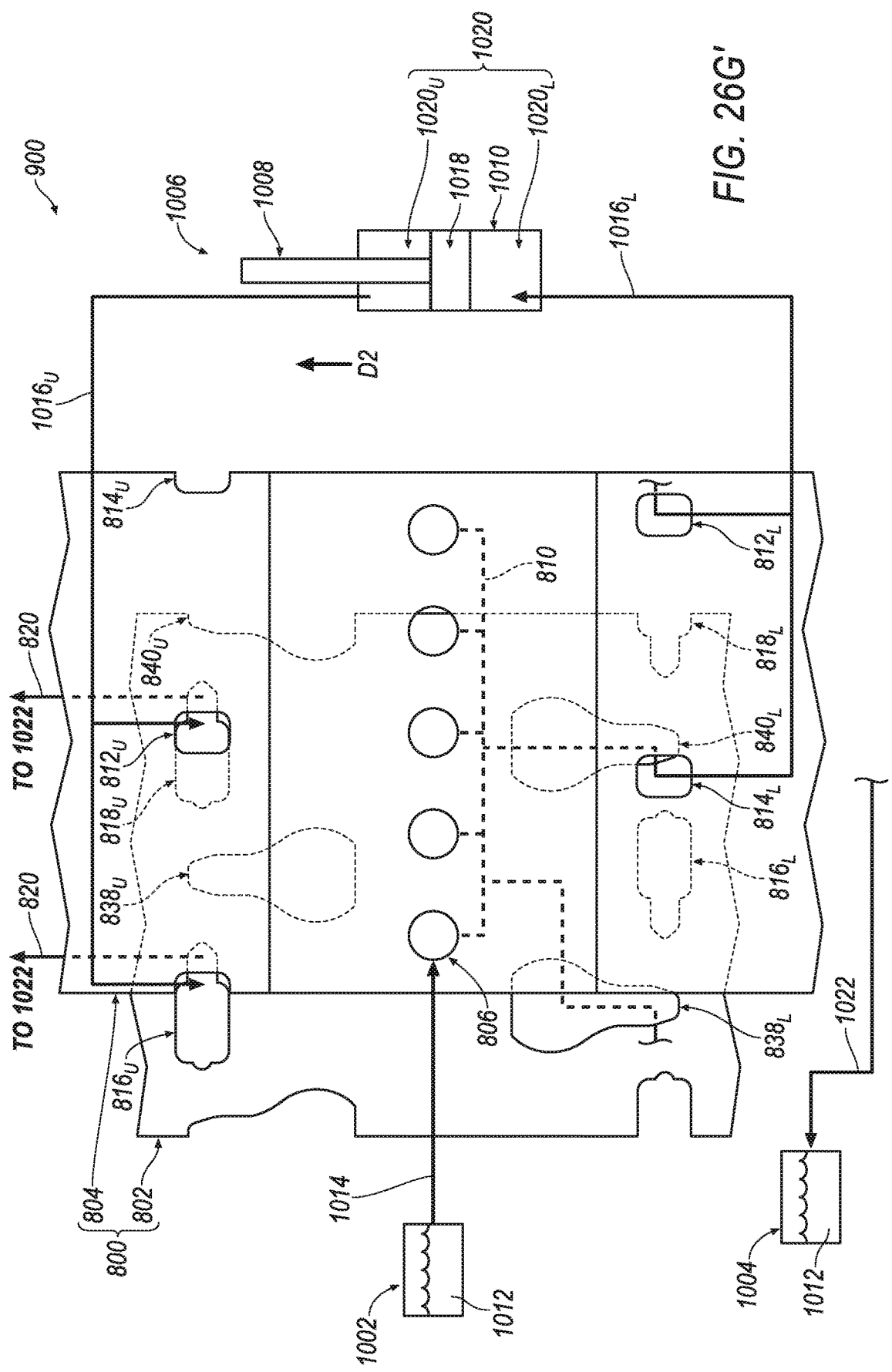

Referring to FIG. 26C, the spool 802 rotates to define an angular position relative the sleeve 804 equal to about 60° to transition the rotary valve assembly 900 into a "hi/lo null mode". Here, the orifice area resulting from the rotational alignment of the first upper control port 812$_U$ with the first upper scalloped recess 838$_U$ and the second upper control port 814$_U$ with the second upper scalloped recess 840$_U$ is reduced to be about 0.00 mm$^2$ (see, e.g., FIG. 27) whereas the orifice area resulting from the rotational alignment of the first lower control port $812_L$ with the second lower return pressure port $818_L$ and the second lower control port $814_L$ with the first lower return pressure port $816_L$ is maximized to about 5.25 mm² (see, e.g., FIG. 27).

As seen at FIG. 26C, when the rotational angle (see the Y-axis) of the spool 802 relative the sleeve 804 is 60°: (1) no portion of the width $W_{836}$ of the recessed edge profile 836 associated with the first and upper scalloped recesses $838_U$, $840_U$ is rotationally aligned any portion of the width $W_{866}$ of the control port edge profile 866 associated with the first and second upper control ports $812_U$, $814_U$; and (2) a greater portion of the width $W_{834}$ of the return pressure port edge profiles 834 associated with the first and second lower return pressure ports $816_L$, $818_L$ being rotationally aligned with the entire width $W_{866}$ of the control port edge profiles 866 associated with the first and second lower control ports $812_L$, $814_L$. As a result of the rotational arrangement of the spool 802 relative the sleeve 804 as described above in association with FIG. 26C, pressurized fluid 1012 within the pressurized fluid source 1002 is no longer permitted to be communicated in the downstream direction; accordingly, further movement of the piston 1008 of the hydraulic actuator 1006 in the first axial direction D1 ceases. Furthermore, as a result of rotational alignment of some of the first lower return pressure port $816_L$ and some of the second lower return pressure port $818_L$ with, respectively, all of the width $W_{866}$ of the control port edge profile 866 defined by the second lower control port $814_L$ and the first lower control port $812_L$, fluid 1012 within the second sub-chamber $1020_L$ of the cylindrical body 1010 of the hydraulic actuator 1006 is permitted to be communicated in the upstream direction: (1) firstly from the second sub-chamber $1020_L$ and into the fluid control line, channel or branch $1016_L$; (2) then secondly from the fluid control line, channel or branch $1016_L$ and through the rotary valve subassembly 800 as a result of the rotational alignment of some of the first lower return pressure port $816_L$ and some of the second lower return pressure port $818_L$ with, respectively, all of the width $W_{866}$ of the control port edge profile 866 defined by the second lower control port $814_L$ and the first lower control port $812_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26D, the spool 802 rotates to define an angular position relative the sleeve 804 equal to about 75° to transition the rotary valve assembly 900 into a "lo/lo braking retraction mode". Here, the orifice area resulting from the rotational alignment of the first lower control port $812_L$ with the second lower return pressure port $818_L$ and the second lower control port $814_L$ with the first lower return pressure port $816_L$ remains at the maximized orifice area of about 5.25 mm² (see, e.g., FIG. 27) whereas the orifice area resulting from the rotational alignment of the first upper control port $812_U$ with the second upper return pressure port $818_U$ and the second upper control port $814_U$ with the first upper return pressure port $816_U$ is about 0.75 mm² (see, e.g., FIG. 27).

As seen at FIG. 26D, when the rotational angle (see the Y-axis) of the spool 802 relative the sleeve 804 is 75°: (1) a portion of the width $W_{834}$ of the return pressure port edge profiles 834 associated with the first and second upper return pressure ports $816_U$, $818_U$ is rotationally aligned with a portion of the width $W_{866}$ of the control port edge profiles 866 associated with the first and second upper control ports $812_U$, $814_U$; and (2) a portion of the width $W_{834}$ of the return pressure port edge profiles 834 associated with the first and second lower return pressure ports $816_L$, $818_L$ is rotationally aligned with the entire width $W_{866}$ of the control port edge profiles 866 associated with the first and second lower control ports $812_L$, $814L$. As a result of the rotational arrangement of the spool 802 relative the sleeve 804 as described above in association with FIG. 26D, fluid 1012 within the first sub-chamber $1020_U$ of the cylindrical body 1010 of the hydraulic actuator 1006 is permitted to be communicated in an upstream direction: (1) firstly from the first sub-chamber $1020_U$ and into the fluid control line, channel or branch $1016_U$; (2) then secondly from the fluid control line, channel or branch $1016_U$ and through the rotary valve subassembly 800 as a result of the rotational alignment of some of the first upper return pressure port $816_U$ and some of the second upper return pressure port $818_U$ with, respectively, some of the width $W_{866}$ of the control port edge profile 866 defined by the second upper control port $812_U$ and the first upper control port $814_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004. Furthermore, as a result of rotational alignment of some of the first lower return pressure port 816L and some of the second lower return pressure port $818_L$ with, respectively, all of the width $W_{866}$ of the control port edge profile 866 defined by the second lower control port $814_L$ and the first lower control port $812_L$, fluid 1012 within the second sub-chamber $1020_L$ of the cylindrical body 1010 of the hydraulic actuator 1006 is permitted to be communicated in the upstream direction: (1) firstly from the second sub-chamber $1020_L$ and into the fluid control line, channel or branch $1016_L$; (2) then secondly from the fluid control line, channel or branch $1016_L$ and through the rotary valve subassembly 800 as a result of the rotational alignment of some of the first lower return pressure port $816_L$ and some of the second lower return pressure port $818_L$ with, respectively, all of the width $W_{866}$ of the control port edge profile 866 defined by the second lower control port $814_L$ and the first lower control port 812L; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26E, the spool 802 rotates to define an angular position relative the sleeve 804 equal to about 90° to transition the rotary valve assembly 900 into a "coasting mode". Here, the orifice area resulting from the rotational alignment of both of: (1) the first upper control port $812_U$ with the second upper return pressure port $818_U$ and the second upper control port $814_U$ with the first upper return pressure port $816_U$; and (2) the first lower control port $812_L$ with the second lower return pressure port $818_L$ and the second lower control port $814_L$ with the first lower return pressure port $816_L$ is approximately the same (e.g., about 4.50 mm² (see, e.g., FIG. 27)).

As seen at FIG. 26E, when the rotational angle (see the Y-axis) of the spool 802 relative the sleeve 804 is 90°: (1) a portion of the width $W_{834}$ of the return pressure port edge profiles 834 associated with the first and second upper return pressure ports $816_U$, $818_U$ is rotationally aligned with the entire width $W_{866}$ of the control port edge profiles 866 associated with the first and second upper control ports $812_U$, $814_U$; and (2) a portion of the width $W_{834}$ of the return pressure port edge profiles 834 associated with the first and second lower return pressure ports $816_L$, $818_L$ is rotationally aligned with the entire width $W_{866}$ of the control port edge profiles 866 associated with the first and second lower control ports $812_L$, $814_L$. As a result of the rotational arrangement of the spool 802 relative the sleeve 804 as described above in association with FIG. 26E, fluid 1012 within the first sub-chamber $1020_U$ of the cylindrical body 1010 of the hydraulic actuator 1006 is permitted to be communicated in an upstream direction: (1) firstly from the first sub-chamber $1020_U$ and into the fluid control line, channel or branch $1016_U$; (2) then secondly from the fluid control line, channel or branch $1016_U$ and through the rotary valve subassembly 800 as a result of the rotational alignment of some of the first upper return pressure port $816_U$ and some of the second upper return pressure port $818_U$ with, respectively, some of the width $W_{866}$ of the control port edge profile 866 defined by the second upper control port $812_U$ and the first upper control port $814_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004. Furthermore, as a result of rotational alignment of some of the first lower return pressure port $816_L$ and some of the second lower return pressure port $818_L$ with, respectively, all of the width $W_{866}$ of the control port edge profile 866 defined by the second lower control port $814_L$ and the first lower control port $812_L$, fluid 1012 within the second sub-chamber $1020_L$ of the cylindrical body 1010 of the hydraulic actuator 1006 is permitted to be communicated in the upstream direction: (1) firstly from the second sub-chamber $1020_L$ and into the fluid control line, channel or branch $1016_L$; (2) then secondly from the fluid control line, channel or branch $1016_L$ and through the rotary valve subassembly 800 as a result of the rotational alignment of some of the first lower return pressure port $816_L$ and some of the second lower return pressure port $818_L$ with, respectively, all of the width $W_{866}$ of the control port edge profile 866 defined by the second lower control port $814_L$ and the first lower control port $812_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26F, the spool 802 rotates to define an angular position relative the sleeve 804 equal to about 105° to transition the rotary valve assembly 900 into a "lo/lo braking extension mode". Here, the orifice area resulting from the rotational alignment of the first upper control port $812_U$ with the second upper return pressure port $818_U$ and the second upper control port $814_U$ with the first upper return pressure port $816_U$ is maximized to about 5.25 mm² (see, e.g., FIG. 27) whereas the orifice area resulting from the rotational alignment of the first lower control port $812_L$ with the second lower return pressure port $818_L$ and the second lower control port $814_L$ with the first lower return pressure port $816_L$ is about 0.75 mm² (see, e.g., FIG. 27).

As seen at FIG. 26F, when the rotational angle (see the Y-axis) of the spool 802 relative the sleeve 804 is 105°: (1) a larger portion of the width $W_{834}$ of the return pressure port edge profiles 834 associated with the first and second upper return pressure ports $816_U$, $818_U$ is rotationally aligned with the entire width $W_{866}$ of the control port edge profiles 866 associated with the first and second upper control ports $812_U$, $814_U$; and (2) a reduced portion of the width $W_{834}$ of the return pressure port edge profiles 834 associated with the first and second lower return pressure ports $816_L$, $818_L$ is rotationally aligned with a reduced portion of the width $W_{866}$ of the control port edge profiles 866 associated with the first and second lower control ports $812_L$, $814_L$. As a result of the rotational arrangement of the spool 802 relative the sleeve 804 as described above in association with FIG. 26F, fluid 1012 within the first sub-chamber $1020_U$ of the cylindrical body 1010 of the hydraulic actuator 1006 is permitted to be communicated in an upstream direction: (1) firstly from the first sub-chamber $1020_U$ and into the fluid control line, channel or branch $1016_U$; (2) then secondly from the fluid control line, channel or branch $1016_U$ and through the rotary valve subassembly 800 as a result of the rotational alignment of some of the first upper return pressure port $816_U$ and some of the second upper return pressure port $818_U$ with, respectively, all of the width $W_{866}$ of the control port edge profile 866 defined by the second upper control port $812_U$ and the first upper control port $814_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004. Furthermore, as a result of rotational alignment of some of the first lower return pressure port $816_L$ and some of the second lower return pressure port $818_L$ with, respectively, some of the width $W_{866}$ of the control port edge profile 866 defined by the second lower control port $814_L$ and the first lower control port $812_L$, fluid 1012 within the second sub-chamber $1020_L$ of the cylindrical body 1010 of the hydraulic actuator 1006 is permitted to be communicated in the upstream direction: (1) firstly from the second sub-chamber $1020_L$ and into the fluid control line, channel or branch $1016_L$; (2) then secondly from the fluid control line, channel or branch $1016_L$ and through the rotary valve subassembly 800 as a result of the rotational alignment of some of the first lower return pressure port $816_L$ and some of the second lower return pressure port $818_L$ with, respectively, some of the width $W_{866}$ of the control port edge profile 866 defined by the second lower control port $814_L$ and the first lower control port $812_L$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26G, the spool 802 rotates to define an angular position relative the sleeve 804 equal to about 120° to transition the rotary valve assembly 900 into a "motor/braking null mode". Here, the orifice area resulting from rotational alignment of the first upper control port $812_U$ with the second upper return pressure port $818_U$ and the second upper control port $814_U$ with the first upper return pressure port $816_U$ remains at the maximized orifice area of about 5.25 mm² (see, e.g., FIG. 27) whereas the orifice area resulting from the rotational alignment of the first lower control port $812_L$ with the second lower return pressure port $818_L$ and the second lower control port $814_L$ with the first lower return pressure port $816_L$ is reduced to about 0.00 mm² (see, e.g., FIG. 27).

As seen at FIG. 26G, when the rotational angle (see the Y-axis) of the spool 802 relative the sleeve 804 is 120°: (1) a portion of the width $W_{834}$ of the return pressure port edge profiles 834 associated with the first and second upper return pressure ports $816_U$, $818_U$ is rotationally aligned with the entire width $W_{866}$ of the control port edge profiles 866 associated with the first and second upper control ports $812_U$, $814_U$; and (2) no portion of the width $W_{834}$ of the return pressure port edge profiles 834 associated with the first and second lower return pressure ports 816$_L$, 818$_L$ is rotationally aligned with any portion of the width W$_{866}$ of the control port edge profiles 866 associated with the first and second lower control ports 812$_L$, 814$_L$. As a result of the rotational arrangement of the spool 802 relative the sleeve 804 as described above in association with FIG. 26G, fluid 1012 within the first sub-chamber 1020$_U$ of the cylindrical body 1010 of the hydraulic actuator 1006 is permitted to be communicated in an upstream direction: (1) firstly from the first sub-chamber 1020$_U$ and into the fluid control line, channel or branch 1016$_U$; (2) then secondly from the fluid control line, channel or branch 1016$_U$ and through the rotary valve subassembly 800 as a result of the rotational alignment of some of the first upper return pressure port 816$_U$ and some of the second upper return pressure port 818$_U$ with, respectively, all of the width W$_{866}$ of the control port edge profile 866 defined by the second upper control port 812$_U$ and the first upper control port 814$_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004. Furthermore, as a result of the first lower return pressure port 816$_L$ and the second lower return pressure port 818$_L$ not being aligned with, respectively, any portion of the width W$_{866}$ of the control port edge profile 866 defined by the second lower control port 814$_L$ and the first lower control port 812$_L$, fluid 1012 within the second sub-chamber 1020$_L$ of the cylindrical body 1010 of the hydraulic actuator 1006 is not permitted to be communicated in the upstream direction.

Referring to FIG. 26G', the spool 802 rotates to define an angular position relative the sleeve 804 equal to about 130° to transition the rotary valve assembly 900 into a "lo/lo braking retraction mode". Here, the orifice area resulting from the rotational alignment of the first upper control port 812$_U$ with the second upper return pressure port 818$_U$ and the second upper control port 814$_U$ with the first upper return pressure port 816$_U$ reduces from the maximized orifice area to about 4.50 mm$^2$ (see, e.g., FIG. 27) whereas the rotational alignment of the first lower control port 812$_L$ with the first lower scalloped recess 838$_L$ and the second lower control port 814$_L$ with the second lower scalloped recess 840$_L$ is about 0.75 mm$^2$ (see, e.g., FIG. 27).

As seen at FIG. 26G', when the rotational angle (see the Y-axis) of the spool 802 relative the sleeve 804 is 130°: (1) a reduced portion of the width W$_{834}$ of the return pressure port edge profiles 834 associated with the first and second upper return pressure ports 816$_U$, 818$_U$ is rotationally aligned with the entire width W$_{866}$ of the control port edge profiles 866 associated with the first and second upper control ports 812$_U$, 814$_U$; and (2) a portion of the width W$_{836}$ of the recessed edge profiles 836 associated with the first and second lower scalloped recesses 838$_L$, 840$_L$ is rotationally aligned with a portion of the width W$_{866}$ of the control port edge profiles 866 associated with the first and second lower control ports 812$_L$, 814$_L$. As a result of the rotational arrangement of the spool 802 relative the sleeve 804 as described above in association with FIG. 26G', pressurized fluid 1012 within the pressurized fluid source 1002 is communicated in the downstream direction: (1) firstly though the lower cavity 810 of the rotary valve subassembly 800; (2) then secondly through fluid control line, channel or branch 1016$_L$; and (3) then thirdly into the second sub-chamber 1020$_L$ of the cylindrical body 1010 of the hydraulic actuator 1006 for causing movement of the piston 1008 of the hydraulic actuator 1006 in the second axial direction D2. Furthermore, as a result of: (A) rotational alignment of some of the first upper return pressure port 816$_U$ and some of the second upper return pressure port 818$_U$ with, respectively, some of the width W$_{866}$ of the control port edge profile 866 defined by the second upper control port 814$_U$ and the first upper control port 812$_U$; and (B) movement of the piston 1008 of the hydraulic actuator 1006 in the second axial direction D2, the head 1018 of the piston 1008 forces fluid 1012 out of the first sub-chamber 1020$_U$ of the cylindrical body 1010 of the hydraulic actuator 1006 in the upstream direction: (1) firstly from the first sub-chamber 1020$_U$ and into the fluid control line, channel or branch 1016$_U$; (2) then secondly from the fluid control line, channel or branch 1016$_U$ and through the rotary valve subassembly 800 as a result of the rotational alignment of some of the first upper return pressure port 816$_U$ and some of the second upper return pressure port 818$_U$ with, respectively, some of the width W$_{866}$ of the control port edge profile 866 defined by the second upper control port 814$_U$ and the first upper control port 812$_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Figure 26H:
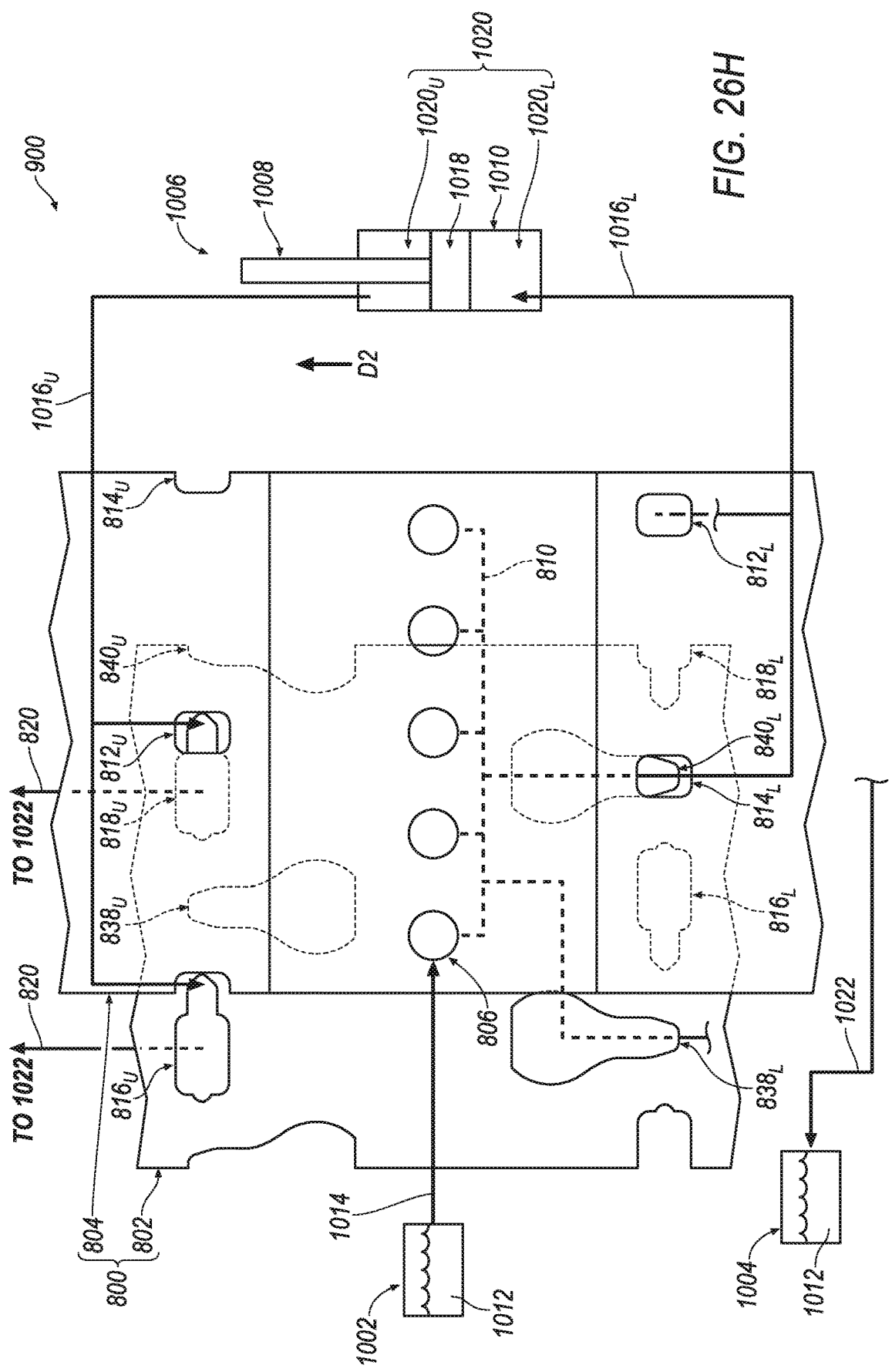
FIG. 26H is a plan view of valve of FIGS. 5-10 represented by the surface area of the side surface of the spool of FIG. 15 that is overlapped with the plan view of the surface area of the side surface of the sleeve of FIG. 23 that corresponds to the eighth example orientation of the spool rotated relative the sleeve of FIGS. 24H and 25H.

Referring to FIG. 26H, the spool 802 rotates to define an angular position relative the sleeve 804 equal to about 150° to transition the rotary valve assembly 900 into a "lo/hi max retraction mode". Here, the orifice area resulting from the rotational alignment of the first lower control port 812$_L$ with the first lower scalloped recess 838$_L$ and the second lower control port 814$_L$ with the second lower scalloped recess 840$_L$ reduces to about 3.25 mm$^2$ (see, e.g., FIG. 27) whereas the orifice area resulting from the rotational alignment of the first upper control port 812$_U$ with the second upper return pressure port 818$_U$ and the second upper control port 814$_U$ with the first upper return pressure port 816$_U$ is maximized to about 2.75 mm$^2$ (see, e.g., FIG. 27).

As seen at FIG. 26H, when the rotational angle (see the Y-axis) of the spool 802 relative the sleeve 804 is 150°: (1) a further reduced portion of the width W$_{834}$ of the return pressure port edge profiles 834 associated with the first and second upper return pressure ports 816$_U$, 818$_U$ is rotationally aligned with the entire width W$_{866}$ of the control port edge profiles 866 associated with the first and second upper control ports 812$_U$, 814$_U$; and (2) a larger portion of the width W$_{836}$ of the recessed edge profiles 836 associated with the first and second lower scalloped recesses 838$_L$, 840$_L$ is rotationally aligned with the entire width W$_{866}$ of the control port edge profiles 866 associated with the first and second lower control ports 812$_L$, 814$_L$. As a result of the rotational arrangement of the spool 802 relative the sleeve 804 as described above in association with FIG. 26H, pressurized fluid 1012 within the pressurized fluid source 1002 is communicated in the downstream direction: (1) firstly though the lower cavity 810 of the rotary valve subassembly 800; (2) then secondly through fluid control line, channel or branch 1016$_L$; and (3) then thirdly into the second sub-chamber 1020$_L$ of the cylindrical body 1010 of the hydraulic actuator 1006 for causing further movement of the piston 1008 of the hydraulic actuator 1006 in the second axial direction D2. Furthermore, as a result of: (A) rotational alignment of some of the first upper return pressure port 816$_U$ and some of the second upper return pressure port 818$_U$ with, respectively, all of the width W$_{866}$ of the control port edge profile 866 defined by the second upper control port $814_U$ and the first upper control port $812_U$; and (B) further movement of the piston 1008 of the hydraulic actuator 1006 in the second axial direction D2, the head 1018 of the piston 1008 further forces fluid 1012 out of the first sub-chamber $1020_U$ of the cylindrical body 1010 of the hydraulic actuator 1006 in the upstream direction: (1) firstly from the first sub-chamber $1020_U$ and into the fluid control line, channel or branch $1016_U$; (2) then secondly from the fluid control line, channel or branch $1016_U$ and through the rotary valve subassembly 800 as a result of the rotational alignment of some of the first upper return pressure port $816_U$ and some of the second upper return pressure port $818_U$ with, respectively, all of the width $W_{866}$ of the control port edge profile 866 defined by the second upper control port $814_U$ and the first upper control port $812_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Referring to FIG. 26H', the spool 802 rotates to define an angular position relative the sleeve 804 equal to about 170° to transition the rotary valve assembly 900 into a "lo/hi servo retraction mode". Here, the orifice area resulting from the rotational alignment of the first lower control port $812_L$ with the first lower scalloped recess $838_L$ and the second lower control port $814_L$ with the second lower scalloped recess $840_L$ reduces to about 0.75 mm² (see, e.g., FIG. 27) whereas the orifice area resulting from the rotational alignment of the first upper control port $812_U$ with the second upper return pressure port $818_U$ and the second upper control port $814_U$ with the first upper return pressure port $816_U$ reduces to about 0.50 mm² (see, e.g., FIG. 27).

As seen at FIG. 26H', when the rotational angle (see the Y-axis) of the spool 802 relative the sleeve 804 is 170°: (1) an even further reduced portion of the width $W_{834}$ of the return pressure port edge profiles 834 associated with the first and second upper return pressure ports $816_U$, $818_U$ is rotationally aligned with a reduced portion of the width $W_{866}$ of the control port edge profiles 866 associated with the first and second upper control ports $812_U$, $814_U$; and (2) a reduced portion of the width $W_{836}$ of the recessed edge profiles 836 associated with the first and second lower scalloped recesses $838_L$, $840_L$ is rotationally aligned with a reduced portion of the width $W_{866}$ of the control port edge profiles 866 associated with the first and second lower control ports $812_L$, $814_L$. As a result of the rotational arrangement of the spool 802 relative the sleeve 804 as described above in association with FIG. 26H', pressurized fluid 1012 within the pressurized fluid source 1002 is communicated in the downstream direction: (1) firstly though the lower cavity 810 of the rotary valve subassembly 800; (2) then secondly through fluid control line, channel or branch $1016_L$; and (3) then thirdly into the second sub-chamber $1020_L$ of the cylindrical body 1010 of the hydraulic actuator 1006 for causing even further movement of the piston 1008 of the hydraulic actuator 1006 in the second axial direction D2. Furthermore, as a result of: (A) rotational alignment of some of the first upper return pressure port $816_U$ and some of the second upper return pressure port $818_U$ with, respectively, some of the width $W_{866}$ of the control port edge profile 866 defined by the second upper control port $814_U$ and the first upper control port $812_U$; and (B) even further movement of the piston 1008 of the hydraulic actuator 1006 in the second axial direction D2, the head 1018 of the piston 1008 further forces fluid 1012 out of the first sub-chamber $1020_U$ of the cylindrical body 1010 of the hydraulic actuator 1006 in the upstream direction: (1) firstly from the first sub-chamber $1020_U$ and into the fluid control line, channel or branch $1016_U$; (2) then secondly from the fluid control line, channel or branch $1016_U$ and through the rotary valve subassembly 800 as a result of the rotational alignment of some of the first upper return pressure port $816_U$ and some of the second upper return pressure port $818_U$ with, respectively, some of the width $W_{866}$ of the control port edge profile 866 defined by the second upper control port $814_U$ and the first upper control port $812_U$; (3) then thirdly into the axial chamber 820 axially extending through the spool 802; (4) then fourthly out of the axial exit port 822 formed by the spool 802; (5) then fifthly into the low pressure supply line, channel or branch 1022; and (6) then lastly into the low pressure fluid reservoir 1004.

Figure 26I:
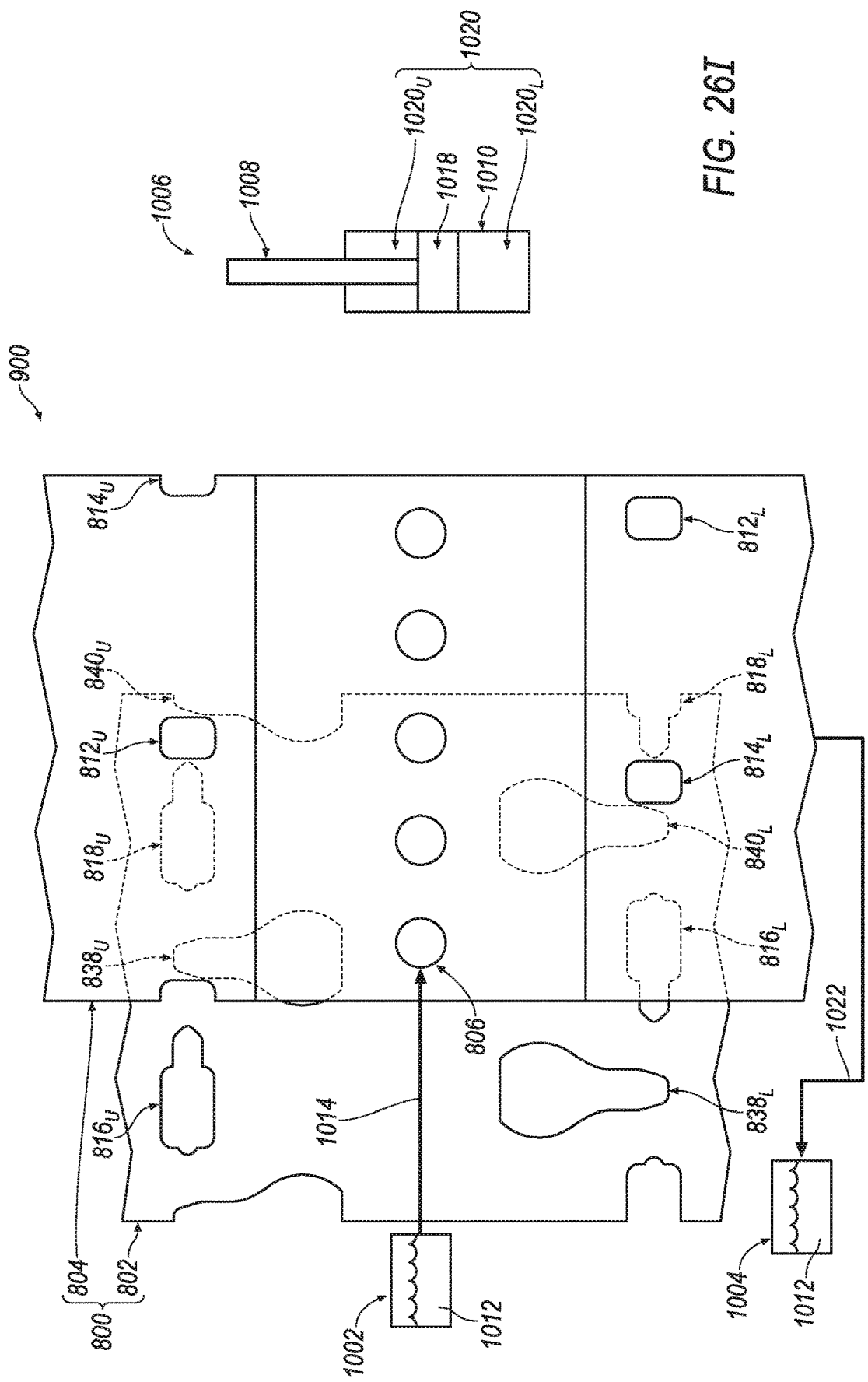
FIG. 26I is a plan view of valve of FIGS. 5-10 represented by the surface area of the side surface of the spool of FIG. 15 that is overlapped with the plan view of the surface area of the side surface of the sleeve of FIG. 23 that corresponds to the ninth example orientation of the spool rotated relative the sleeve of FIGS. 24I and 25I.

Referring to FIG. 26I, the spool 802 rotates to define an angular position relative the sleeve 804 equal to about 180° to transition the rotary valve assembly 900 back to the closed or "null" position. Similar to when the angular position of the sleeve spool 802 relative to the sleeve 804 is equal to about 0° as described above with reference to FIG. 26A, the first and second lower scalloped recesses $838_L$, $840_L$ do not align with any portion of the width $W_{866}$ of the control port edge profiles 866 associated with the first and second lower control ports $812_L$, $814_L$. Similarly, the first and second upper return pressure ports $816_U$, $818_U$ do not align with any portion of the width $W_{866}$ of the control port edge profiles 866 associated with the first and second upper control ports $812_U$, $814_U$.

As a result of the rotational arrangement of the spool 802 relative the sleeve 804 as described above in association with FIG. 26I, pressurized fluid 1012 within the pressurized fluid source 1002 is no longer permitted to be communicated in the downstream direction; accordingly, further movement of the piston 1008 of the hydraulic actuator 1006 in the second axial direction D2 ceases. Furthermore, as a result of neither of the first upper return pressure port $816_U$ and the second upper return pressure port $818_U$ being aligned with, respectively, any portion of the width $W_{866}$ of the control port edge profile 866 defined by the second upper control port $814_U$ and the first upper control port $812_U$, fluid 1012 within the first sub-chamber $1020_U$ of the cylindrical body 1010 of the hydraulic actuator 1006 is not permitted to be communicated in the upstream direction. Accordingly, the rotary valve assembly 900 may be said to be returned to the closed or "null" position as seen at FIG. 26A.

As see at FIG. 27, in comparison to other orifice area-to-spool angle relationships of other rotary valve assemblies (see, e.g., comparison of a curve graph $C_{27}$ associated with the rotary valve assembly 900 to a curve graph $C_{27'}$ of another rotary valve assembly in FIG. 27), the orifice area-to-spool angle relationship of the rotary valve assembly 900 provides a larger orifice area (see, e.g., the orifice area according to the curves "$812_U$-$838_U$/$814_U$-$840_U$" and "$812_L$-$838_L$/$814_L$-$840_L$" of the curve graph $C_{27}$ at FIG. 27 that are approximately doubled to approximately about 3.25 mm² from approximately about 1.50 mm² when compared to corresponding curves of the curve graph $C_{27'}$). The doubling of the orifice area is a result of one or both of the substantially "pear" shaped recessed edge profile 836 and the depth $D_{836}$ of the scalloped recesses $838_U$, $838_L$, $840_U$, $840_L$ of the spool 802 that effectively yields about twice the peak flow of the pressurized fluid 1012 in comparison to other rotary valve designs as seen at, for example, the curve graph $C_{27'}$ of FIG. 27. Furthermore, one or both of the substantially "pear" shaped recessed edge profile 836 and the depth $D_{836}$ of the scalloped recesses $838_U$, $838_L$, $840_U$, $840_L$ of the spool 802 and the return pressure port edge profiles 834 of the return pressure ports $816_U$, $816_L$, $818_U$, $818_L$ maintains strength and stiffness of the spool 802 while also providing a smoother (i.e., progressive, non-linear orifice area-to-spool angle relationship) transition in the opening and closing of the control ports $812_U$, $812_L$, $814_U$, $814_L$ in comparison to other rotary valve designs as seen at, for example, the curve graph $C_{27'}$ of FIG. 27.

Yet even further, as seen at FIG. 27, the orifice area-to-spool angle relationship of the rotary valve assembly 900 provides not only a larger orifice area but also a smoother, non-linear transition (see, e.g., the orifice area according to the curves "$812_L$-$818_L$/$814_L$-$816_L$" and "$812_U$-$818_U$/$814_U$-$816_U$" of the curve graph $C_{27}$ at FIG. 27 that are approximately doubled (at, e.g., a rotation of the spool 802 to approximately about 30° and 150°, respectively) when compared to corresponding of the curve graph $C_{27'}$ at FIG. 27). Referring firstly to the curve "$812_L$-$818_L$/$814_L$-$816_L$" at FIG. 27, the rotary valve assembly 900 provide a constantly smooth transition when the spool 802 is rotated relative the sleeve 804 at about 30° for arranging the rotary valve assembly 900 in the "hi/lo max extension mode" (whereas, conversely, as seen at of the curve graph $C_{27'}$ at FIG. 27, for other rotary valve assemblies, a corresponding curve related to rotation of the spool 802 relative the sleeve 804 at about 30° abruptly transitions from a first linear segment defined by a shallow slope to a second linear segment defined by a steep slope). Referring secondly to the curve "$812_U$-$818_U$/$814_U$-$816_U$" of the curve graph $C_{27}$ at FIG. 27, the rotary valve assembly 900 provide a constantly smooth transition when the spool 802 is rotated relative the sleeve 804 at about 150° for arranging the rotary valve assembly 900 in the "lo/hi max retraction mode" (whereas, conversely, as seen at of the curve graph $C_{27'}$ at FIG. 27, for other rotary valve assemblies, a corresponding curve related to rotation of the spool 802 relative the sleeve 804 at about 150° abruptly transitions from a first linear segment defined by a steep slope to a second linear segment defined by a shallow slope). Furthermore, according to a curve graph $C_{29}$ at FIG. 29 (in comparison to a curve graph $C_{29'}$ at FIG. 29 that is associated with other rotary valve assemblies), a rate of orifice area change with respect to the spool angle defines a substantially progressive, non-linear or gradual change as the rotary valve assembly 900 approaches a null orientation when, e.g., the spool 802 is rotated 0°, 180° or 360° rather than a substantially linear or sharp change as seen at the curve graph $C_{29'}$ FIG. 29.

Figure 30:
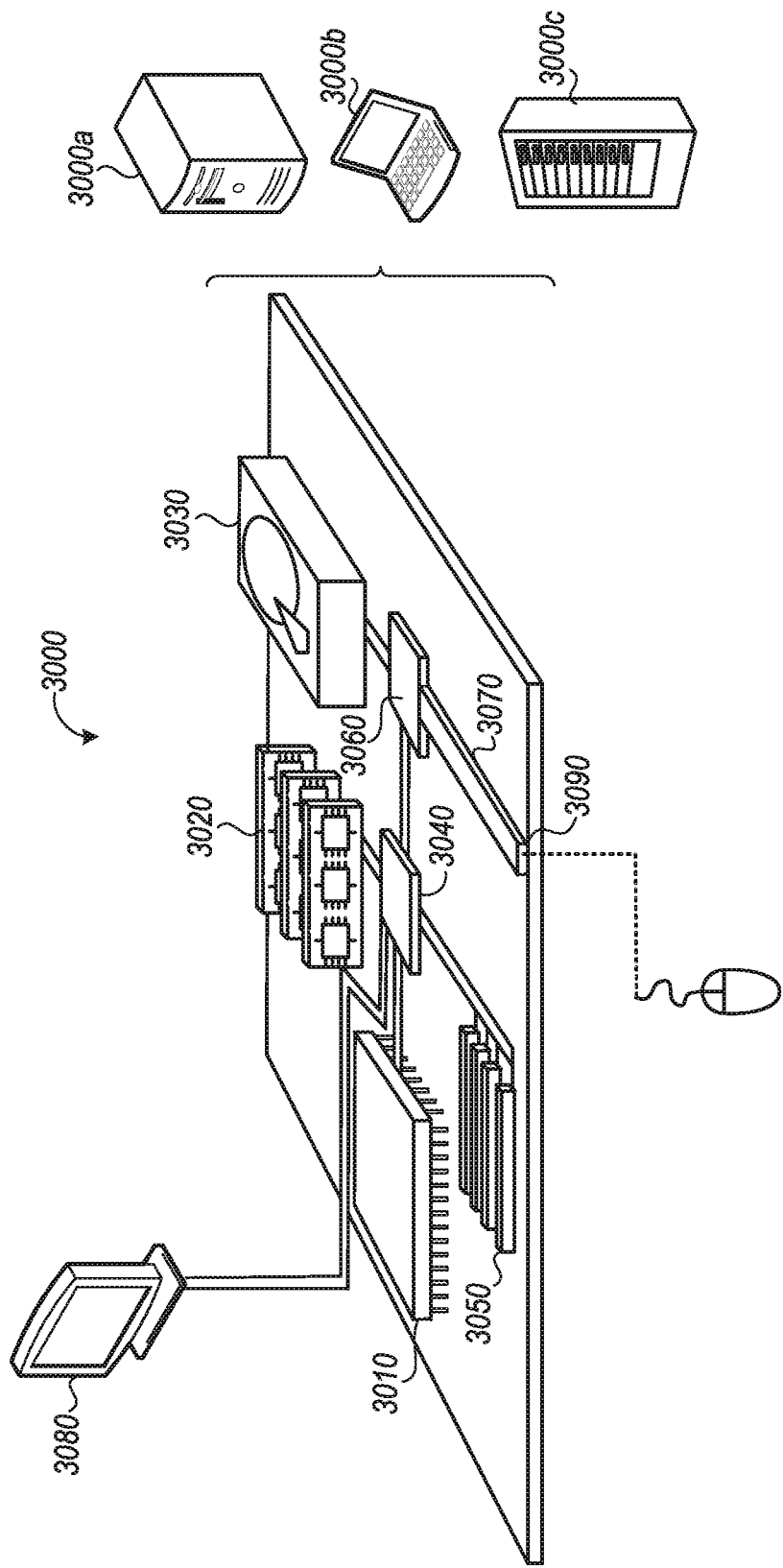
FIG. 30 is a schematic view of an example computing device.

FIG. 30 is schematic view of an example computing device 3000 that may be used to implement the systems and methods described in this document. The computing device 3000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 3000 includes a processor 3010 (also referred to as data processing hardware), memory 3020 (also referred to as memory hardware), a storage device 3030, a high-speed interface/controller 3040 connecting to the memory 3020 and high-speed expansion ports 3050, and a low speed interface/controller 3060 connecting to a low speed bus 3070 and a storage device 3030. Each of the components 3010, 3020, 3030, 3040, 3050, and 3060, are interconnected using various busses, and may be mounted on a common motherboard or in other manners as appropriate. The processor 3010 can process instructions for execution within the computing device 3000, including instructions stored in the memory 3020 or on the storage device 3030 to display graphical information for a graphical user interface (GUI) on an external input/output device, such as display 3080 coupled to high speed interface 3040. In other implementations, multiple processors and/or multiple buses may be used, as appropriate, along with multiple memories and types of memory. Also, multiple computing devices 3000 may be connected, with each device providing portions of the necessary operations (e.g., as a server bank, a group of blade servers, or a multi-processor system).

The memory 3020 stores information non-transitorily within the computing device 3000. The memory 3020 may be a computer-readable medium, a volatile memory unit(s), or non-volatile memory unit(s). The non-transitory memory 3020 may be physical devices used to store programs (e.g., sequences of instructions) or data (e.g., program state information) on a temporary or permanent basis for use by the computing device 3000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 3030 is capable of providing mass storage for the computing device 3000. In some implementations, the storage device 3030 is a computer-readable medium. In various different implementations, the storage device 3030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 3020, the storage device 3030, or memory on processor 3010.

The high speed controller 3040 manages bandwidth-intensive operations for the computing device 3000, while the low speed controller 3060 manages lower bandwidth-intensive operations. Such allocation of duties is exemplary only. In some implementations, the high-speed controller 3040 is coupled to the memory 3020, the display 3080 (e.g., through a graphics processor or accelerator), and to the high-speed expansion ports 3050, which may accept various expansion cards (not shown). In some implementations, the low-speed controller 3060 is coupled to the storage device 3030 and a low-speed expansion port 3090. The low-speed expansion port 3090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 3000 may be implemented in a number of different forms, as shown in the figure. For example, it may be implemented as a standard server 3000a or multiple times in a group of such servers 3000*a*, as a laptop computer 3000*b*, or as part of a rack server system 3000*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A rotary valve subassembly comprising:
   a spool having a tube-shaped body including an outer side surface and an inner side surface disposed on an opposite side of the tube-shaped body than the outer side surface, the inner side surface defining an axial chamber that axially extends through the tube-shaped body along a longitudinal axis of the tube-shaped body, the tube-shaped body comprising:
   a plurality of return pressure ports that radially extend through a thickness of the tube-shaped body, each return pressure port in fluid communication with the axial chamber; and
   a plurality of scalloped recesses formed on the outer side surface of the tube-shaped body, each scalloped recess extending radially into but not through the thickness of the tube-shaped body, wherein each scalloped recess of the plurality of scalloped recesses comprises:
      a first scalloped portion having a first scalloped width perpendicular to the longitudinal axis and a first depth relative to the outer side surface of the tube-shaped body, and
      a second scalloped portion having a second scalloped width perpendicular to the longitudinal axis and a second depth relative to the outer side surface of the tub-shaped body,
      wherein the first scalloped width greater than the second scalloped width, and
      wherein the second depth is greater than the first depth; and
   a sleeve having a tube-shaped body including an outer side surface and an inner side surface disposed on an opposite side of the tube-shaped body than the outer side surface, the inner side surface defining an axial chamber that axially extends through the tube-shaped body, the tube-shaped body comprising:
   a plurality of inlet ports that extend radially through a thickness of the tube-shaped body, each inlet port in fluid communication with the axial chamber; and
   a plurality of control ports that extend radially through the thickness of the tube-shaped body, each control port in fluid communication with the axial chamber, wherein the spool is positioned within the axial chamber of the sleeve and configured to rotate relative to the sleeve.

2. The rotary valve subassembly of claim 1, wherein a portion of the inner side surface of the tube-shaped body of the sleeve defines an inner circumferential recess, wherein at least a portion of at least one scalloped recess and at least a portion of the inner circumferential recess formed by the portion of the inner side surface defines at least one cavity.

3. The rotary valve subassembly of claim 2, wherein the plurality of scalloped recesses include:
   at least one upper scalloped recess, the at least one upper scalloped recess and the inner circumferential recess defining an upper cavity of the at least one cavity; and
   at least one lower scalloped recess, the at least one lower scalloped recess and the inner circumferential recess defining a lower cavity of the at least one cavity.

4. The rotary valve subassembly of claim 2, wherein:
   the plurality of return pressure ports include:
      a first upper return pressure port;
      a second upper return pressure port circumferentially arranged around an upper portion/row of the tube-shaped body with the first upper return pressure port;
      a first lower return pressure port; and
      a second lower return pressure port circumferentially arranged around an upper portion/row of the tube-shaped body with the first lower return pressure port, wherein an orientation of each of the first and second lower return pressure ports is horizontally flipped in comparison to an orientation of each of the first and second upper return pressure ports, and wherein the first and second lower return pressure ports are axially spaced from the first and second upper return pressure ports; and
   the plurality of scalloped recesses include:
      a first upper scalloped recess;
      a second upper scalloped recess circumferentially spaced from the first upper scalloped recess;
      a first lower scalloped recess; and
      a second lower scalloped recess circumferentially spaced from the first lower scalloped recess, wherein an orientation of each of the first and second lower scalloped recesses is vertically flipped in comparison to an orientation of each of the first and second upper scalloped recesses, and wherein the first and second lower scalloped recesses are axially spaced from the first and second upper scalloped recesses.

5. The rotary valve subassembly of claim 4, wherein:
   the first upper scalloped recess and the second upper scalloped recess cooperate with the inner circumferential recess to define an upper cavity of the at least one cavity; and
   the first lower scalloped recess and the second lower scalloped recess cooperate with the inner circumferential recess to define a lower cavity of the at least one cavity.

6. A rotary valve assembly comprising:
   a sleeve having a tube-shaped body including an outer side surface and an inner side surface that defines an axial chamber, wherein the sleeve comprises a plurality of inlet ports and a plurality of control ports that radially extend through a thickness of the tube-shaped body, the thickness extending radially between the outer side surface and the inner side surface of the tube-shaped body;
   a spool disposed within the axial chamber of the sleeve, the spool coaxial to the sleeve and configured to rotate relative to the sleeve about a longitudinal axis defined by the sleeve, the spool having a tube-shaped body including an outer side surface and an inner side surface that defines an axial chamber, the tube-shaped body comprising:
      a plurality of return pressure ports that radially extend through a thickness of the tube-shaped body, each return pressure port in fluid communication with the axial chamber; and
      a plurality of scalloped recesses formed on the outer side surface of the tube-shaped body, each scalloped recess extending radially into but not through the thickness of the tube-shaped body, wherein each scalloped recess of the plurality of scalloped recesses comprises:
         a first scalloped portion having a first scalloped width perpendicular to the longitudinal axis and a first depth relative to the outer side surface of the tube-shaped body, and
         a second scalloped portion having a second scalloped width perpendicular to the longitudinal axis and a second depth relative to the outer side surface of the tube-shaped body,
         wherein the first scalloped width greater than the second scalloped width, and
         wherein the second depth is greater than the first depth; and
      a spool-rotating portion disposed within the axial chamber of the sleeve, wherein the spool-rotating portion is coupled for common rotation with the spool about the longitudinal axis defined by the sleeve.

7. The rotary valve assembly of claim 6, wherein a portion of the inner side surface of the tube-shaped body of the sleeve defines an inner circumferential recess, wherein the tube-shaped body of the sleeve includes a stem portion and a cap portion, wherein the stem portion defines a first axial chamber portion of the axial chamber that is sized for rotatably-containing a first portion of a length of the spool, wherein the cap portion defines a second axial chamber portion of the axial chamber that is sized for containing the spool-rotating portion and a second portion of the length of the spool that is coupled to the spool-rotating portion, wherein at least a portion of at least one scalloped recess of the plurality of scalloped recesses of the spool and at least a portion of the inner circumferential recess formed by the portion of the inner side surface of the tube-shaped body of the sleeve defines at least one cavity.

8. The rotary valve assembly of claim 7, wherein the plurality of scalloped recesses include:
   at least one upper scalloped recess, the at least one upper scalloped recess and the inner circumferential recess defining an upper cavity of the at least one cavity; and
   at least one lower scalloped recess, the at least one lower scalloped recess and the inner circumferential recess defining a lower cavity of the at least one cavity.

9. The rotary valve assembly of claim 7, wherein:
   the plurality of return pressure ports include:
      a first upper return pressure port;
      a second upper return pressure port circumferentially arranged around an upper portion/row of the tube-shaped body with the first upper return pressure port;
      a first lower return pressure port; and
      a second lower return pressure port circumferentially arranged around an upper portion/row of the tube-shaped body with the first lower return pressure port, wherein an orientation of each of the first and second lower return pressure ports is horizontally flipped in comparison to an orientation of each of the first and second upper return pressure ports, and wherein the first and second lower return pressure ports are axially spaced from the first and second upper return pressure ports; and the plurality of scalloped recesses include:
- a first upper scalloped recess;
- a second upper scalloped recess circumferentially spaced from the first upper scalloped recess;
- a first lower scalloped recess; and
- a second lower scalloped recess circumferentially spaced from the first lower scalloped recess, wherein an orientation of each of the first and second lower scalloped recesses is vertically flipped in comparison to an orientation of each of the first and second upper scalloped recesses, and wherein the first and second lower scalloped recesses are axially spaced from the first and second upper scalloped recesses.

10. The rotary valve assembly of claim 9, wherein:
the first upper scalloped recess and the second upper scalloped recess cooperate with the inner circumferential recess to define an upper cavity of the at least one cavity; and
the first lower scalloped recess and the second lower scalloped recess cooperate with the inner circumferential recess to define a lower cavity of the at least one cavity.

11. A hydraulic circuit comprising:
a pressurized fluid source;
a hydraulic actuator; and
a rotary valve assembly configured to control a flow of hydraulic fluid from the pressurized fluid source to the hydraulic actuator, the rotary valve assembly comprising:
- a sleeve having a tube-shaped body including an outer side surface and an inner side surface that defines an axial chamber, wherein the sleeve comprises a plurality of inlet ports and a plurality of control ports that radially extend through a thickness of the tube-shaped body, the thickness extending radially between the outer side surface and the inner side surface of the tube-shaped body;
- a spool disposed within the axial chamber of the sleeve, the spool coaxial to the sleeve and configured to rotate relative to the sleeve about a longitudinal axis defined by the sleeve, the spool having a tube-shaped body including an outer side surface and an inner side surface that defines an axial chamber, the tube-shaped body comprising:
  - a plurality of return pressure ports that radially extend through a thickness of the tube-shaped body, each return pressure port in fluid communication with the axial chamber; and
  - a plurality of scalloped recesses formed on the outer side surface of the tube-shaped body, each scalloped recess extending radially into but not through the thickness of the tube-shaped body, wherein each scalloped recess of the plurality of scalloped recesses comprises:
    - a first scalloped portion having a first scalloped width perpendicular to the longitudinal axis and a first depth relative to the outer side surface of the tube-shaped body, and
    - a second scalloped portion having a second scalloped width perpendicular to the longitudinal axis and a second depth relative to the outer side surface of the tube-shaped body,
    - wherein the first scalloped width greater than the second scalloped width, and
    - wherein the second depth is greater than the first depth; and
- a spool-rotating portion disposed within the axial chamber of the sleeve, wherein the spool-rotating portion is coupled for common rotation with the spool about the longitudinal axis defined by the sleeve.

12. The hydraulic circuit of claim 11, further comprising a low pressure fluid reservoir in selective-fluid communication with the hydraulic actuator when at least one of the plurality of return pressure ports of the spool is radially aligned with at least one of the plurality of control ports of the sleeve.

* * * * *